US012655891B2

(12) United States Patent
Mock et al.

(10) Patent No.: US 12,655,891 B2
(45) Date of Patent: Jun. 16, 2026

(54) FOUR-SPEED TRANSMISSION FOR AN ELECTRIC DRIVE SYSTEM

(71) Applicant: Allison Transmission, Inc., Indianapolis, IN (US)

(72) Inventors: Isaac Mock, Martinsville, IN (US); Michael D. Foster, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 211 days.

(21) Appl. No.: 18/363,173

(22) Filed: Aug. 1, 2023

(65) Prior Publication Data

US 2025/0043850 A1    Feb. 6, 2025

(51) Int. Cl.
F16H 3/78 (2006.01)
B60K 1/00 (2006.01)
(Continued)

(52) U.S. Cl.
CPC .................. F16H 3/78 (2013.01); B60K 1/00 (2013.01); B60K 7/0007 (2013.01); B60K 17/043 (2013.01); B60K 17/08 (2013.01); F16H 57/10 (2013.01); B60K 2007/0092 (2013.01); F16H 57/02 (2013.01); F16H 2057/02034 (2013.01); F16H 2057/02052 (2013.01); F16H 2200/0021 (2013.01); F16H 2200/0043 (2013.01); F16H 2200/0095 (2013.01); F16H 2200/2007 (2013.01); F16H 2200/2041 (2013.01);
(Continued)

(58) Field of Classification Search
CPC ... F16H 3/78; F16H 3/64; F16H 57/10; F16H 57/02; F16H 2057/02034; F16H 2057/02052; F16H 2200/0021; F16H 2200/0043; F16H 2200/0095; F16H 2200/2007; F16H 2200/2041; F16H 2200/2064; F16H 2200/2094; B60K 1/00; B60K 2001/001; B60K 7/0007; B60K 2007/0092; B60K 17/043; B60K 17/08; Y02T 10/62
See application file for complete search history.

(56) References Cited

U.S. PATENT DOCUMENTS 5,419,406 A    5/1995  Kawamoto et al.
6,071,208 A    6/2000  Koivunen
(Continued)

FOREIGN PATENT DOCUMENTS

AU    2020/201132    9/2021

*Primary Examiner* — Farhana Pervin
(74) *Attorney, Agent, or Firm* — Woodard Emhardt Henry Reeves & Wagner LLP

(57) ABSTRACT

A drive system for a hybrid or electric vehicle that includes a transmission with four forward and four reverse gears. The transmission optionally includes a first and a second planetary gearset, and optionally a first and second range selector assembly. The range selector assemblies may include a clutch and a brake, and/or a synchronizer. The drive system may include a single electric motor with any example of a transmission of the present disclosure, or multiple electric motors individually driving separate transmissions. The motors may be arranged upstream or downstream of portions of a transmission, and they may be aligned parallel with or perpendicular to a drive axle, input shaft, output shaft, and any suitable combination thereof. An internal combustion engine may be included as well.

18 Claims, 37 Drawing Sheets

(51) Int. Cl.

| | |
|---|---|
| *B60K 7/00* | (2006.01) |
| *B60K 17/04* | (2006.01) |
| *B60K 17/08* | (2006.01) |
| *F16H 57/10* | (2006.01) |
| *F16H 57/02* | (2012.01) |

(52) U.S. Cl.

CPC ................ *F16H 2200/2064* (2013.01); *F16H 2200/2094* (2013.01)

(56) References Cited

U.S. PATENT DOCUMENTS

| | | | |
|---|---|---|---|
| 7,976,431 B2 | 7/2011 | Bader et al. | |
| 8,522,634 B2 | 9/2013 | Bridges | |
| 8,870,712 B2 | 10/2014 | Steinborn et al. | |
| 10,807,466 B1 | 10/2020 | Haka et al. | |
| 10,851,881 B2 | 12/2020 | Duan et al. | |
| 11,002,350 B2 | 5/2021 | Waltz | |
| 11,124,064 B2 | 9/2021 | Kaltenbach et al. | |
| 11,320,025 B2 | 5/2022 | Ye et al. | |
| 11,338,672 B2 | 5/2022 | Varela | |
| 2011/0245028 A1* | 10/2011 | Kraynev | F16H 37/046 |
| | | | 475/296 |
| 2012/0116622 A1* | 5/2012 | Kim | F16H 3/728 |
| | | | 903/910 |
| 2014/0349802 A1 | 11/2014 | Steiner et al. | |
| 2015/0360681 A1* | 12/2015 | Kanayama | B60K 6/365 |
| | | | 180/65.265 |
| 2015/0377326 A1* | 12/2015 | Kato | F16H 3/66 |
| | | | 475/275 |
| 2021/0291646 A1 | 9/2021 | Lorenz et al. | |

* cited by examiner

FOUR-SPEED TRANSMISSION FOR AN ELECTRIC DRIVE SYSTEM

BACKGROUND OF THE INVENTION

As the interest in electric vehicles has grown, vehicles of increasing size and weight have switched from internal combustion engines as a primary power source to a fully electric or hybrid drive system. As the electric motor becomes a more common primary power source, transmission development has also shifted to accommodate the broader power curve common with such motors. Traditional transmissions configured for internal combustion engines have shown themselves to often be overly complex and inefficient in an electric drive train. Electric motor drive trains thus offer new opportunities for simpler and more reliable transmission designs with fewer wear parts that are potentially smaller, lighter, and easier to manufacture.

SUMMARY OF THE INVENTION

Disclosed is a drive system for a fully electric or hybrid vehicle that includes a first and a second planetary gearset having a sun gear, a carrier with planetary gears, and a ring gear. In another aspect, the carrier of the first planetary gearset is optionally coupled to the sun gear of the second planetary gearset. A first synchronizer may be included that is operable to selectively couple the ring gear of the first planetary gearset either to the carrier of the first planetary gearset or to ground. A second synchronizer may also be included that is operable to selectively couple the ring gear of the second planetary gearset either to the carrier of the second planetary gearset or to ground. In another aspect, the sun gear of the first planetary gearset is optionally coupled to an input shaft. In another aspect, the carrier of the second planetary gearset is optionally coupled to an output shaft.

In another example, the drive system of the present disclosure may include a first and a second planetary gearset having a sun gear, a carrier with planetary gears, and a ring gear. The carrier of the first planetary gearset is optionally coupled to the sun gear of the second planetary gearset. A first clutch may be included that is operable to selectively couple the ring gear of the first planetary gearset to an input shaft. A first brake may also be included that is operable to selectively couple the ring gear of the first planetary gearset to ground. A second clutch is optionally included that may be operable to selectively couple the ring gear of the second planetary gearset to the carrier of the first planetary gearset. In another aspect, a second brake may be included that is operable to selectively couple the ring gear of the second planetary gearset to ground. In another aspect, the sun gear of the first planetary gearset is optionally coupled to the input shaft, and the carrier of the second planetary gearset is optionally coupled to an output shaft.

In another example, a drive system of the present disclosure optionally includes a transmission that has a first and a second planetary gearset having a sun gear, a carrier with planetary gears, and a ring gear. The carrier of the first planetary gearset is optionally coupled to the sun gear of the second planetary gearset. A clutch operable to selectively couple the ring gear of the first planetary gearset to an input shaft may be included, along with an optional brake that may be operable to selectively couple the ring gear of the first planetary gearset and an output side of the clutch to ground. In another aspect, synchronizer may be included that is operable to selectively couple the ring gear of the second planetary gearset either to the carrier of the second planetary gearset or to ground. An electric motor is optionally arranged and configured to transmit torque to the transmission via an input shaft that may be coupled to the sun gear of the first planetary gearset, and the carrier of the second planetary gearset is optionally coupled to a drive axle.

In another example, a drive system of the present disclosure optionally includes a first and second electric motor providing torque separately to a first and a second transmission via a first and a second input shaft coupling the first electric motor to the first transmission, and the second electric motor to the second transmission. The first and second transmissions optionally include a first and a second planetary gearset having a sun gear, a carrier with planetary gears, and a ring gear, wherein the carrier of the first planetary gearset is coupled to the sun gear of the second planetary gearset. A first synchronizer may be included that is optionally operable to selectively couple the ring gear of the first planetary gearset either to the carrier of the first planetary gearset or to ground. A second synchronizer may be included that is optionally operable to selectively couple the ring gear of the second planetary gearset either to the carrier of the second planetary gearset or to ground. An input shaft coupled to the sun gear of the first planetary gearset is optionally coupled to an output shaft coupled to the carrier of the second planetary gearset. In another aspect, the output shaft of the first transmission may be coupled to a first earth ground engaging member, and the output shaft of the second transmission is optionally coupled to a second earth ground engaging member that is separate from the first earth ground engaging member.

Further forms, objects, features, aspects, benefits, advantages, and embodiments of the present invention will become apparent from a detailed description and drawings provided herewith.

DETAILED DESCRIPTION OF THE INVENTION

Figure 1:
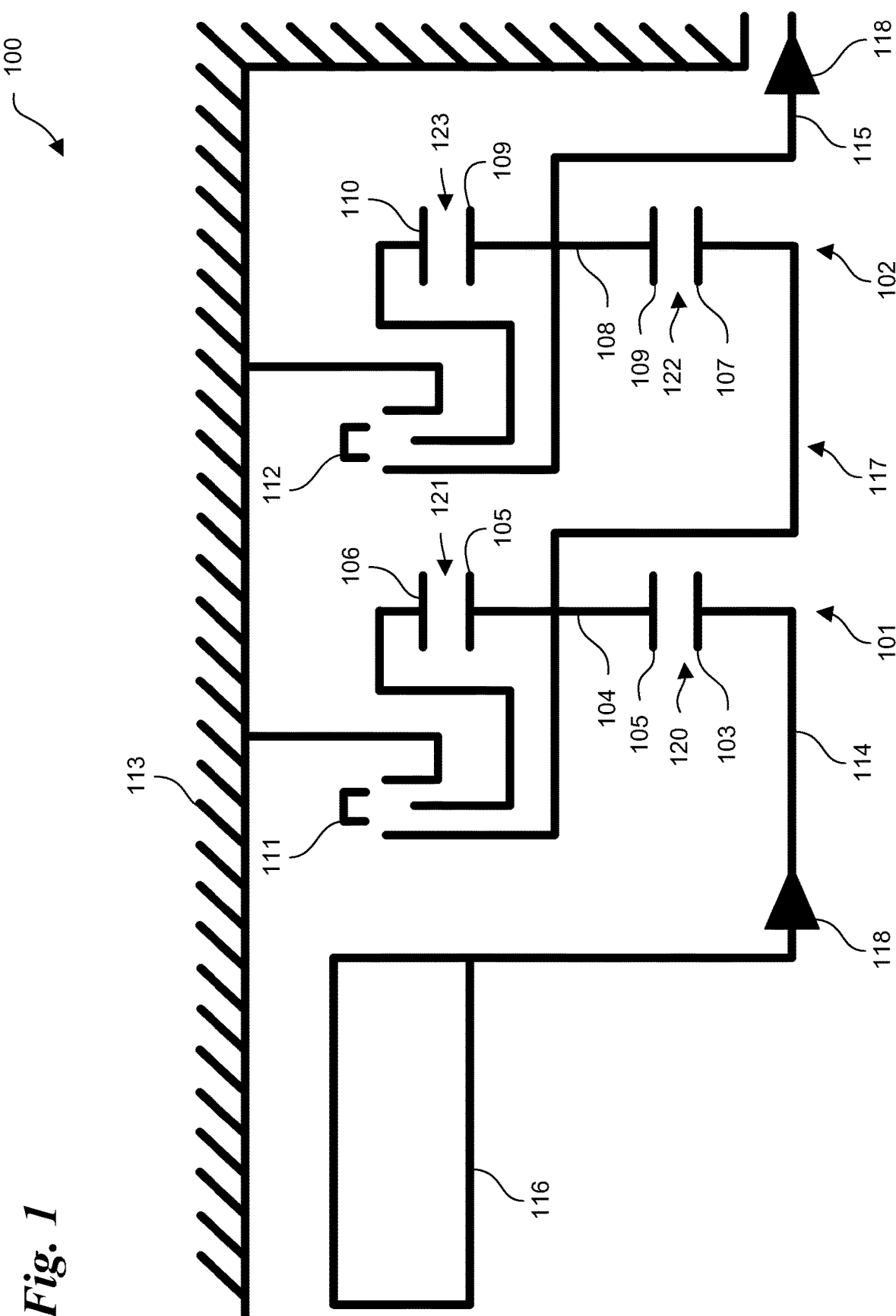
FIG. 1 is a diagram illustrating one example of the components and configuration of a drive system of the present disclosure.

Illustrated at 100 in FIG. 1 is one example of the components and configuration of a drive system or drivetrain of the present disclosure. In one aspect, the drive system 100 optionally includes a first planetary gearset 101 and optionally a second planetary gearset 102. In this example, planetary gearsets 101 and 102, and other drivetrain components are mounted downstream of the electric motor 116, although other configurations are possible, some of which are illustrated in the present disclosure. When providing power to the drivetrain, power flows from left to right in FIG. 1 according to arrows 118 with the electric motor 116 upstream of the gearsets 101 and 102 and the output shaft 115. Power optionally flows opposite the arrows 118 when, for example, the drivetrain is providing power to the electric motor 116. This may occur in a deceleration state such as in the case where the electric motor 116 provides regenerative braking.

The first planetary gearset 101 may include a sun gear 103, a carrier 104 with planetary gears 105, and a ring gear 106. In the first gearset 101, the planetary gears 105 are optionally arranged and configured to engage the ring gear 106 at 121, and the sun gear 103 at 120. In another aspect, the second planetary gearset 102 may include a sun gear 107, a carrier 108 having planetary gears 109, and a ring gear 110. In another aspect, the carrier 108 of the second planetary gearset 102 is optionally coupled to the sun gear 107 of the second planetary gearset 102 at 122. In the second gearset 102, the planetary gears 109 are optionally arranged and configured to engage the ring gear 110 at 123, and the sun gear 107 at 122.

The drive system 100 also optionally includes a first synchronizer 111 operable to selectively couple the ring gear 106 of the first planetary gearset 101 either to the carrier 105 of the first planetary gearset or to ground 113. A second synchronizer 112 may be included that is operable to selectively couple the ring gear 110 of the second planetary gearset 102 either to the carrier 108 of the second planetary gearset or to ground 113. In another aspect, the sun gear 103 of the first planetary gearset 101 is optionally coupled to an input shaft 114, and the carrier 108 of the second planetary gearset 102 is optionally coupled to an output shaft 115. Ground 113 may be provided by other structural components of the disclosed drivetrain such as by a housing that at least partially surrounds the first and second planetary gearsets.

In another aspect, the first and second planetary gear sets 101, and 102 optionally define substantially similar gear ratios. In one example, a first gear ratio defined by the first planetary gearset 101 and a second gear ratio defined by the second planetary gearset 102 differ by less than 0.01:1, by less than 0.5:1, or by less than 2:1. For example, gearset 101 may define a gear ratio of 3:1 and gearset 102 may define a gear ratio of 3:1 making the two gear ratios equal. In another example, planetary gearset 101 defines a gear ratio of 4.5:1 and gearset 102 may define a gear ratio of 4.2:1 making the two gear ratios substantially similar and differing by less than 0.5:1.

In another aspect, the drivetrain of the present disclosure is optionally configured to be operated such that first and second synchronizers may be individually actuated to provide four forward, and four reverse gears. A neutral gear may be provided by disengaging the synchronizers at the same time. A wide range of gear ratios may be achieved based on the power output available from the electric motor and the sizes and arrangement of the gears in planetary gear sets.

For example, the drive system of the present disclosure is optionally configured with a first and second synchronizer that are configured to selectively engage either a carrier to a ring gear, or a ring gear to ground to provide four separate speed ratios of the input shaft 114 relative to the output shaft 115. Four additional reverse gear ratios are optionally available by reversing the rotation of the electric motor 116. The rotational direction of the input shaft 114 is optionally directly linked to the rotational direction of the output shaft 115 to facilitate driving the system in reverse. In this way the drive systems of the present disclosure may be simplified to reduce or eliminate the need for a separate reversing mechanism.

For example, the first and second synchronizers 111 and 112 may be actuated between different engagement modes. In this respect, the synchronizers may be thought of as components of a range selector assembly each optionally operable to adjust the first and second planetary gearsets resulting in a drivetrain with multiple different gear ranges. In a first mode of operation, synchronizer 111 or 112 may be configured to couple carriers 105 or 108 with the ring gear 106 or 110 respectively. In a second mode of operation, synchronizer 111 or 112 may be configured to couple the ring gear 106 or 110 to ground 113, thus effectively locking up the ring gear 106 or 110 to hold it stationary with respect to other rotating elements of gearsets 101 and 102. In this configuration, the synchronizer 111 or 112 optionally forces the ring gear 106 or 110 and the carrier 104 or 108 respectively to rotate together. Thus, by using the output of the first gearset 101 at 117 as the input into the second similarly configured gearset 102, four separate gear ratios are possible based on the first and second modes of the first and second synchronizers 111 and 112 as illustrated in Table 1 below:

TABLE 1

|  |  | Synchronizer 111 | | Synchronizer 112 | |
|---|---|---|---|---|---|
|  |  | 1st Mode | 2nd Mode | 1st Mode | 2nd Mode |
| Gear | 1st |  | X |  | X |
|  | 2nd | X |  |  | X |
|  | 3rd |  | X | X |  |
|  | 4th | X |  | X |  |

These gear ratios may be achieved in the forward or reverse direction, with the reverse direction achieved by maintaining the above mentioned configuration of synchronizers while operating the electric motor 116 in the reverse direction.

In another aspect, a first gear is optionally defined when the ring gear 106 of the first planetary gearset 101 and the ring gear 110 of the second planetary gearset 102 are coupled to ground 113. In one example, this is achievable by operating both the first and second synchronizers in the second operating mode. The resulting first gear ratio of the four separate gear ratios may be of any suitable ratio such as less than or equal to 7:1, greater than 7:1, greater than 10:1, greater than 15:1, greater than 20:1, or more.

In another aspect, a second gear is optionally defined by coupling ring gear 106 of the first planetary gearset 101 to the carrier 104 of the first planetary gearset, while the ring gear 110 of the second planetary gearset 102 is coupled to ground 113. In one example, this is achievable by operating the first synchronizer in the first mode of operation, and the second synchronizer in the second operating mode. This may provide a second gear of any suitable ratio such as less than or equal to 5:1, greater than 5:1, greater than 8:1, greater than 10:1, greater than 15:1, or more.

A drive system of the present disclosure may achieve a third gear ratio of the four separate gear ratios by coupling the ring gear 106 of the first planetary gearset 101 to ground 113 and coupling the ring gear 110 of the second planetary gearset 102 to the carrier 108 of the second planetary gearset 102. This may be achieved, in the drivetrain 100, by actuating the first synchronizer 111 according to the second mode of operation, while also actuating the second synchronizer 112 according to the first mode of operation. Any suitable ratio may be used for third gear such as less than or equal to 3:1, greater than 3:1, greater than 6:1, greater than 8:1, greater than 10:1, or more.

A drive system of the present disclosure may achieve a fourth gear ratio of the four separate gear ratios by coupling the ring gear 106 of the first planetary gearset 101 to the carrier 104 and coupling the ring gear 110 of the second planetary gearset 102 to the carrier 108 of the second planetary gearset 102. This may be achieved, in the drivetrain 100, by actuating the first synchronizer 111 and the second synchronizer 112 according to the first mode of operation to achieve a 1:1 or, direct drive, operating mode for the disclosed drivetrain.

Examples of the drivetrain concepts disclosed in FIG. 1 are shown in operation in FIGS. 2-5. In these figures, parts indicated with similar dashed lines are constrained to rotate together, while parts in solid lines rotate independently or not at all. For example, parts marked with an "X" are constrained from rotating and are thus grounded.

Figure 2:
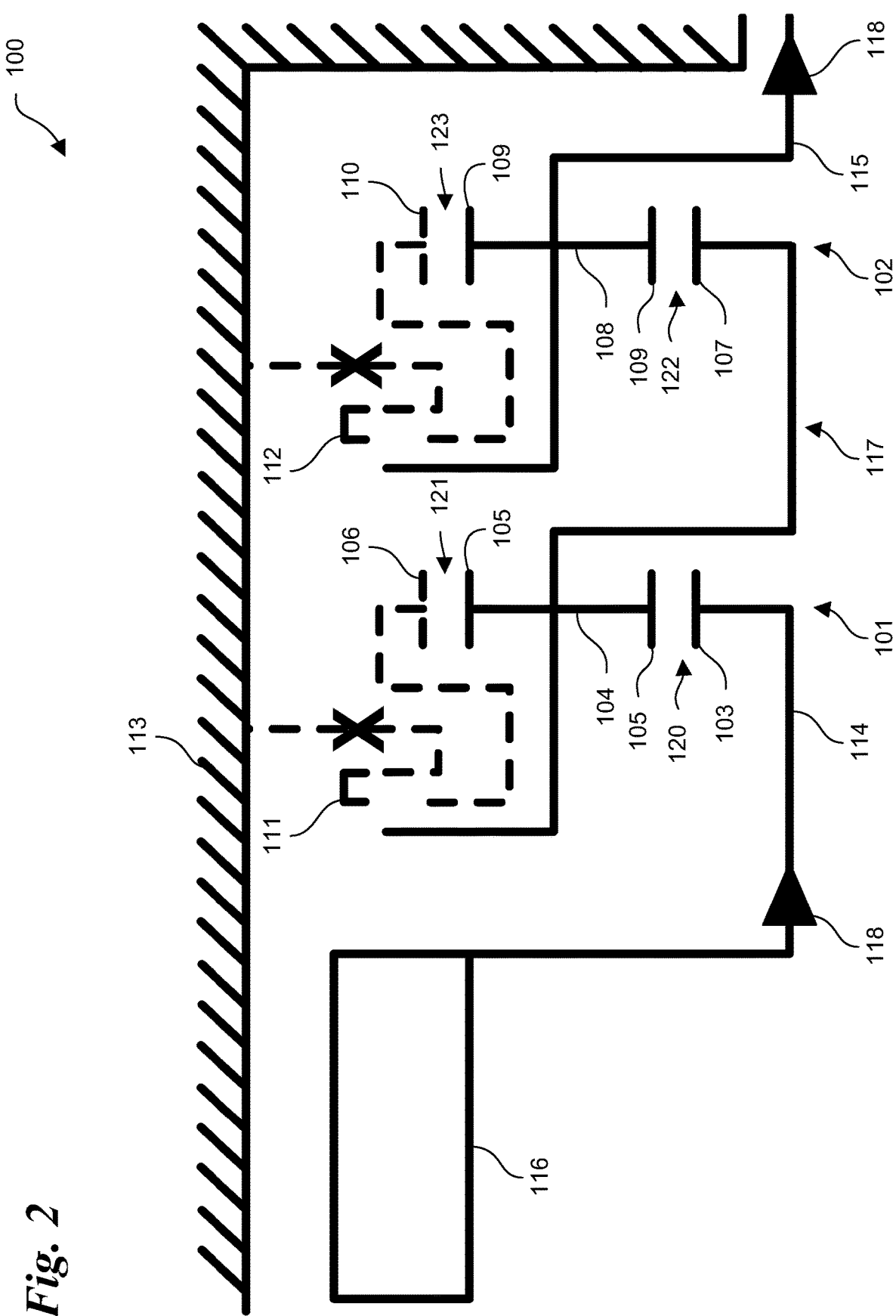
FIG. 2 is a diagram illustrating the example of FIG. 1 in operation.

In FIG. 2, the first and second synchronizers are actuated to ground the ring gears of both of the planetary gearsets 101 and 102. This means that the ring gear of both planetary gearsets are maintained in place relative to ground and are not allowed to rotate with respect to the other parts of the transmission. The sun gear of both planetary gearsets provides input torque to each planetary gearset, and the carrier and planetary gears of both gearsets are thus allowed to rotate freely in relation to the ring gear and sun gear of each gearset. In this way power can transfer from the electric motor, downstream through the transmission, to the output to provide a first gear ratio.

Figure 3:
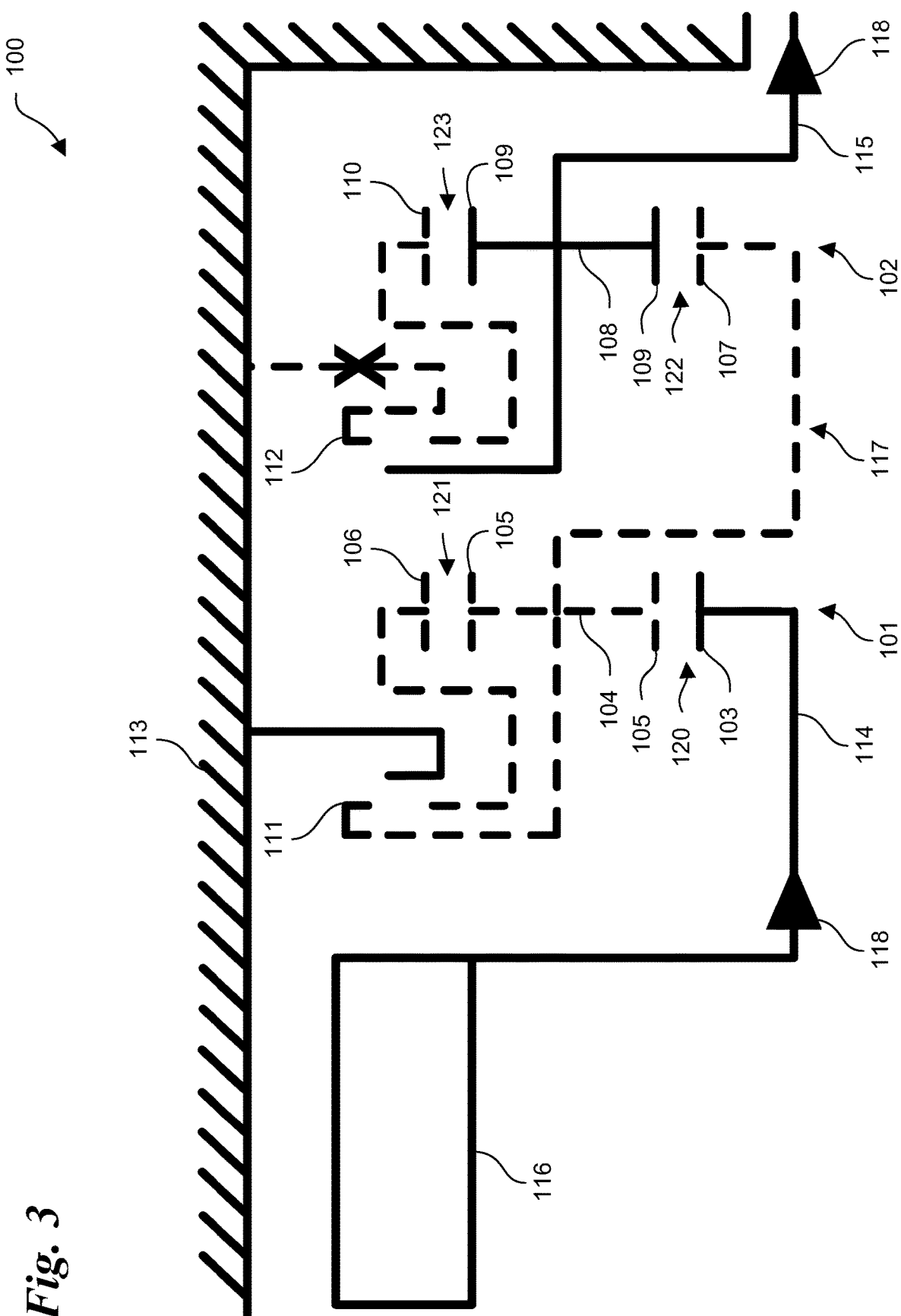
FIG. 3 is another diagram illustrating the example of FIG. 1 in operation.

In FIG. 3, the synchronizer 111 of the first gearset is actuated to couple the carrier to the ring gear. Torque input is provided by the input shaft coupled to the sun gear 103, which causes the carrier to rotate together with the ring gear. In this example, the second synchronizer 112 remains in the position shown in FIG. 2 in order to ground the ring gear 110 of the second planetary gearset. This means that the ring gear of second planetary is maintained in place relative to ground and is not allowed to rotate with respect to the other parts of the transmission. The sun gear of 107 of the second planetary gearset excepts input torque from the carrier 104 of the first planetary gearset. With the ring gear 110 locked in place and unable to move relative to the carrier 108, the carrier 108 may thus be driven to rotate within the ring gear 110 according to the input torque provided at the sun gear 107. In this way power can transfer from the electric motor, downstream through the transmission, to the output to provide a second gear ratio.

Figure 4:
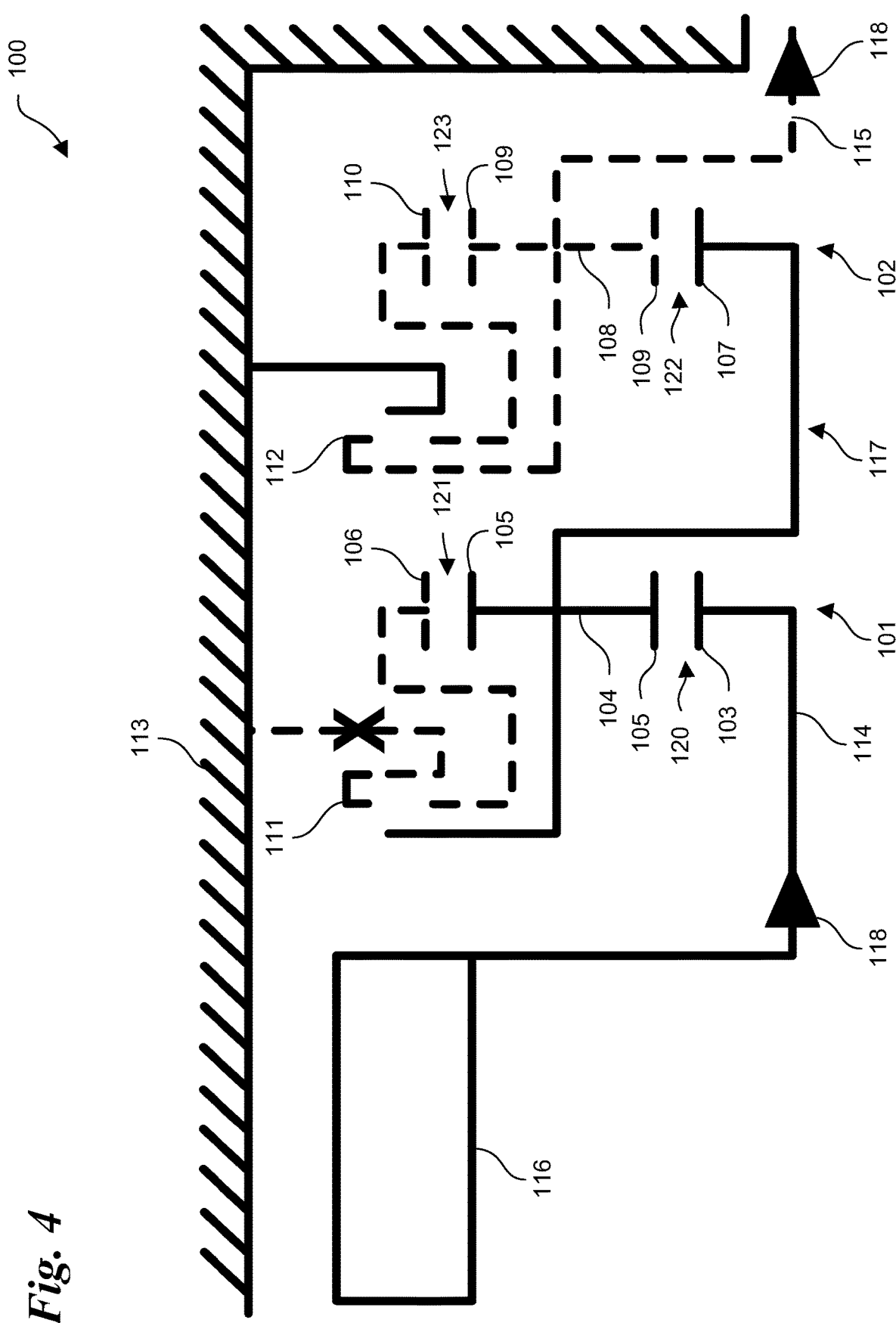
FIG. 4 is another diagram illustrating the example of FIG. 1 in operation.

In FIG. 4, the operation of the two gearsets reverses as the first synchronizer 111 remains in the position shown in FIG. 1 in order to ground the ring gear 106 of the first planetary gearset, and the second synchronizer 112 also reverses position to lock the ring gear 110 to rotate with the carrier 108. This means that the ring gear of first planetary is maintained in place relative to ground and is not allowed to rotate with respect to the other parts of the transmission while input torque is received from the motor 116 via the sun gear 103. With the ring gear 106 locked in place and unable to move relative to the carrier 104, the carrier 104 may thus be driven to rotate within the ring gear 106 according to the input torque provided at the sun gear 103. Synchronizer 112 of the second gearset is also actuated to couple the carrier 108 to the ring gear 110. Torque input is provided by the input shaft coupled to the sun gear 107, which causes the carrier 108 to rotate together with the ring gear 110. In this way power can transfer from the electric motor, downstream through the transmission, to the output to provide a third gear ratio.

Figure 5:
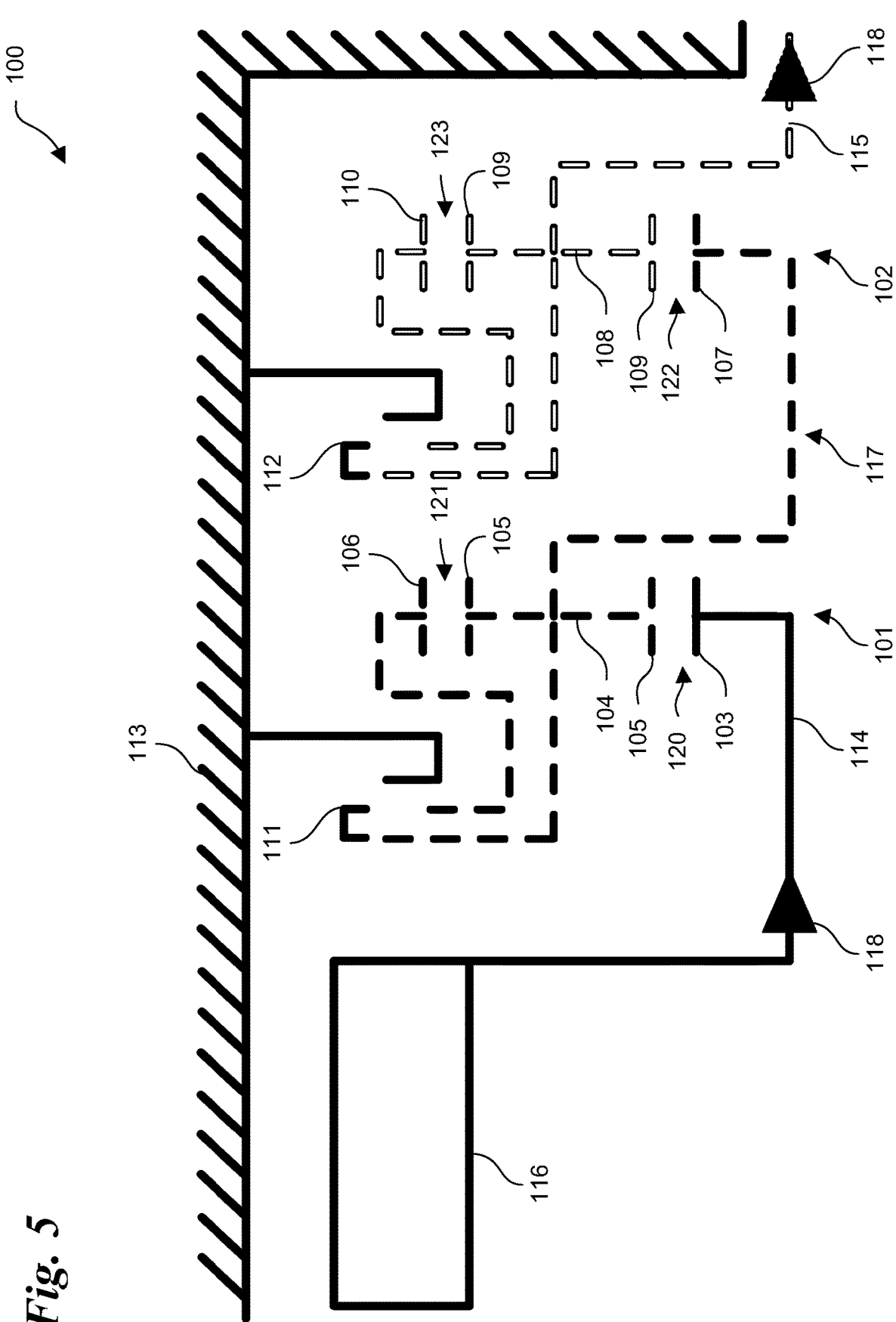
FIG. 5 is another diagram illustrating the example of FIG. 1 in operation.

In FIG. 5, the first and second synchronizers are actuated to couple the ring gears with the carriers of each respective gearset. The torque input is provided by the input shaft 114 and the carrier 104 of the first gearset coupled to the sun gear 107. In this way power can transfer directly from the electric motor, downstream through the transmission, to the output shaft 115 to provide a fourth gear ratio.

Figure 6:
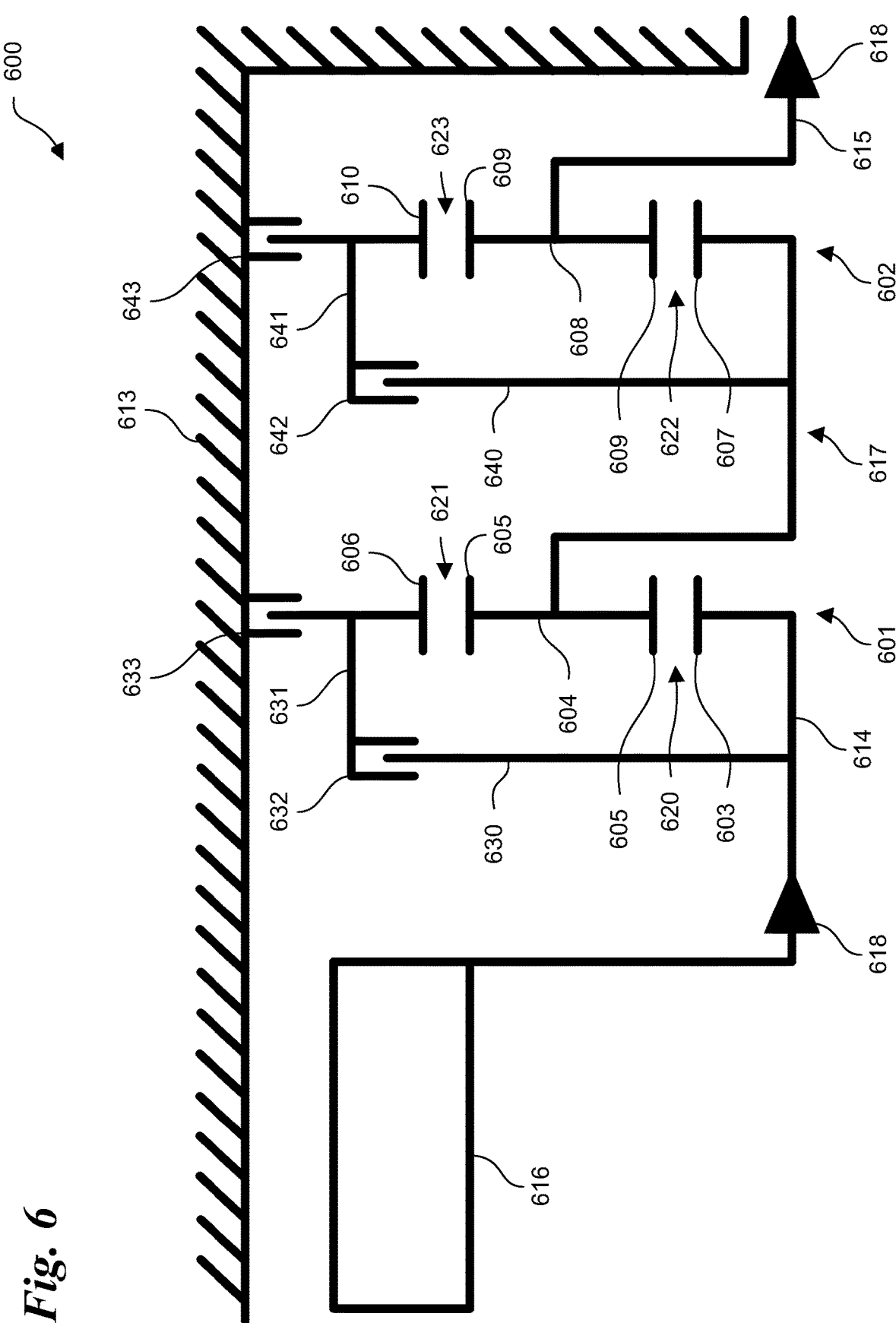
FIG. 6 is a diagram illustrating another example of the components and configuration of a drive system of the present disclosure.

Illustrated at 600 in FIG. 6 is another example of components that may be included in four-speed drive system or drivetrain of the present disclosure. In one aspect, the drive system 600 optionally includes a first planetary gearset 601 and optionally a second planetary gearset 602. The planetary gearsets 601 and 602, and other drivetrain components may be mounted downstream of an electric motor 616, although other configurations are possible, some of which are illustrated in the present disclosure. Power flows downstream from left to right in FIG. 6 according to arrows 618 with the electric motor 616 upstream of the gearsets 601 and 602, an input shaft 614, and an output shaft 615. Power optionally flows opposite the arrows 618 when, for example, the drivetrain is providing power to the electric motor 616. This may occur in a deceleration state such as in the case where the electric motor 616 provides regenerative braking.

The first planetary gearset 601 may include a sun gear 603, a carrier 604 with planetary gears 605, and a ring gear 606. In the first gearset 601, the planetary gears 605 are optionally arranged and configured to engage the ring gear 606 at 621, and the sun gear 603 at 620. In another aspect, the second planetary gearset 602 may include a sun gear 607, a carrier 608 having planetary gears 609, and a ring gear 610. In another aspect, the carrier 608 of the second planetary gearset 602 is optionally coupled to the sun gear 607 of the second planetary gearset 602 at 622. In the second gearset 602, the planetary gears 609 are optionally arranged and configured to engage the ring gear 610 at 623, and the sun gear 607 at 622.

The drive system 600 optionally includes a range selector assembly that uses clutches and brakes instead of synchronizers. (In another example, illustrated below, clutches, brakes, and synchronizers may be used together). A first clutch 632 and first brake 633 are operable to selectively couple the ring gear 606 of the first planetary gearset 601 either to the input shaft 614 of the first planetary gearset or to ground 613, and preferably not to both at the same time. In one example, the ground 613 may be provided by structural aspects of the drive system such as a housing or other structural component that at least partially surrounds at least a portion of the drivetrain 600. In another aspect, input shaft 614 may be coupled to an input side 630 of the first clutch 632, and an output side 631 of clutch 632 may be coupled to the ring gear 606, and the brake 633.

A second clutch 642 and a second brake 643 may be included and configured to selectively couple the ring gear 610 of the second planetary gearset 602 either to the carrier

604 of the first planetary gearset 601 (providing torque input to the second planetary gearset) or to ground 613, and preferably not to both at the same time. The clutch 642 may include an input side 640 coupled to the carrier of the first gearset 604 by a linkage at 617 such as an intermediary shaft or other suitable mechanical linkage. An output side 641 of the second clutch 642 may be coupled to the ring gear 610 and the brake 643. In another aspect, the sun gear 603 of the first planetary gearset 601 is optionally coupled to an input shaft 614, and the carrier 608 of the second planetary gearset 602 is optionally coupled to an output shaft 615.

In another aspect, the first and second planetary gear sets 601, and 602 of the drive system 600 optionally define substantially similar gear ratios. In one example, a first gear ratio defined by the first planetary gearset 601 and a second gear ratio defined by the second planetary gearset 602 differ by less than 0.01:1, by less than 0.5:1, or by less than 2:1. For example, gearset 601 may define a gear ratio of 3:1 and gearset 602 may define a gear ratio of 3:1 making the two gear ratios equal. In another example, planetary gearset 601 defines a gear ratio of 4.5:1 and gearset 602 may define a gear ratio of 4.2:1 making the two gear ratios substantially similar and differing by less than 0.5:1.

In another aspect, a drivetrain of the present disclosure, such as the one shown in FIG. 6 is optionally configured to be operated such that one or more clutches and brakes may be separately and individually actuated to provide four forward, and four reverse gears. A neutral gear may be provided by disengaging these clutches and brakes. A wide range of gear ratios may be achieved based on the power output available from an engine or motor or other prime mover coupled to the drive system, and the sizes and arrangement of the gears in planetary gear sets in the drive system.

For example, the drive system 600 of the present disclosure is optionally configured with separate range selection assemblies that are configured to selectively engage a ring gear to either ground, or to a torque input. These range selection assemblies may include a clutch, a brake, or both, and may be independently actuated separately to provide multiple separate speed ratios of the input shaft 614 relative to the output shaft 615. Additional reverse gear ratios are optionally available by reversing the rotation of the input shaft 614 such as, by reversing the rotation of the electric motor 616. The rotational direction of the input shaft 614 is optionally directly linked to the rotational direction of the output shaft 615 by the drive system 600 to facilitate driving a vehicle in reverse.

In another aspect, the first and second clutches 632, 642 and the first and second brakes 633, and 643 may be optionally implemented with one or more frictional elements selectively pressed into contact with one another. In another aspect, the brakes and clutches of the present disclosure, such as those shown in FIG. 6, may include one or more dog clutches with rotating components that engage by interference or clearance fit thus reducing or eliminating slip that may be inherent in a friction clutch or brake. A dog clutch configuration may be useable either in place of the frictional components described above, or along with them. In another aspect, first brake 633, and second brake 643, or clutches 632, and 642 optionally include a Selectable One Way Clutch (SOWC).

The clutches and brakes of the range selector assemblies illustrated in drive system 600 may be selectively activated and deactivated in concert with one another to define separate operating modes providing multiple forward and reverse gears. For example, the range selection assemblies may operate in a first mode of operation where the brake is actuated without actuating the clutches. In another example, the clutch may be actuated when the brake is disengaged thus providing a second mode of operation. In another aspect, four gear ranges may be obtained by linking the output of the first planetary as the input of the second planetary, an example of which is shown in FIG. 6. An example of such a configuration is illustrated in Table 2 below:

TABLE 2

|  |  | Clutch 632 | Brake 633 | Clutch 642 | Brake 643 |
|---|---|---|---|---|---|
| Gear | 1st |  | X |  | X |
|  | 2nd | X |  |  | X |
|  | 3rd |  | X | X |  |
|  | 4th | X |  | X |  |

These gear ratios may be achieved in the forward or reverse direction, with the reverse direction achieved by maintaining the above mentioned configuration of clutches and brakes while receiving reverse input torque on input shaft 614 in a direction of rotation that is opposite of forward input torque.

A first gear is optionally defined when the ring gear 606 of the first planetary gearset 601 and the ring gear 610 of the second planetary gearset 602 are "grounded", i.e. coupled to ground 613. In one example, this is achievable by actuating both the first and second brakes 633, 643 and disengaging clutches 632 and 642. The resulting first gear ratio of the four separate gear ratios may be of any suitable ratio such as less than or equal to 7:1, greater than 7:1, greater than 10:1, greater than 15:1, greater than 20:1, or more.

In another aspect, a second gear is optionally defined by coupling the ring gear 606 of the first planetary gearset 601 to the input shaft 614 of the first planetary gearset, while the ring gear 610 of the second planetary gearset 602 is coupled to ground 613. In one example, this is achievable by actuating the clutch 632, deactivating brake 633, and engaging brake 643, but not clutch 642. This may provide a second gear of any suitable ratio such as less than or equal to 5:1, greater than 5:1, greater than 8:1, greater than 10:1, greater than 15:1, or more.

A third gear ratio of the four separate gear ratios may be achieved by coupling the ring gear 606 of the first planetary gearset 601 to ground 613 and coupling the ring gear 610 of the second planetary gearset 602 to the carrier 604 of the first planetary gearset. This may be achieved, in the drivetrain 600, by disengaging clutch 632 and engaging brake 633, and engaging clutch 642 and disengaging brake 643. Any suitable ratio may be used for third gear such as less than or equal to 3:1, greater than 3:1, greater than 6:1, greater than 8:1, greater than 10:1, or more.

A fourth gear ratio of the four separate gear ratios may be achieved by coupling the ring gear 606 of the first planetary gearset 601 to the input shaft 614, and coupling the ring gear 610 of the second planetary gearset 602 to the carrier 604 of the first planetary gearset. This may be achieved, in the drivetrain 600, by engaging clutch 632, disengaging brake 633, engaging clutch 642, and disengaging brake 643. A ratio of 1:1 may thus be obtained providing a "direct drive" scenario between the electric motor and the output shaft where both rotate at the same rate.

Examples of the drivetrain concepts disclosed in FIG. 6 are shown in operation in FIGS. 7-10. In these figures, parts indicated with similar dashed lines are constrained to rotate together, while parts in solid lines rotate independently or not at all. For example, parts marked with an "X" are constrained from rotating and are thus grounded.

Figure 7:
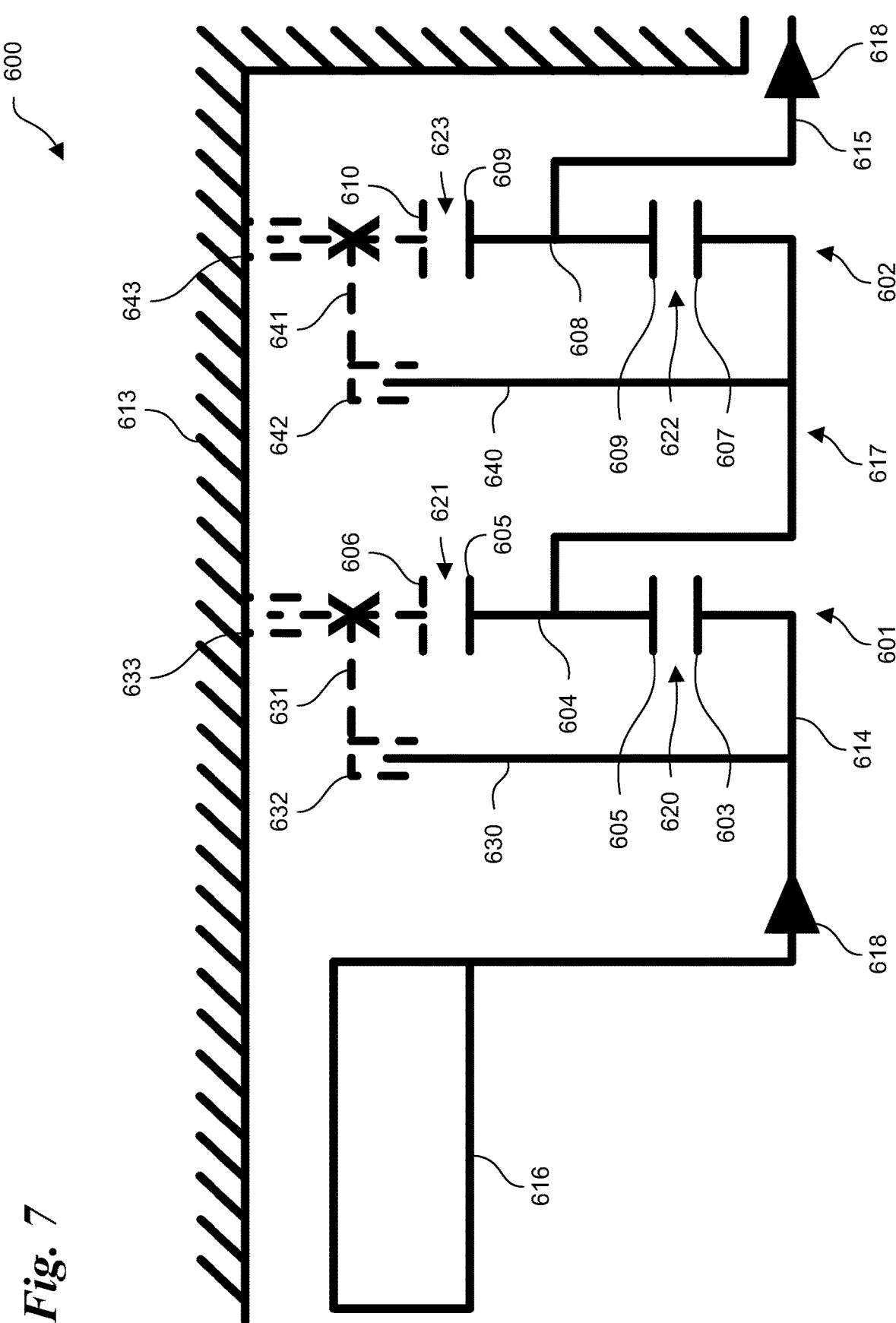
FIG. 7 is a diagram illustrating the example of FIG. 6 in operation.

In FIG. 7, the first and second brakes are actuated to ground the ring gears of both of the planetary gearsets 601 and 602. The ring gears of both planetary gearsets are maintained in place relative to ground and are not allowed to rotate with respect to the other parts of the transmission. The sun gear of both planetary gearsets provides input torque to each planetary gearset, and the carrier and planetary gears of both gearsets are thus allowed to rotate freely in relation to the ring gear and sun gear of each gearset. Power optionally transfers from the electric motor, downstream through the transmission, to the output to provide a first gear ratio.

Figure 8:
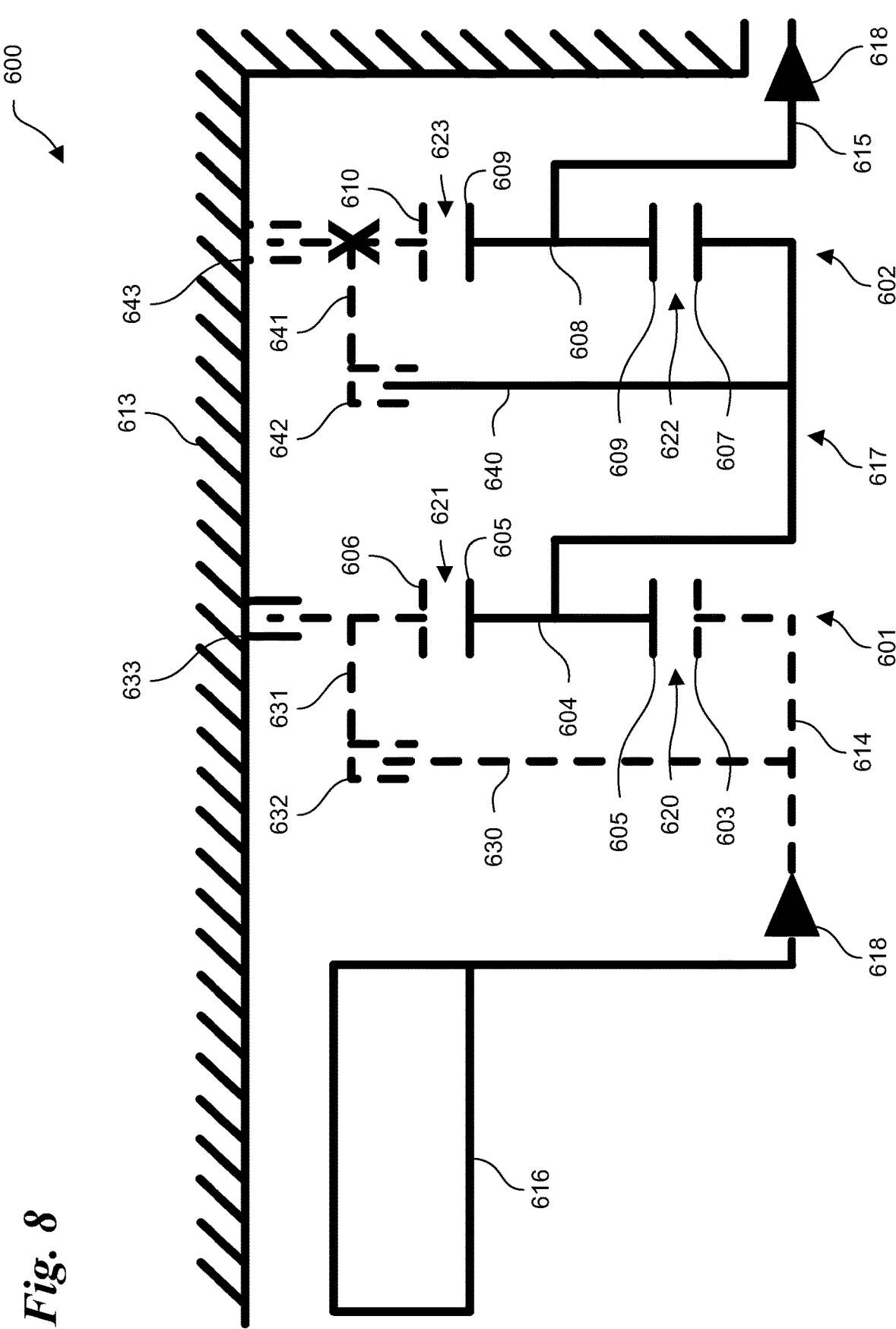
FIG. 8 is another diagram illustrating the example of FIG. 6 in operation.

In another aspect shown in FIG. 8, a second gear is optionally defined by coupling the ring gear 606 and the input shaft 614 of the first planetary gearset 601 together, while the ring gear 610 of the second planetary gearset 602 is coupled to ground 613. In one example, this is achievable by actuating the clutch 632, deactivating brake 633, and engaging brake 643, but not clutch 642. This may provide a second gear of any suitable ratio such as less than or equal to 5:1, greater than 5:1, greater than 8:1, greater than 10:1, greater than 15:1, or more.

Figure 9:
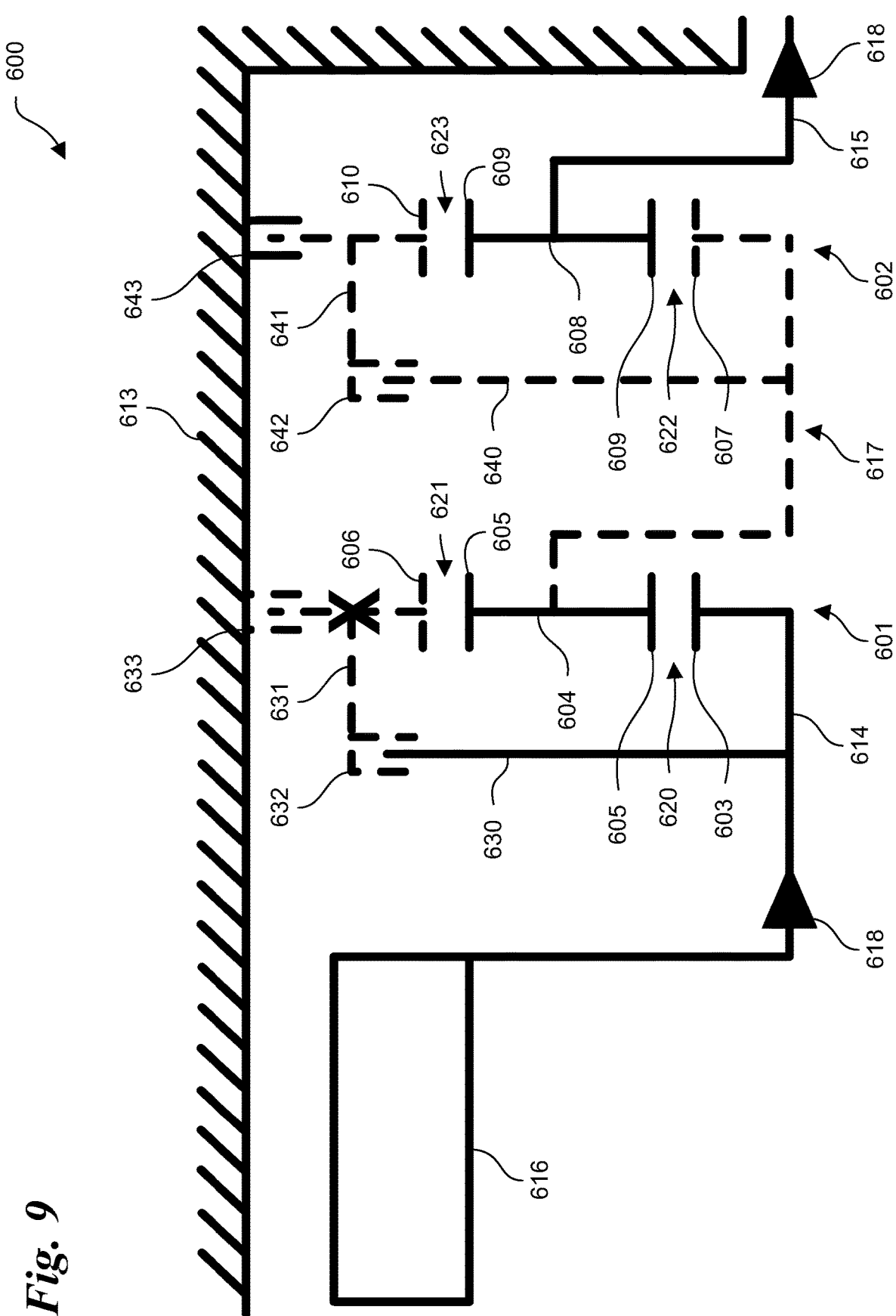
FIG. 9 is another diagram illustrating the example of FIG. 6 in operation.

Illustrated in FIG. 9 is a third gear ratio of the four separate gear ratios which may be achieved by coupling the ring gear 606 of the first planetary gearset 601 to ground 613 and coupling the ring gear 610 of the second planetary gearset 602 to the carrier 604 of the first planetary gearset. This may be achieved, in the drivetrain 600, by disengaging clutch 632 and engaging brake 633, and engaging clutch 642 and disengaging brake 643. Any suitable ratio may be used for third gear such as less than or equal to 3:1, greater than 3:1, greater than 6:1, greater than 8:1, greater than 10:1, or more.

Figure 10:
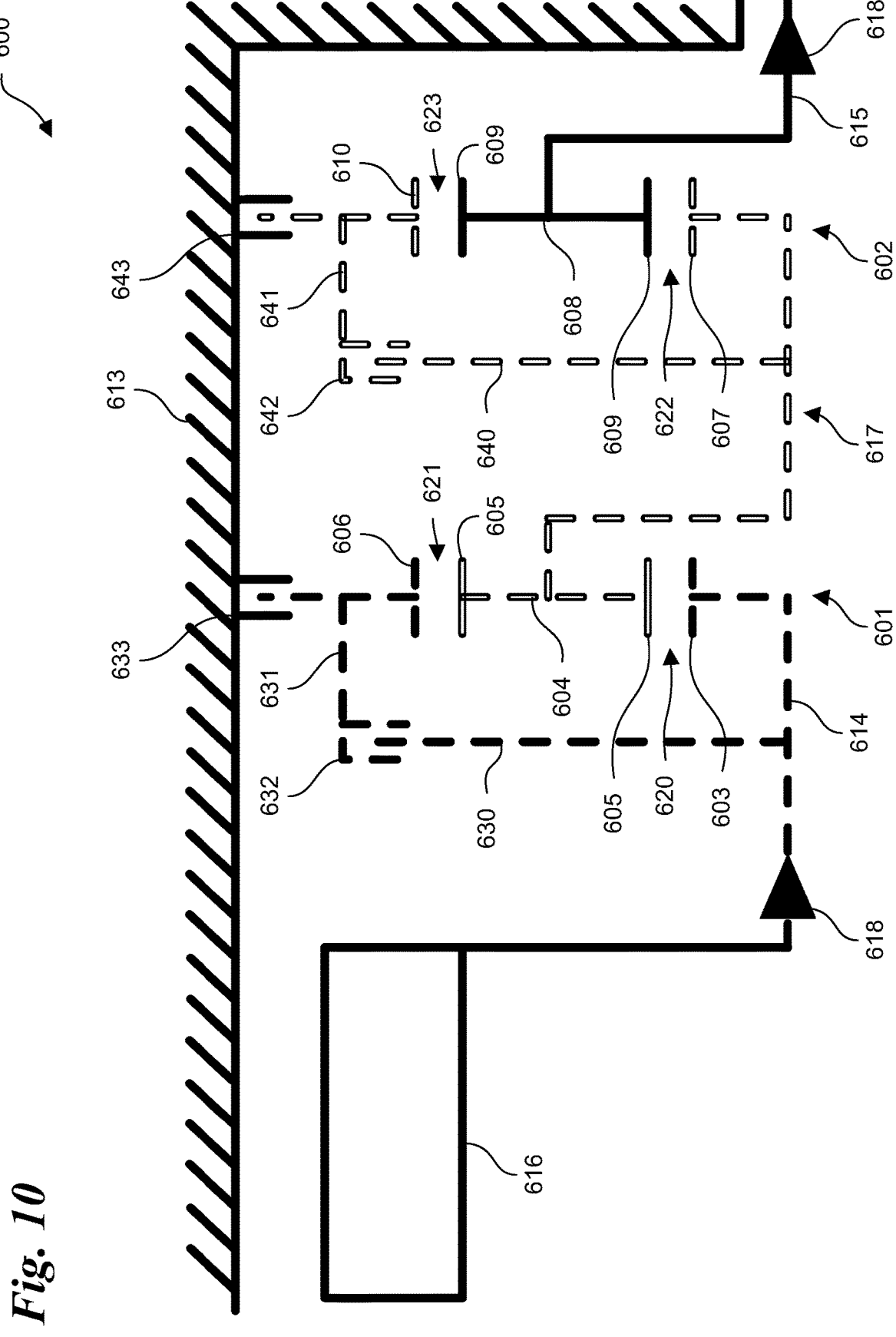
FIG. 10 is another diagram illustrating the example of FIG. 6 in operation.

As shown in FIG. 10, a fourth gear ratio of the four separate gear ratios may be achieved by coupling the ring gear 606 of the first planetary gearset 601 to the input shaft 614, and coupling the ring gear 610 of the second planetary gearset 602 to the carrier 604 of the first planetary gearset. This may be achieved, in the drivetrain 600, by engaging clutch 632, disengaging brake 633, engaging clutch 642, and disengaging brake 643. A ratio of 1:1 may thus be obtained.

Figure 11:
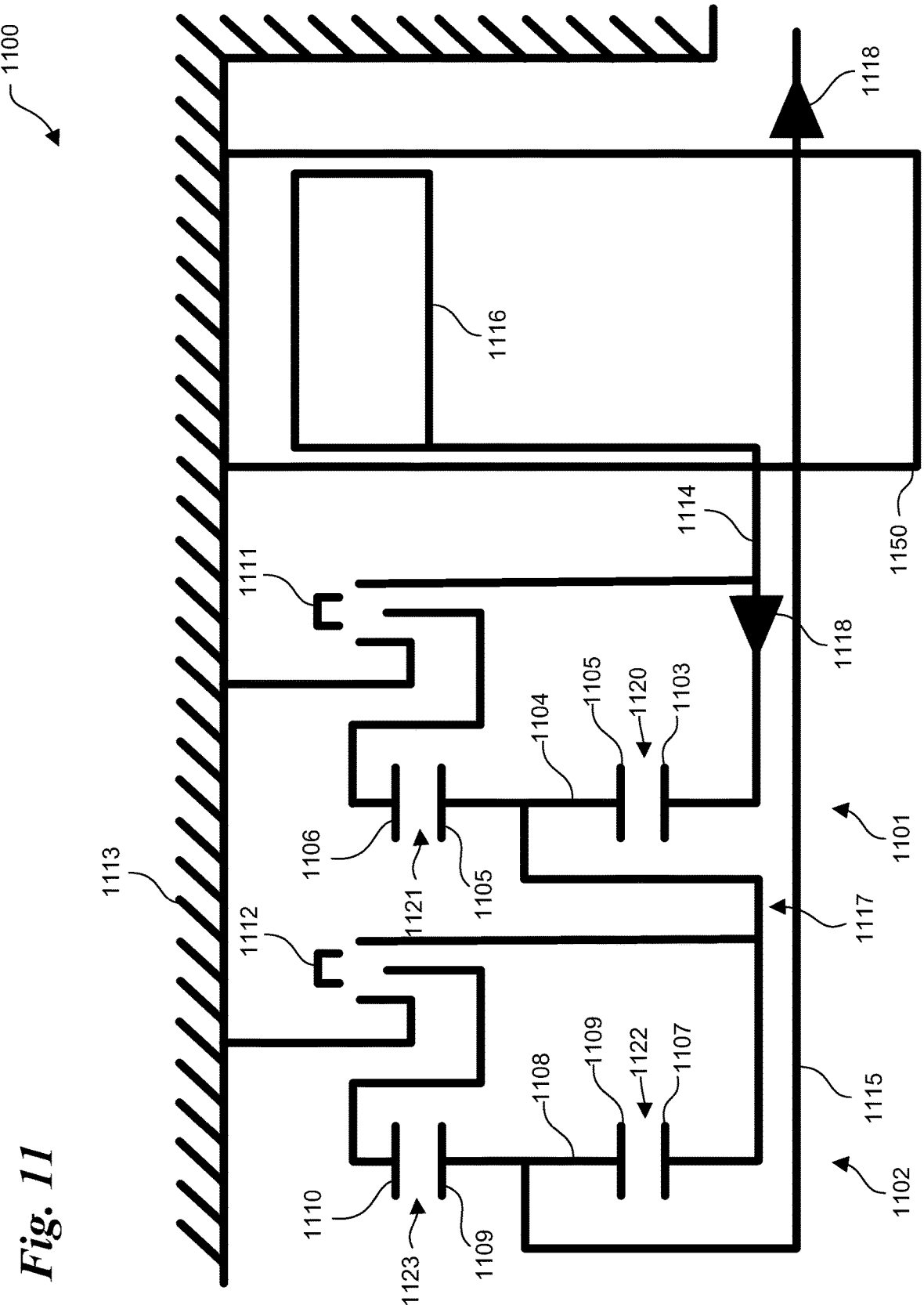
FIG. 11 is a diagram illustrating one example of the components and configuration of a drive system of the present disclosure.

Illustrated at 1100 in FIG. 11 is another example of components that may be included in four-speed transmission and drivetrain of the present disclosure. In one aspect, the drive system 1100 optionally includes a first planetary gearset 1101 and optionally a second planetary gearset 1102. The planetary gearsets 1101 and 1102, and other drivetrain components may be mounted upstream of an electric motor 1116, although other configurations are feasible as well, some of which are illustrated in the present disclosure. Electric motor 1116 optionally includes a case or housing 1150 which partially or completely encloses electric motor 1116.

In FIG. 11, power flows first upstream toward the gearsets 1101 and 1102 from right to left in FIG. 11, and then downstream from left to right through motor housing 1150 according to arrows 1118. Power optionally flows opposite the arrows 1118 when, for example, the drivetrain is providing power to the electric motor 1116. This may occur in a deceleration state such as in the case where the electric motor 1116 provides regenerative braking.

The electric motor 1116 is optionally downstream of the gearsets 1101 and 1102, and input shaft 1114. Output shaft 1115 passes from the carrier of the second planetary 1101 positioned upstream of the motor, through the first planetary 1101 and the motor, and downstream from there so as to provide the final output torque to other portions of the drivetrain.

The first planetary gearset 1101 optionally includes a sun gear 1103, a carrier 1104 with planetary gears 1105, and a ring gear 1106. In the first gearset 1101, the planetary gears 1105 are optionally arranged and configured to engage and mesh with the ring gear 1106 at 1121, and the sun gear 1103 at 1120. In another aspect, the second planetary gearset 1102 may include a sun gear 1107, a carrier 1108 having planetary gears 1109, and a ring gear 1110. In another aspect, the carrier 1108 of the second planetary gearset 1102 is optionally coupled to the sun gear 1107 of the second planetary gearset 1102 at 1122 where the planetary gears 1109 mesh with the sun gear 1107. In the second gearset 1102, the planetary gears 1109 are optionally arranged and configured to engage the ring gear 1110 at 1123.

In another aspect, the first and second planetary gear sets 1101, and 1102 of the drive system 1100 optionally define substantially similar gear ratios. In one example, a first gear ratio defined by the first planetary gearset 1101 and a second gear ratio defined by the second planetary gearset 1102 differ by less than 0.01:1, by less than 0.5:1, or by less than 2:1. For example, gearset 1101 may define a gear ratio of 3:1 and gearset 1102 may define a gear ratio of 3:1 making the two gear ratios equal. In another example, planetary gearset 1101 defines a gear ratio of 4.5:1 and gearset 1102 may define a gear ratio of 4.2:1 making the two gear ratios substantially similar and differing by less than 0.5:1.

The drive system 1100 optionally includes a range selector assembly that optionally uses synchronizers, dog clutches, or other selectable direct engaging devices which may be individually actuated to provide four forward, and four reverse gears. A neutral gear may be provided by disengaging the synchronizers at the same time. A wide range of gear ratios may be achieved based on the power output available from the electric motor and the sizes and arrangement of the gears in planetary gear sets.

For example, the drive system of the present disclosure is optionally configured with a first and second synchronizer that are configured to selectively engage either a carrier and sun gear to a ring gear, or a ring gear to ground to provide four separate speed ratios of the input shaft 1114 relative to the output shaft. Four additional reverse gear ratios are optionally available by reversing the rotation of the electric motor 1116. The rotational direction of the input shaft 1114 is optionally directly linked to the rotational direction of the output shaft 1115 to facilitate driving the system in reverse. In this way the drive systems of the present disclosure may be simplified to reduce or eliminate the need for a separate reversing mechanism.

For example, the first and second synchronizers 1111 and 1112 may be actuated between different engagement modes. The synchronizers may operate as components of a range selector assembly that are optionally operable to adjust the operation of the first and second planetary gearsets resulting in a drivetrain with multiple different gear ranges.

In a first mode of operation, synchronizer 1111 or 1112 may be configured to couple sun gear 1103 or 1107 to the ring gear 1106 or 1110 respectively. In a second mode of operation, synchronizer 1111 or 1112 may be configured to couple the ring gear 1106 or 1110 to ground 1113 so as to selectively lock up the ring gear 1106 or 1110 holding them stationary with respect to other rotating elements of gearsets 1101 and 1102. The synchronizer 1111 or 1112 optionally selectively locks the ring gear 1106 or 1110 to the sun gear

1103 or 1107 respectively. Thus by using the output of the first gearset 1101 at 1117 as the input into the second similarly configured gearset 1102, four separate gear ratios are possible based on the first and second modes of the first and second synchronizers 1111 and 1112 as illustrated in Table 3 below:

TABLE 3

| | | Synchronizer 1111 | | Synchronizer 1112 | |
|---|---|---|---|---|---|
| | | 1st Mode | 2nd Mode | 1st Mode | 2nd Mode |
| Gear | 1st | | X | | X |
| | 2nd | X | | | X |
| | 3rd | | X | X | |
| | 4th | X | | X | |

These gear ratios may be achieved in the forward or reverse direction, with the reverse direction achieved by maintaining the above mentioned configuration of synchronizers while operating the electric motor 1116 in the reverse direction.

In another aspect, a first gear is optionally made available by the disclosed gear train when the ring gear 1106 of the first planetary gearset 1101 and the ring gear 1110 of the second planetary gearset 1102 are coupled to ground 1113. In one example, this is achievable by operating both the first and second synchronizers in the second operating mode. The resulting first gear ratio of the four separate gear ratios may be of any suitable ratio such as less than or equal to 7:1, greater than 7:1, greater than 10:1, greater than 15:1, greater than 20:1, or more.

In another aspect, a second gear is optionally defined by coupling ring gear 1106 of the first planetary gearset 1101 to the sun gear 1103 of the first planetary gearset 1101, while the ring gear 1110 of the second planetary gearset 1102 is coupled to ground 1113. In one example, this is achievable by operating the first synchronizer in the first mode of operation, and the second synchronizer in the second operating mode. This may provide a second gear of any suitable ratio such as less than or equal to 5:1, greater than 5:1, greater than 8:1, greater than 10:1, greater than 15:1, or more.

A drive system of the present disclosure may achieve a third gear ratio of the four separate gear ratios by coupling the ring gear 1106 of the first planetary gearset 1101 to ground 1113 and coupling the ring gear 1110 of the second planetary gearset 1102 to the sun gear 1107 of the second planetary gearset 1102. This may be achieved, in the drivetrain 1100, by actuating the first synchronizer 1111 according to the second mode of operation, while also actuating the second synchronizer 1112 according to the first mode of operation. Any suitable ratio may be used for third gear such as less than or equal to 3:1, greater than 3:1, greater than 6:1, greater than 8:1, greater than 10:1, or more.

A drive system of the present disclosure may achieve a fourth gear ratio of the four separate gear ratios by coupling the ring gear 1106 of the first planetary gearset 1101 to the sun gear 1103 and coupling the ring gear 1110 of the second planetary gearset 1102 to the sun gear 1107 of the second planetary gearset 1102. This may be achieved, in the drivetrain 1100, by actuating the first synchronizer 1111 and the second synchronizer 1112 according to the second mode of operation. A direct drive scenario is thus optionally provided whereby a 1:1 ratio exists between the motor and the output shaft.

Examples of the drivetrain concepts disclosed in FIG. 11 are shown in operation in FIGS. 12-15. In these figures, parts indicated with similar dashed lines are constrained to rotate together, while parts in solid lines rotate independently or not at all. For example, parts marked with an "X" are constrained from rotating and are thus grounded.

Figure 12:
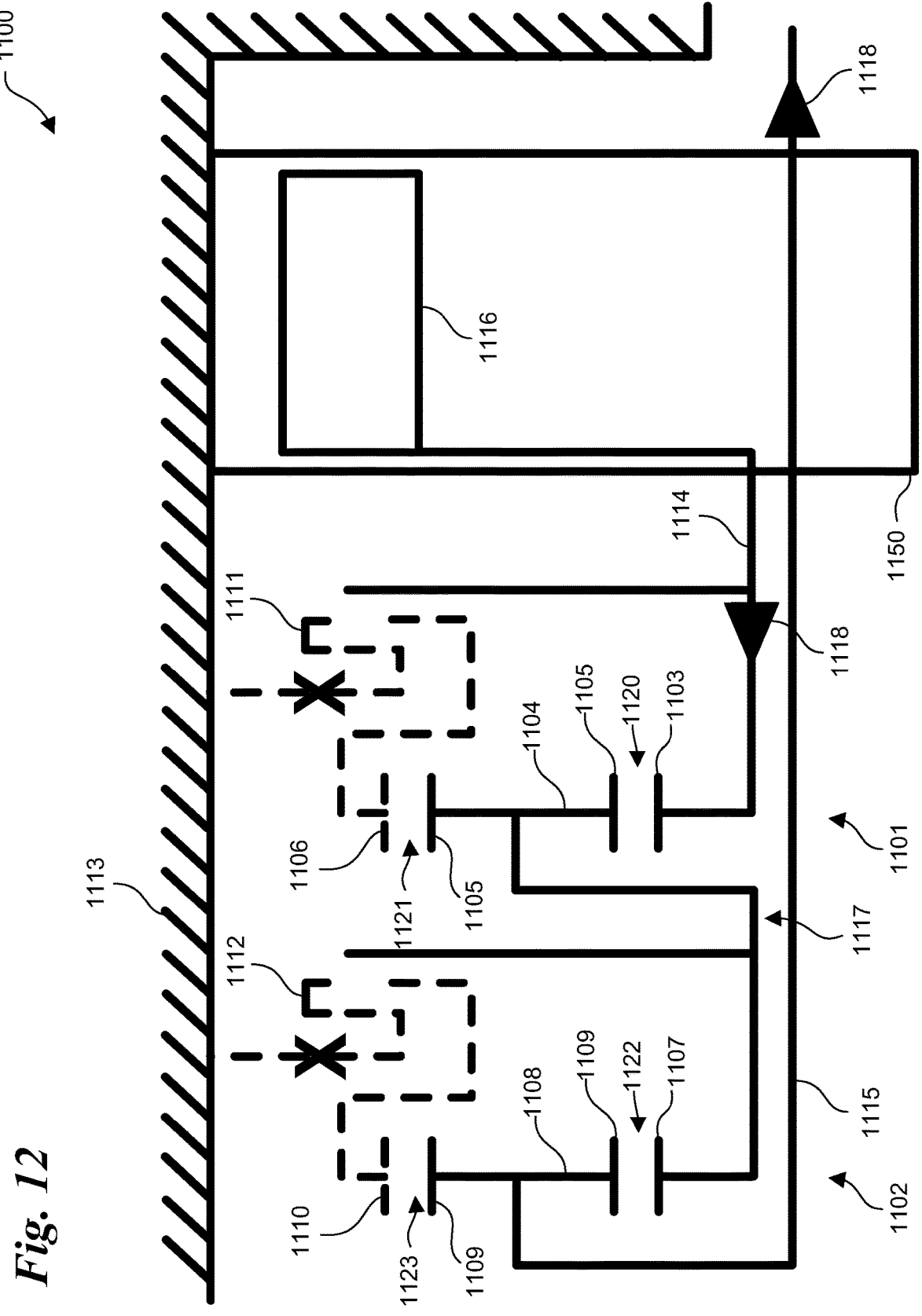
FIG. 12 is a diagram illustrating the example of FIG. 11 in operation.

In FIG. 12, the first and second synchronizers are actuated to ground the ring gears of both of the planetary gearsets 1101 and 1102. The ring gear of both planetary gearsets 1101 and 1102 are maintained in place relative to ground and are not allowed to rotate with respect to the other parts of the transmission. The sun gears 1103 and 1107 of both planetary gearsets provide input torque to each planetary gearset. The carriers 1104 and 1108, and the planetary gears 1105 and 1109 of both gearsets rotate freely with respect to the ring gear 1106 and 1110, and the sun gears 1113 and 1107 of each gearset. Power optionally transfers from the electric motor 1116, upstream to the first and second planetaries, then downstream through the motor housing 1150 to provide a first gear ratio.

Figure 13:
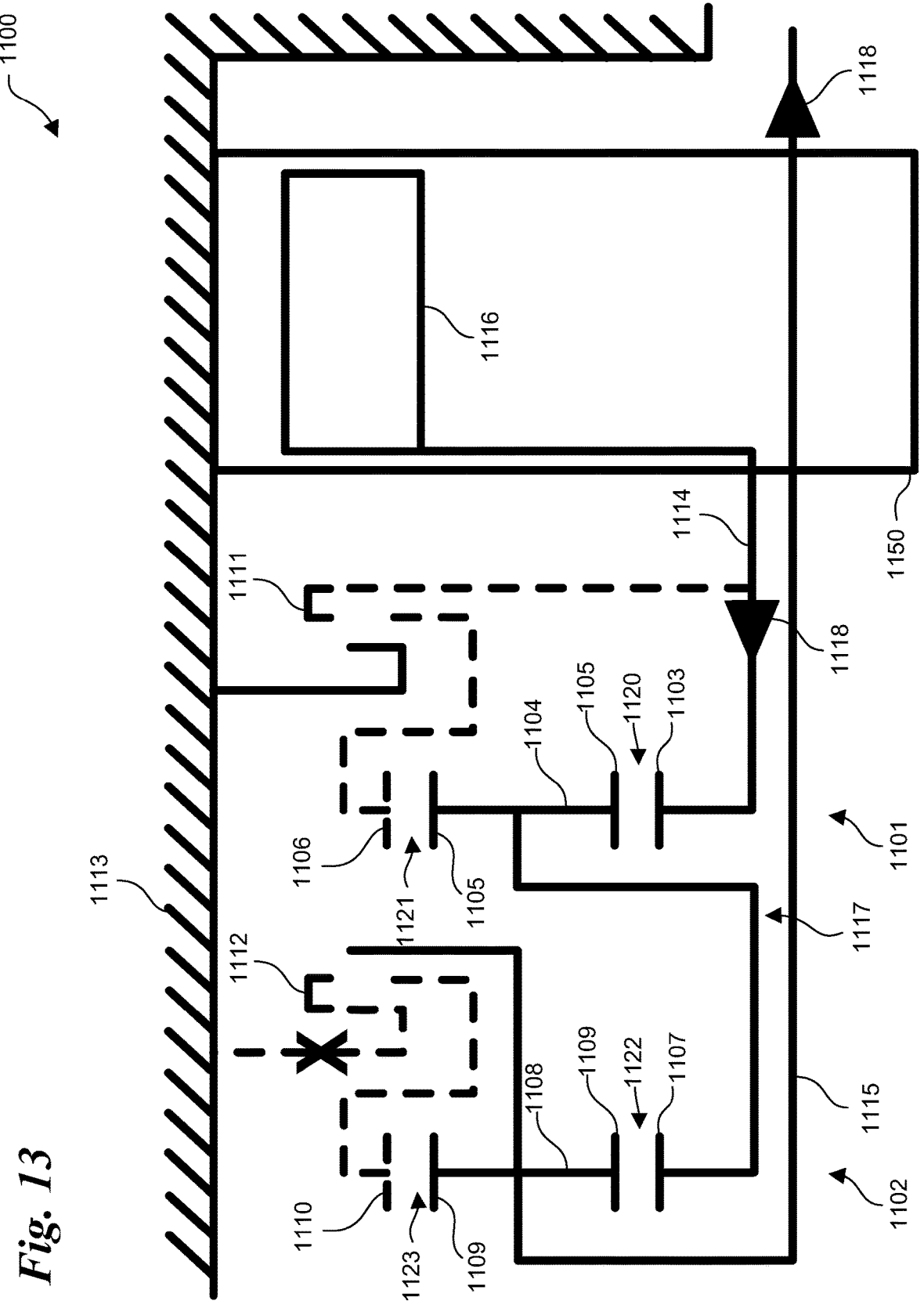
FIG. 13 is another diagram illustrating the example of FIG. 11 in operation.

In FIG. 13, the synchronizer 1111 of the first gearset is actuated to couple the sun gear of the first planetary gearset to the ring gear. Torque input is obtained from the input shaft coupled to the sun gear 1103, which causes the sun gear to rotate together with the ring gear. The second synchronizer 1112 remains in the position shown in FIG. 12 grounding the ring gear 1110 of the second planetary gearset. This means that the ring gear of second planetary is maintained in place relative to ground and is not allowed to rotate with respect to the other parts of the transmission. The sun gear of 1107 of the second planetary gearset accepts input torque from the carrier 1104 of the first planetary gearset at 1117. With the ring gear 1110 locked in place and unable to move relative to the carrier 1108, the carrier 1108 may thus be driven to rotate within the ring gear 1110 according to the input torque provided at the sun gear 1107. In this way power can transfer from the electric motor 1116, upstream to the first and second gearsets, and then downstream through the motor housing 1150, to provide the output torque at a second gear ratio.

Figure 14:
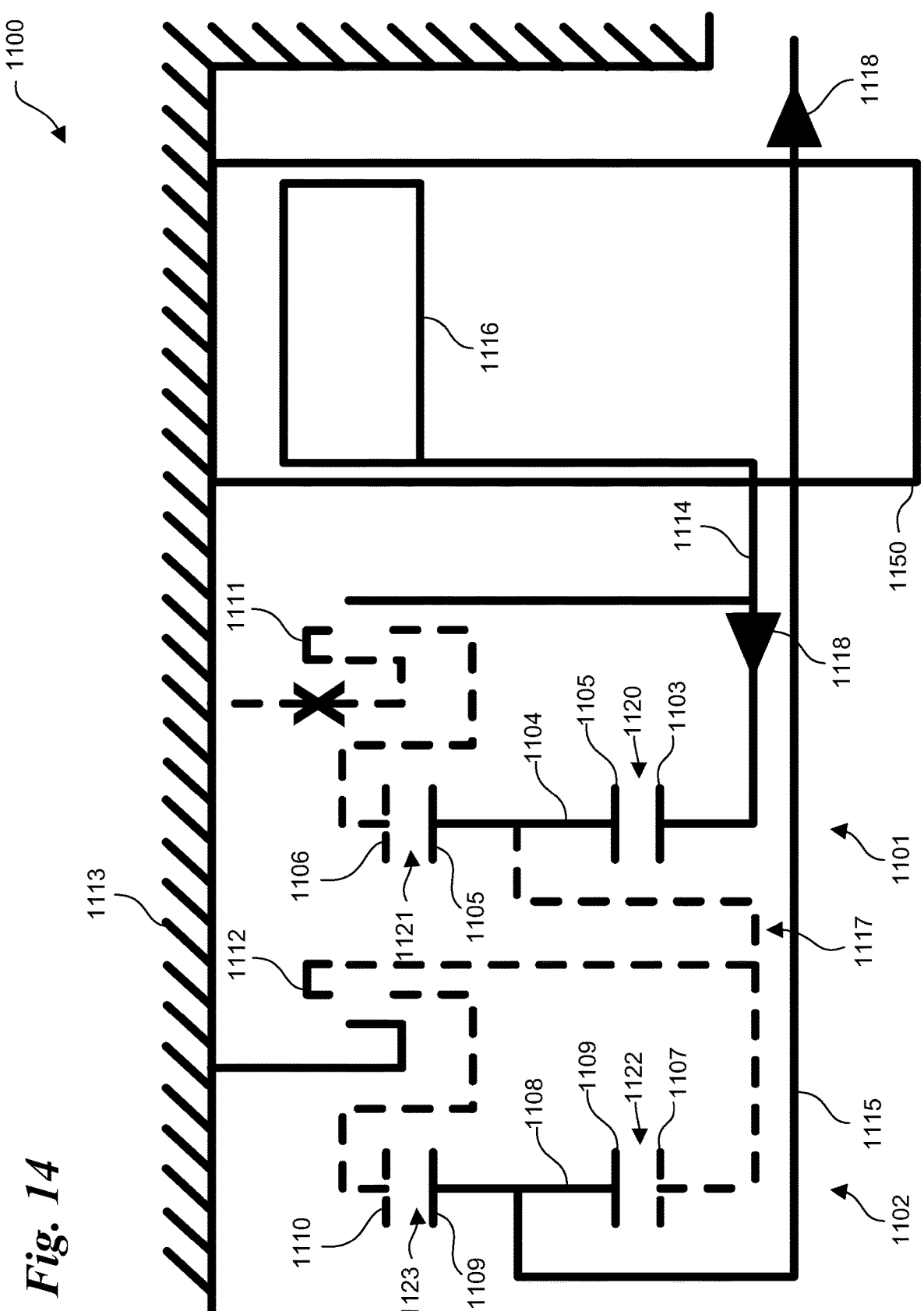
FIG. 14 is another diagram illustrating the example of FIG. 11 in operation.

In FIG. 14, the first synchronizer 1111 remains in the position shown in FIG. 12 in order to ground the ring gear 1106 of the first planetary gearset, and the second synchronizer 1112 also changes position to lock the ring gear 1110 to rotate with the sun gear 1107. This means that the ring gear of first planetary is maintained in place relative to ground and is not allowed to rotate with respect to the other parts of the transmission while input torque is received from the motor 1116 via the sun gear 1103. With the ring gear 1106 locked in place and unable to move relative to the carrier 1104, the carrier 1104 is optionally driven to rotate within the ring gear 1106 according to the input torque provided at the sun gear 1103.

Synchronizer 1112 of the second gearset is also actuated to couple the sun gear 1107 to the ring gear 1110. Torque input is provided by the input shaft coupled to the sun gear 1107, which causes the sun gear 1107 to rotate together with the ring gear 1110. In this way power optionally transfers from the electric motor, upstream to the first and second planetary gearsets, and downstream through the motor housing and to the output to provide a third gear ratio.

Figure 15:
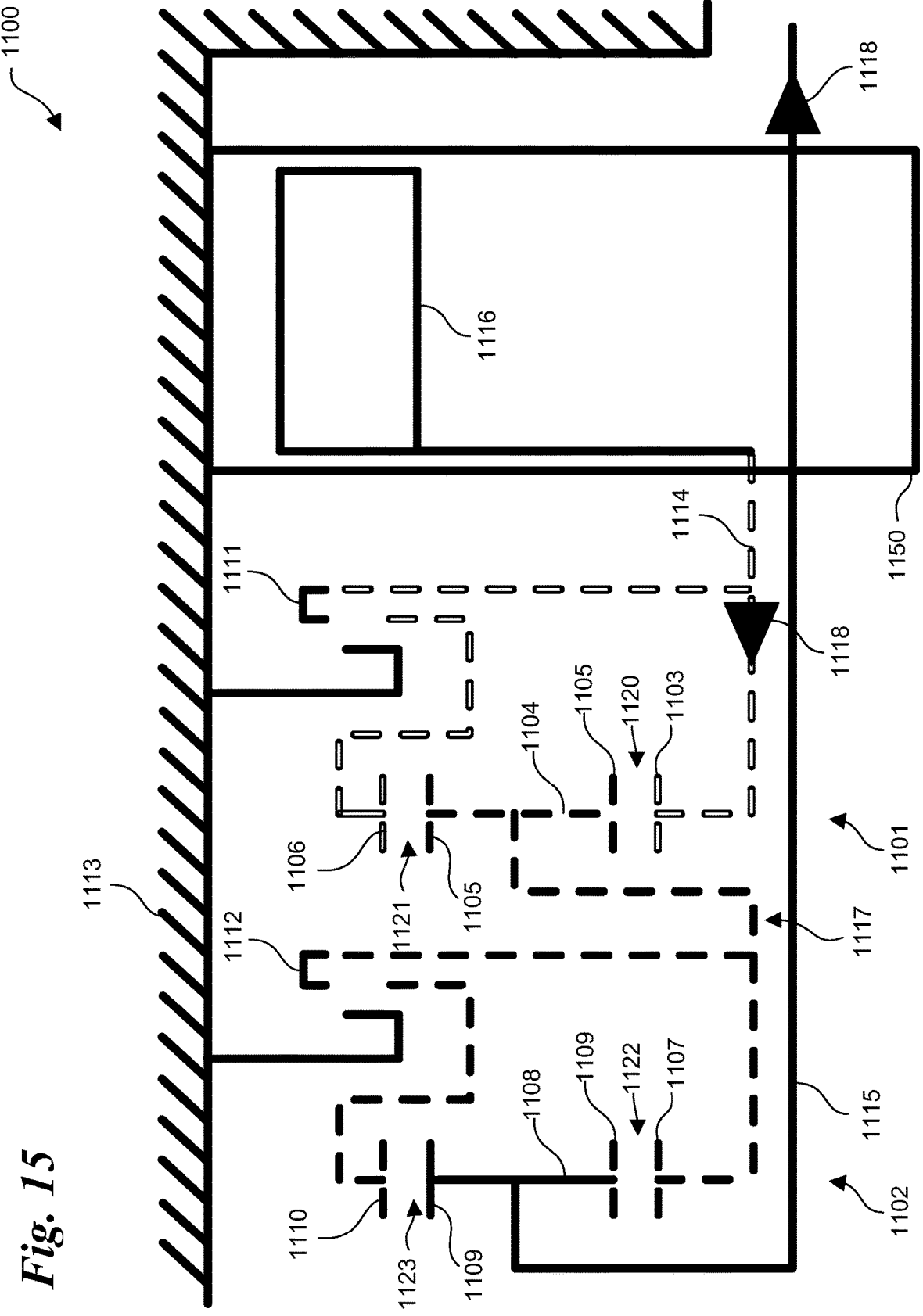
FIG. 15 is another diagram illustrating the example of FIG. 11 in operation.

In FIG. 15, the first and second synchronizers are actuated to couple the ring gears with the sun gears of the respective gearsets 1101 and 1102. The torque input is provided by the input shaft 1114 optionally coupled to the sun gear 1103 and the ring gear 1106 of the first planetary gearset. In this way power can transfer from the electric motor, upstream through the planetary gear sets, then downstream through the motor to provide output at a fourth gear ratio.

Figure 16:
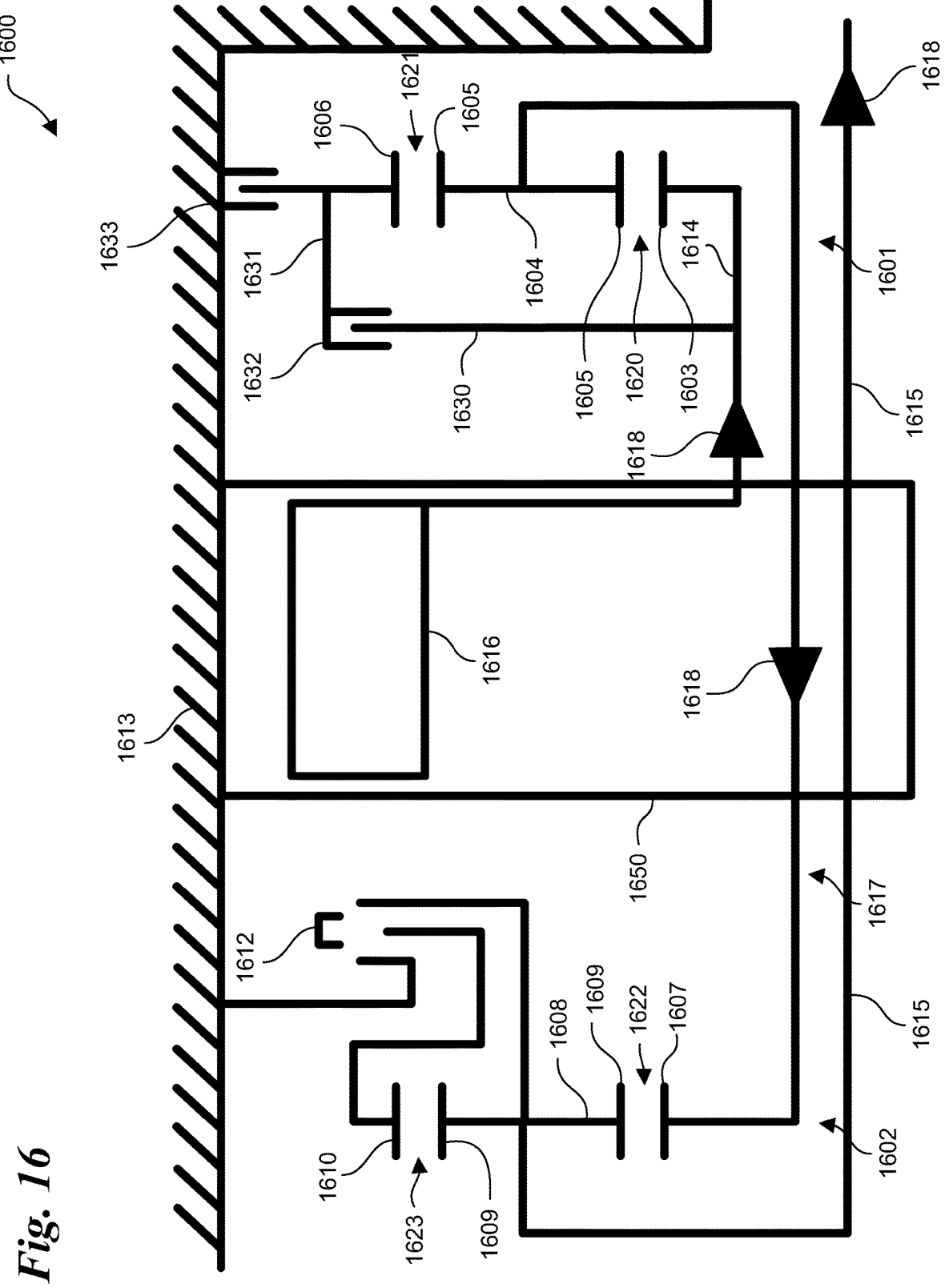
FIG. 16 is a diagram illustrating another example of the components and configuration of a drive system of the present disclosure.

Illustrated at 1600 in FIG. 16 is another optional arrangement of components that may be included in four-speed drive system or drivetrain of the present disclosure. In one aspect, the drive system 1600 optionally includes a first planetary gearset 1601 and optionally a second planetary gearset 1602. The planetary gearsets 1601 and 1602, and other drivetrain components may be mounted in an alternative configuration where one planetary is downstream of an electric motor 1616, and another planetary is upstream of the electric motor and the first planetary gearset. In another aspect, the first planetary may be upstream, and the other planetary downstream. As the present disclosure illustrates, other configurations are possible, some of which are illustrated in the present disclosure. In FIG. 16, power flows downstream from left to right in FIG. 16 according to arrows 1618 with the electric motor 1616 upstream of the first gearset 1601 and downstream of the second planetary gearset 1602. Power optionally flows opposite the arrows 1618 when, for example, the drivetrain is providing power to the electric motor 1616. This may occur in a deceleration state such as in the case where the electric motor 1616 provides regenerative braking.

An input shaft 1614 optionally provides torque from the electric motor 1616 to the first planetary gearset 1601. An output shaft 1615 optionally directs output torque from the second planetary gearset 1602 to the other downstream components of the drivetrain.

The first planetary gearset 1601 may include a sun gear 1603, a carrier 1604 with planetary gears 1605, and a ring gear 1606. In the first gearset 1601, the planetary gears 1605 are optionally arranged and configured to engage the ring gear 1606 at 1621, and the sun gear 1603 at 1620. In another aspect, the second planetary gearset 1602 may include a sun gear 1607, a carrier 1608 having planetary gears 1609, and a ring gear 1610. In another aspect, the carrier 1608 of the second planetary gearset 1602 is optionally coupled to the sun gear 1607 of the second planetary gearset 1602 at 1622. In the second gearset 1602, the planetary gears 1609 are optionally arranged and configured to engage the ring gear 1610 at 1623, and the sun gear 1607 at 1622.

The drive system 1600 optionally includes a range selector assembly that optionally uses clutches and brakes in concert with synchronizers, dog clutches, or other such positive engagement devices. A clutch 1632 and brake 1633 are operable to selectively couple the ring gear 1606 of the first planetary gearset 1601 either to the input shaft 1614 of the first planetary gearset or to ground 1613, and preferably not to both at the same time. Ground 1613 may be provided by structural aspects of the drive system such as a housing or other structural component that at least partially surround at least a portion of the drivetrain 1600. In another aspect, input shaft 1614 may be coupled to an input side 1630 of the clutch 1632, and an output side 1631 of clutch 1632 may be coupled to the ring gear 1606, and the brake 1633.

The drive system 1600 also optionally includes a synchronizer 1612 that may be operable to selectively couple the ring gear 1610 of the second planetary gearset 1602 either to the carrier 1608 of the second planetary gearset or to ground 1613. In another aspect, the sun gear 1607 of the second planetary gearset 1602 is optionally coupled to the carrier 1604 of the first planetary gear set via a shaft at 1617. The carrier 1608 of the second planetary gearset 1602 is optionally coupled to an output shaft 1615.

In another aspect, the first and second planetary gear sets 1601, and 1602 of the drive system 1600 optionally define substantially similar gear ratios. In one example, a first gear ratio defined by the first planetary gearset 1601 and a second gear ratio defined by the second planetary gearset 1602 differ by less than 0.01:1, by less than 0.5:1, or by less than 2:1. For example, gearset 1601 may define a gear ratio of 3:1 and gearset 1602 may define a gear ratio of 3:1 making the two gear ratios equal. In another example, planetary gearset 1601 defines a gear ratio of 4.5:1 and gearset 1602 may define a gear ratio of 4.2:1 making the two gear ratios substantially similar and differing by less than 0.5:1.

In another aspect, a drivetrain of the present disclosure, such as the one shown in FIG. 16 is optionally configured to be operated such that one or more clutches, brakes, and synchronizers may be separately and individually actuated to provide four forward, and four reverse gears. A neutral gear may be provided by disengaging these components or actuating them in a neutral mode of operation. A wide range of gear ratios may be achieved based on the power output available from an engine or motor or other prime mover coupled to the drive system, and the sizes and arrangement of the gears in planetary gear sets in the drive system. Additional reverse gear ratios are optionally available by reversing the rotation of the input shaft 1614 such as, by reversing the rotation of the electric motor 1616. The rotational direction of the input shaft 1614 is optionally directly linked to the rotational direction of the output shaft 1615 by the drive system 1600 to facilitate driving a vehicle in reverse.

In another aspect, the clutch 1632 and brake 1633 may be optionally implemented with one or more frictional elements selectively urged into direct contact with one another. In another aspect, the brakes and clutches of the present disclosure, such as those shown in FIG. 16, may include one or more dog clutches using rotating components that engage by interference or clearance fit to reduce or eliminate the opportunity for slip. A dog clutch configuration may be useable either in place of the frictional components described above, or along with them. In another aspect, brake 1633, or the clutches 1632 optionally include a Selectable One Way Clutch (SOWC).

The synchronizer, clutch, and brake of the range selector assemblies illustrated in drive system 1600 may be selectively activated and deactivated in concert with one another to define separate operating modes providing multiple forward and reverse gears. For example, the range selection assemblies may operate in a first mode of operation where the brake is actuated without actuating the clutches. In another example, the clutch may be actuated when the brake is disengaged thus providing a second mode of operation. In another aspect, four gear ranges may be obtained by linking the output of the first planetary as the input of the second planetary, an example of which is shown in FIG. 16. An example of such a configuration is illustrated in Table 4 below:

TABLE 4

| | | Clutch | Brake | Synchronizer 1612 | |
|---|---|---|---|---|---|
| | | 1632 | 1633 | 1st Mode | 2nd Mode |
| Gear | 1st | | X | | X |
| | 2nd | X | | | X |
| | 3rd | | X | X | |
| | 4th | X | | X | |

The gear ratios shown may be achieved in the forward or reverse direction, with the reverse direction achieved by maintaining the above mentioned configuration of clutches and brakes while receiving reverse input torque on input shaft 1614 in a direction of rotation that is opposite of forward input torque.

A first gear is optionally defined when the ring gear 1606 of the first planetary gearset 1601 and the ring gear 1610 of the second planetary gearset 1602 are "grounded", i.e. coupled to ground 1613. In one example, this is achievable by actuating both the brakes 1633, disengaging clutch 1632, and actuating the synchronizer 1612 in a second mode. The resulting first gear ratio of the four separate gear ratios may be of any suitable ratio such as less than or equal to 7:1, greater than 7:1, greater than 10:1, greater than 15:1, greater than 20:1, or more.

In another aspect, a second gear is optionally defined by coupling the ring gear 1606 of the first planetary gearset 1601 to the input shaft 1614, while the ring gear 1610 of the second planetary gearset 1602 is coupled to ground 1613. In one example, this is achievable by actuating the clutch 1632, deactivating brake 1633, and engaging (or maintaining) the synchronizer 1612 in a second mode of operation to ground the ring gear 1610 of the second gear set. This may provide a second gear of any suitable ratio such as less than or equal to 5:1, greater than 5:1, greater than 8:1, greater than 10:1, greater than 15:1, or more.

A third gear ratio of the four separate gear ratios may be achieved by coupling the ring gear 1606 of the first planetary gearset 1601 to ground 1613 and coupling the ring gear 1610 of the second planetary gearset 1602 to the carrier 1608 of the second planetary gearset 1602. This may be achieved, in the drivetrain 1600, by disengaging clutch 1632 and engaging brake 1633, and engaging synchronizer 1612 in the first mode of operation. Any suitable ratio may be used for third gear such as less than or equal to 3:1, greater than 3:1, greater than 6:1, greater than 8:1, greater than 10:1, or more.

A fourth gear ratio of the four separate gear ratios may be achieved by coupling the ring gear 1606 of the first planetary gearset 1601 to the input shaft 1614, and coupling the ring gear 1610 of the second planetary gearset 1602 to the carrier 1608 of the second planetary gearset. This may be achieved, in the drivetrain 600, by engaging clutch 1632, disengaging brake 1633, and actuating the synchronizer 1612 in the first mode of operation. Any suitable ratio may be used for fourth gear such as less than or equal to 1:1, greater than 1:1, greater than 1.4:1, greater than 2:1, greater than 4:1, or more.

Examples of the drivetrain concepts disclosed in FIG. 16 are shown in operation in FIGS. 17-20. In these figures, parts indicated with similar dashed lines are constrained to rotate together, while parts in solid lines rotate independently or not at all. For example, parts marked with an "X" are constrained from rotating and are thus grounded.

Figure 17:
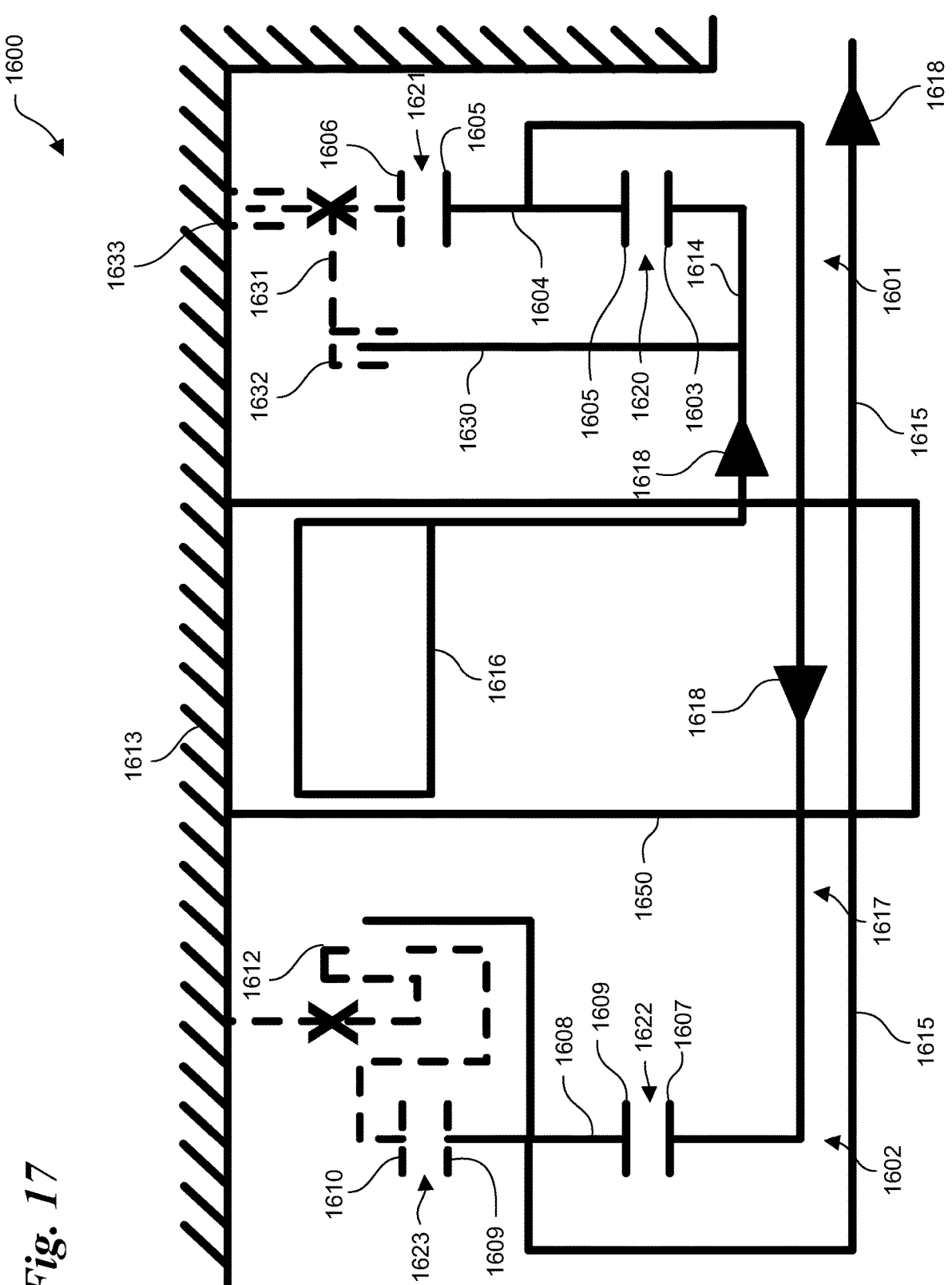
FIG. 17 is a diagram illustrating the example of FIG. 16 in operation.

In FIG. 17, the brake 1633 is actuated to ground the ring gears of the first planetary gearset 1601, and the synchronizer 1612 is actuated in the "grounded" position. The ring gears of both planetary gearsets are maintained in place relative to ground and are constrained from rotating with respect to the other parts of the transmission. The sun gear of both planetary gearsets provides input torque to each planetary gearset, and the carrier and planetary gears of both gearsets are thus allowed to rotate freely in relation to the ring gear and sun gear of each gearset. Power optionally transfers from the electric motor, downstream to the first gearset, then upstream through the motor housing 1650, and to the second planetary gear set 1602. Output power to the remaining downstream drivetrain components is provided to from the carrier of the second planetary gearset.

Figure 18:
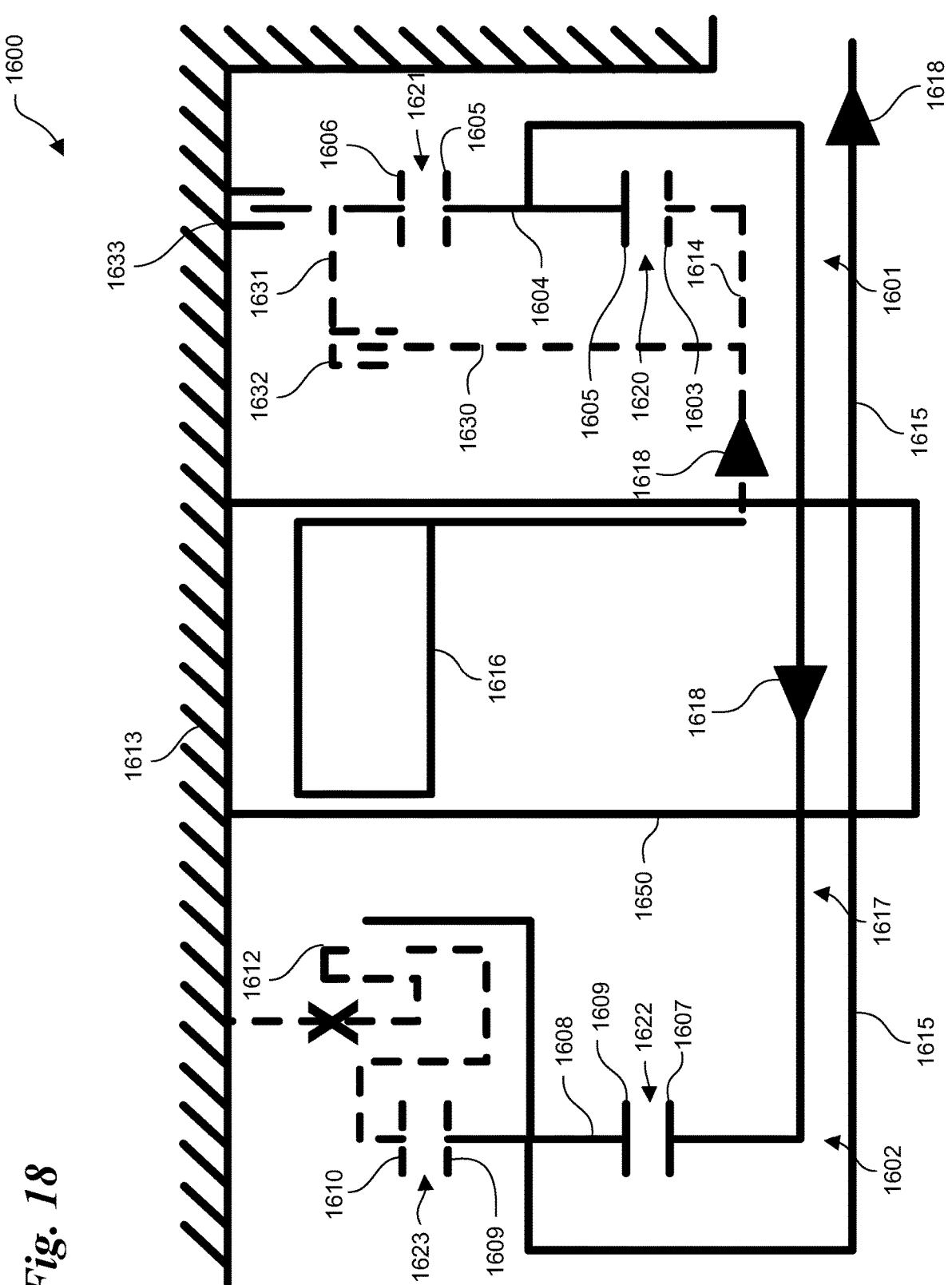
FIG. 18 is another diagram illustrating the example of FIG. 16 in operation.

In another aspect shown in FIG. 18, a second gear is optionally defined by coupling the ring gear 1606 to the input shaft 1614 of the first planetary gearset, while the ring gear 1610 of the second planetary gearset 1602 is coupled to ground 1613 by the synchronizer. In one example, this is achievable by actuating the clutch 1632, deactivating the brake 1633, and engaging (or maintaining) the synchronizer 1612 in the second ("grounded") mode of operation. This may provide a second gear of any suitable ratio such as less than or equal to 5:1, greater than 5:1, greater than 8:1, greater than 10:1, greater than 15:1, or more.

Figure 19:
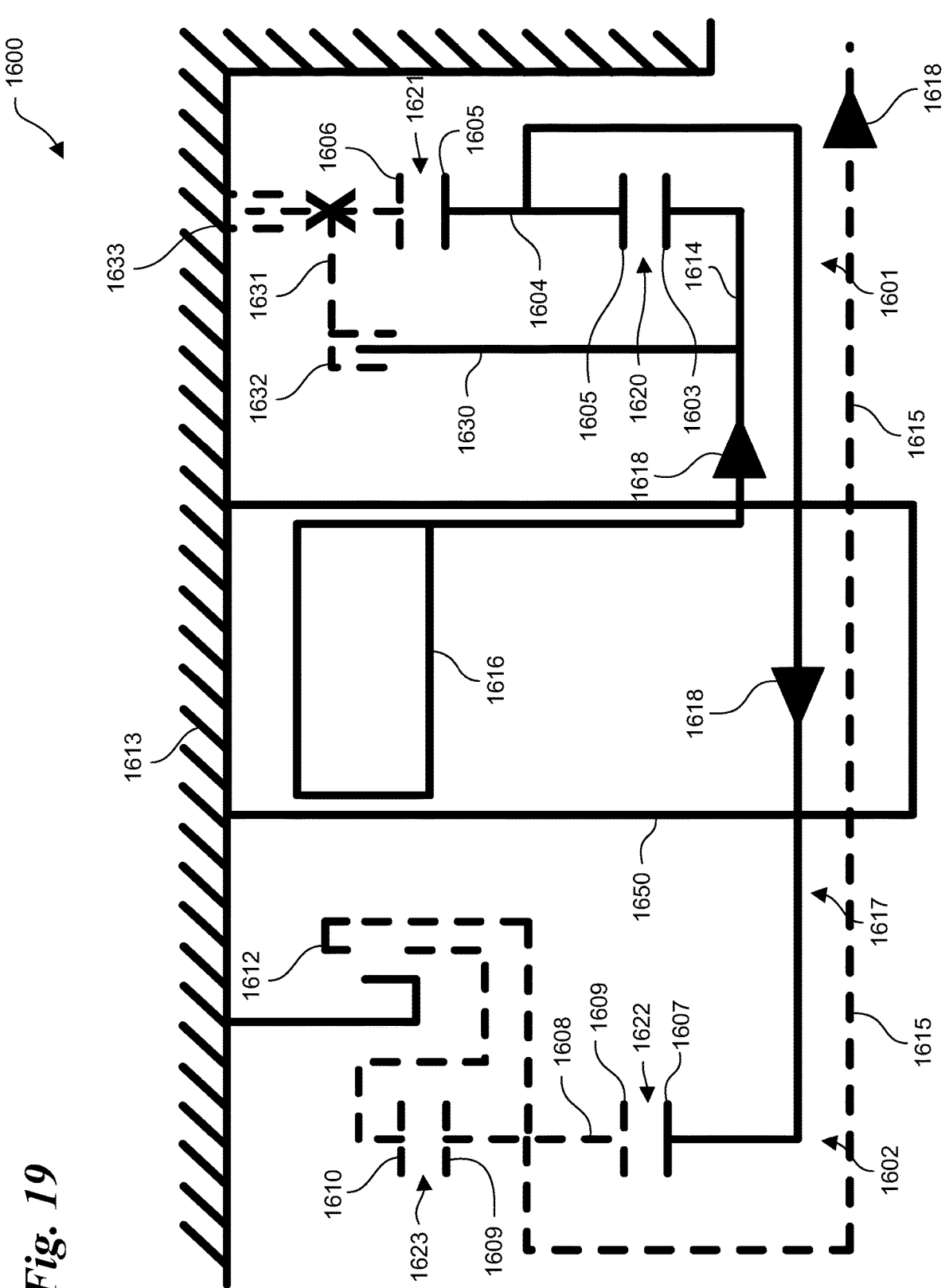
FIG. 19 is another diagram illustrating the example of FIG. 16 in operation.

Illustrated in FIG. 19 is a third gear ratio of the four separate gear ratios which may be achieved by coupling the ring gear 1606 of the first planetary gearset 1601 to ground 1613 and coupling the ring gear 1610 of the second planetary gearset 1602 to the carrier 1608 of the second planetary gearset 1602. This may be achieved, in the drivetrain 1600, by disengaging clutch 1632 and engaging brake 1633, and engaging synchronizer 1612 in the first mode of operation. Any suitable ratio may be used for third gear such as less than or equal to 3:1, greater than 3:1, greater than 6:1, greater than 8:1, greater than 10:1, or more.

Figure 20:
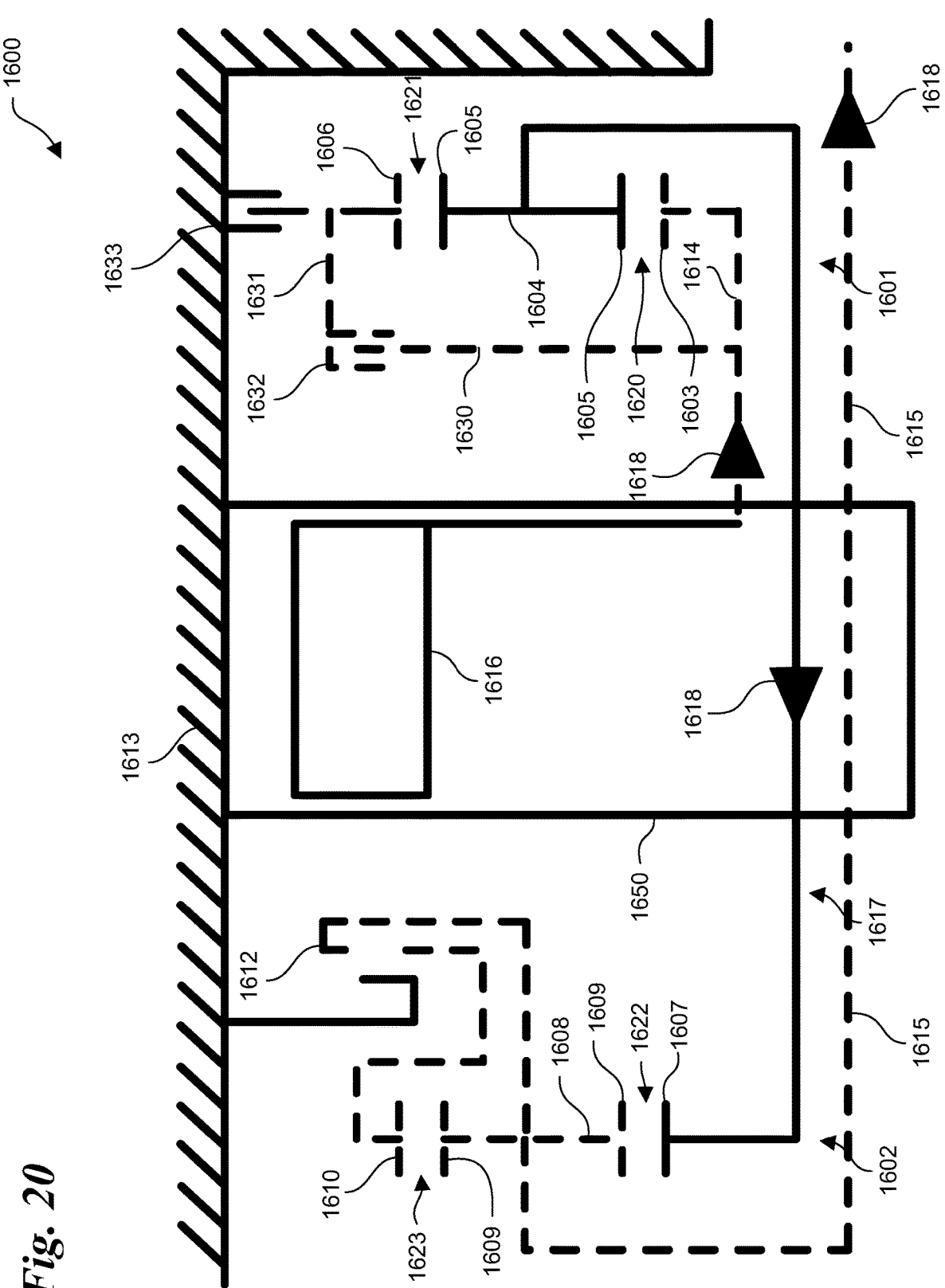
FIG. 20 is another diagram illustrating the example of FIG. 16 in operation.

As shown in FIG. 20, a fourth gear ratio of the four separate gear ratios may be achieved by coupling the ring gear 1606 of the first planetary gearset 1601 to the input shaft 1614, and coupling the ring gear 1610 of the second planetary gearset 1602 to the carrier 1608 of the second planetary gearset 1602. This may be achieved, in the drivetrain 1600, by engaging clutch 1632, disengaging brake 1633, and actuating (or maintain) the synchronizer 1612 in a first mode of operation. The fourth gear ratio may thus be 1:1 thereby achieving direct drive from the motor to the output shaft.

As discussed herein throughout, the drivetrain of the present disclosure is configured to be operated such that clutches, brakes, and synchronizers may be individually actuated in concert to provide four forward, and the reverse gears. A wide range of gear ratios are available according to the power output available from the electric motor and the arrangement of the gears in planetary gear sets.

Figure 21:
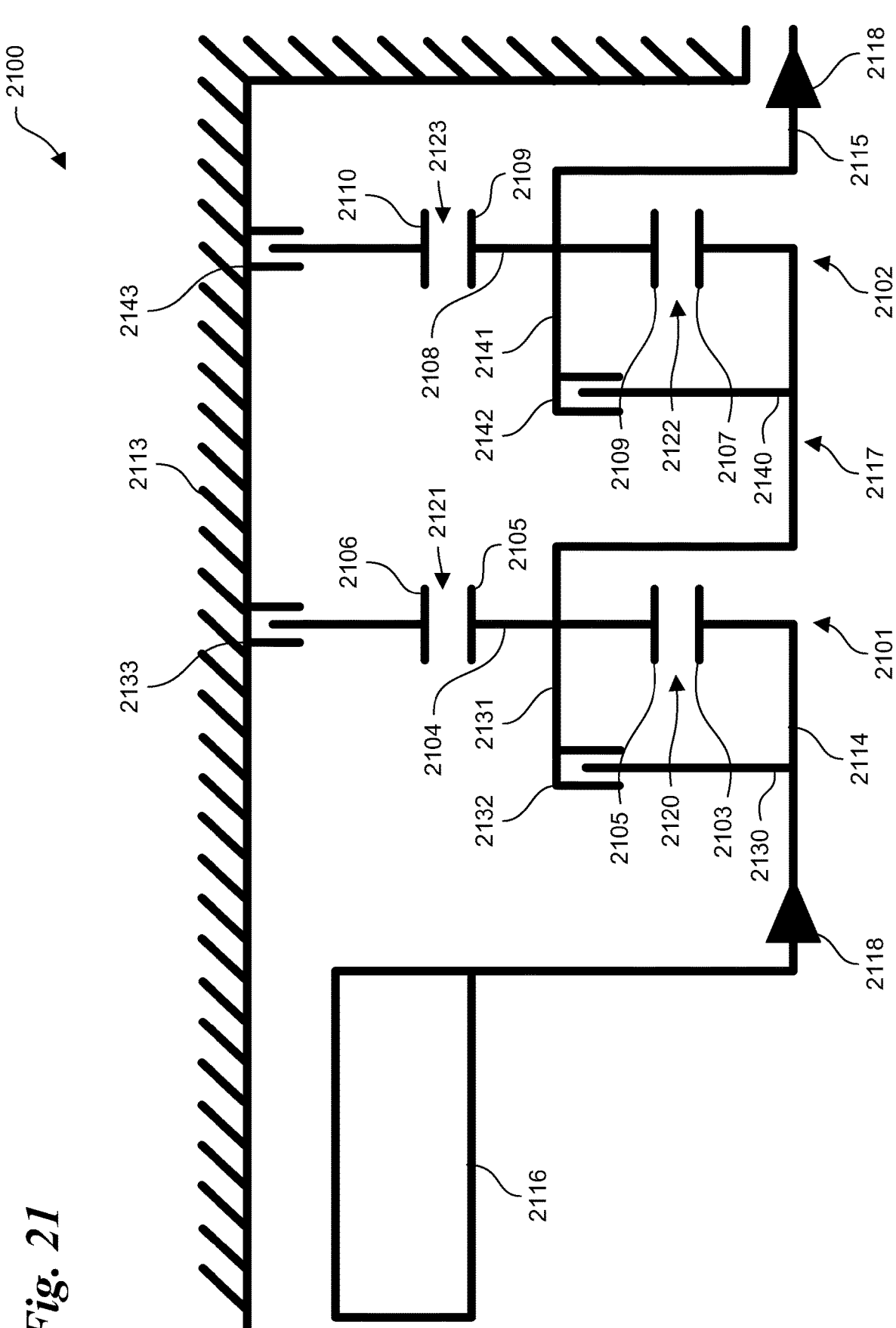
FIG. 21 is a diagram illustrating another example of the components and configuration of a drive system of the present disclosure.

Illustrated at 2100 in FIG. 21 is another example of components that may be included in four-speed drive system or drivetrain of the present disclosure. In one aspect, the drive system 2100 optionally includes a first planetary gearset 2101 and optionally a second planetary gearset 2102. The planetary gearsets 2101 and 2102 may be mounted upstream or downstream of, or optionally interspersed around an electric motor 2116 or other drivetrain components. A wide range of configurations are possible, some of which are illustrated in the present disclosure, such as in FIGS. 31-40.

Power flows downstream from left to right in FIG. 21 according to arrows 2118 with the electric motor 2116 optionally upstream of the gearsets 2101 and 2102, an input shaft 2114, and an output shaft 2115. In another aspect, power optionally flows in a direction opposite the arrows 2118 when the drivetrain is providing power to the electric motor 2116. This may occur in a deceleration state such as when earth engaging elements (e.g. wheels, tracks, etc.) provide regenerative braking torque through the gearsets to the motor.

The first planetary gearset 2101 may include a sun gear 2103, a carrier 2104 with planetary gears 2105, and a ring gear 2106. In the first gearset 2101, the planetary gears 2105 are optionally arranged and configured to engage the ring gear 2106 at 2121, and the sun gear 2103 at 2120. In another aspect, the second planetary gearset 2102 may include a sun gear 2107, a carrier 2108 having planetary gears 2109, and a ring gear 2110. In another aspect, the carrier 2108 of the second planetary gearset 2102 is optionally coupled to the sun gear 2107 of the second planetary gearset 2102 at 2122. In the second gearset 2102, the planetary gears 2109 are optionally arranged and configured to engage the ring gear 2110 at 2123, and the sun gear 2107 at 2122.

The drive system 2100 optionally includes a range selector assembly that uses clutches and brakes and/or synchronizers. In another aspect, illustrated herein elsewhere, clutches, brakes, and synchronizers may be used together. A first clutch 2132 and first brake 2133 are operable to selectively couple the ring gear 2106 of the first planetary gearset 2101 to ground 2113. In one example, the ground 2113 may include, or be provided by, structural aspects of the drive system such as a housing or other structural component that at least partially surrounds at least a portion of the drivetrain 2100. In another aspect, input shaft 2114 may be coupled to an input side 2130 of the first clutch 2132, and an output side 2131 of clutch 2132 may be coupled to the carrier 2104.

A second clutch 2142 and a second brake 2143 may be included in the drivetrain 2100 and are optionally configured to selectively couple the ring gear 2110 of the second planetary gearset 2102 to ground 2113. The clutch 2142 may include an input side 2140 coupled to the carrier of the first gearset 2104 by a linkage at 2117 such as an in the case of an intermediary shaft or other suitable mechanical linkage or torque transferring element. An output side 2141 of the second clutch 2142 may be coupled to the carrier 2108 of the second gearset 2012. In another aspect, the sun gear 2103 of the first planetary gearset 2101 is optionally coupled to an input shaft 2114, and the carrier 2108 of the second planetary gearset 2102 is optionally coupled to an output shaft 2115.

In another aspect, the first and second planetary gear sets 2101, and 2102 of the drive system 2100 optionally define substantially similar gear ratios. In one example, a first gear ratio defined by the first planetary gearset 2101 and a second gear ratio defined by the second planetary gearset 2102 differ by less than 0.01:1, by less than 0.5:1, or by less than 2:1. For example, gearset 2101 may define a gear ratio of 3:1 and gearset 2102 may define a gear ratio of 3:1 making the two gear ratios equal. In another example, planetary gearset 2101 defines a gear ratio of 4.5:1 and gearset 2102 may define a gear ratio of 4.2:1 making the two gear ratios substantially similar and differing by less than 0.5:1.

In another aspect, a drivetrain of the present disclosure, such as the one shown in FIG. 21 is optionally configured to be operated such that one or more clutches and brakes may be separately and individually actuated to provide four forward, and four reverse gears. A neutral gear may be provided by disengaging these clutches and brakes. A wide range of gear ratios may be achieved based on the power output available from an engine or motor or other prime mover coupled to the drive system, and the sizes and arrangement of the gears in planetary gear sets in the drive system.

For example, the drive system 2100 of the present disclosure is optionally configured with separate range selection assemblies that are configured to selectively engage a ring gear to ground, and/or a carrier to an input shaft. These range selection assemblies may include a clutch, a brake, or both, and may be independently actuated separately to provide multiple separate speed ratios of the input shaft 2114 relative to the output shaft 2115. Additional reverse gear ratios are optionally available by reversing the rotation of the input shaft 2114 such as, by reversing the rotational direction of the electric motor 2116. The rotational direction of the input shaft 2114 is optionally directly linked to the rotational direction of the output shaft 2115 by the drive system 2100 to facilitate driving a vehicle in reverse.

In another aspect, the first and second clutches 2132, 2142 and the first and second brakes 2133, and 2143 may be optionally implemented with one or more frictional elements selectively pressed into contact with one another. In another aspect, the brakes and clutches of the range selector assemblies of the present disclosure, such as those shown in FIG. 21, may include one or more dog clutches having rotating components that engage by interference or clearance fit to reduce or eliminate slip that may be inherent in a friction clutch or brake. A dog clutch configuration may be useable either in place of the frictional components described above, or along with them. In another aspect, first brake 2133, and second brake 2143, or clutches 2132, and 2142 optionally include a Selectable One Way Clutch (SOWC).

The clutches and brakes of the range selector assemblies illustrated in drive system 2100 may be selectively activated and deactivated in concert with one another to define separate operating modes providing multiple forward and reverse gears. For example, the range selection assemblies may operate in a first mode of operation where the brake is actuated without actuating the clutches. In another example, the clutch may be actuated when the brake is disengaged thus providing a second mode of operation. In another aspect, four gear ranges may be obtained by linking the output of the first planetary as the input of the second planetary, an example of which is shown in FIG. 21. An example of such a configuration is illustrated in Table 5 below:

TABLE 5

|  |  | Clutch 2132 | Brake 2133 | Clutch 2142 | Brake 2143 |
|---|---|---|---|---|---|
| Gear | 1st |  | X |  | X |
|  | 2nd | X |  |  | X |
|  | 3rd |  | X | X |  |
|  | 4th | X |  | X |  |

These gear ratios may be achieved in the forward or reverse direction, with the reverse direction achieved by maintaining the disclosed configuration of clutches and brakes while receiving reverse input torque on input shaft 2114 in a direction of rotation that is opposite of forward input torque.

A first gear is optionally defined when the ring gear 2106 of the first planetary gearset 2101 and the ring gear 2110 of the second planetary gearset 2102 are "grounded", i.e. coupled to ground 2113. In one example, this is achievable by actuating both the first and second brakes 2133, 2143 and disengaging clutches 2132 and 2142. The resulting first gear ratio of the four separate gear ratios may be of any suitable ratio such as less than or equal to 7:1, greater than 7:1, greater than 10:1, greater than 15:1, greater than 20:1, or more.

In another aspect, a second gear is optionally defined by coupling the carrier 2104 of the first planetary gearset 2101 to the input shaft 2114 of the first planetary gearset, while the ring gear 2110 of the second planetary gearset 2102 is coupled to ground 2113. In one example, this is achievable by actuating the clutch 2132, deactivating brake 2133, and engaging brake 2143, but not clutch 2142. This may provide a second gear of any suitable ratio such as less than or equal to 5:1, greater than 5:1, greater than 8:1, greater than 10:1, greater than 15:1, or more.

A third gear ratio of the four separate gear ratios may be achieved by coupling the ring gear 2106 of the first planetary gearset 2101 to ground 2113 and coupling the input shaft 2117 of the second planetary gearset 2102 to the carrier 2104 of the first planetary gearset. This may be achieved, in the drivetrain 2100, by disengaging clutch 2132 and engaging brake 2133, and engaging clutch 2142 and disengaging brake 2143. Any suitable ratio may be the result for third gear such as less than or equal to 3:1, greater than 3:1, greater than 6:1, greater than 8:1, greater than 10:1, or more.

A fourth gear ratio of the four separate gear ratios may be achieved by coupling the carrier 2104 of the first planetary gearset 2101 to the input shaft 2114, and coupling the carrier 2108 of the second planetary gearset 2102 to the carrier 2104 of the first planetary gearset via the input shaft 2117. This may be achieved, in the drivetrain 2100, by engaging clutch 2132, disengaging brake 2133, engaging clutch 2142, and disengaging brake 2143. A ratio of 1:1 may thus be obtained providing a "direct drive" scenario between the electric motor and the output shaft where both rotate at the same rate.

Examples of the drivetrain concepts disclosed in FIG. 21 are shown in operation in FIGS. 22-25. In these figures, parts indicated with similar dashed lines are constrained to rotate together, while parts in solid lines rotate independently or not at all. For example, parts marked with an "X" are constrained from rotating and are thus grounded.

Figure 22:
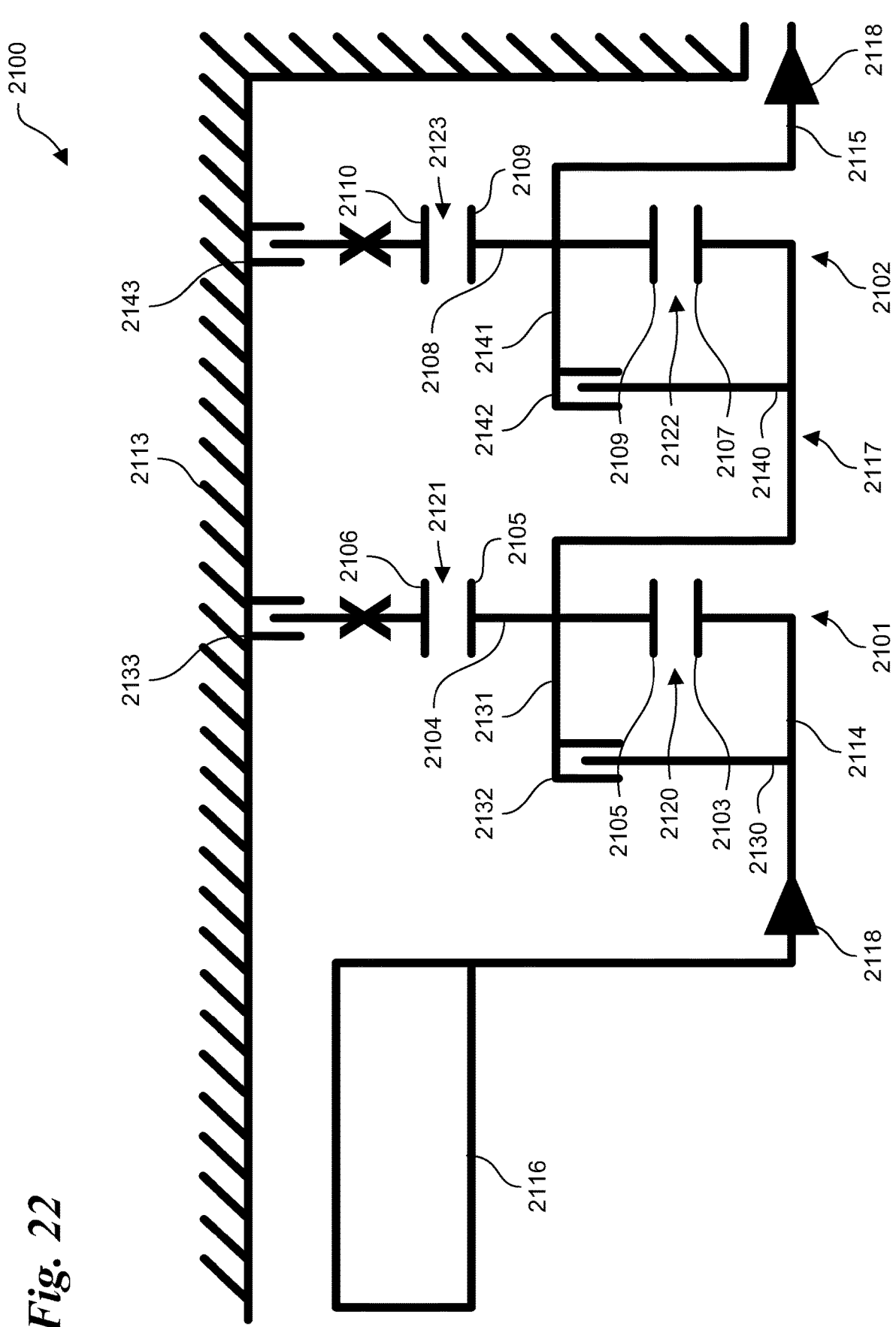
FIG. 22 is a diagram illustrating the example of FIG. 21 in operation.

In FIG. 22, the first and second brakes are actuated to ground the ring gears of both of the planetary gearsets 2101 and 2102. The ring gears of both planetary gearsets are maintained in place relative to ground and are not allowed to rotate with respect to the other parts of the transmission. The sun gear of both planetary gearsets provides input torque to each planetary gearset, and the carrier and planetary gears of both gearsets are thus allowed to rotate freely in relation to the ring gear and sun gear of each gearset. Power optionally transfers from the electric motor, downstream through the transmission, to the output shaft to provide a first gear ratio. As noted above, the same gear ratio may be obtained when power flows upstream to the motor such as in the case of regenerative braking.

Figure 23:
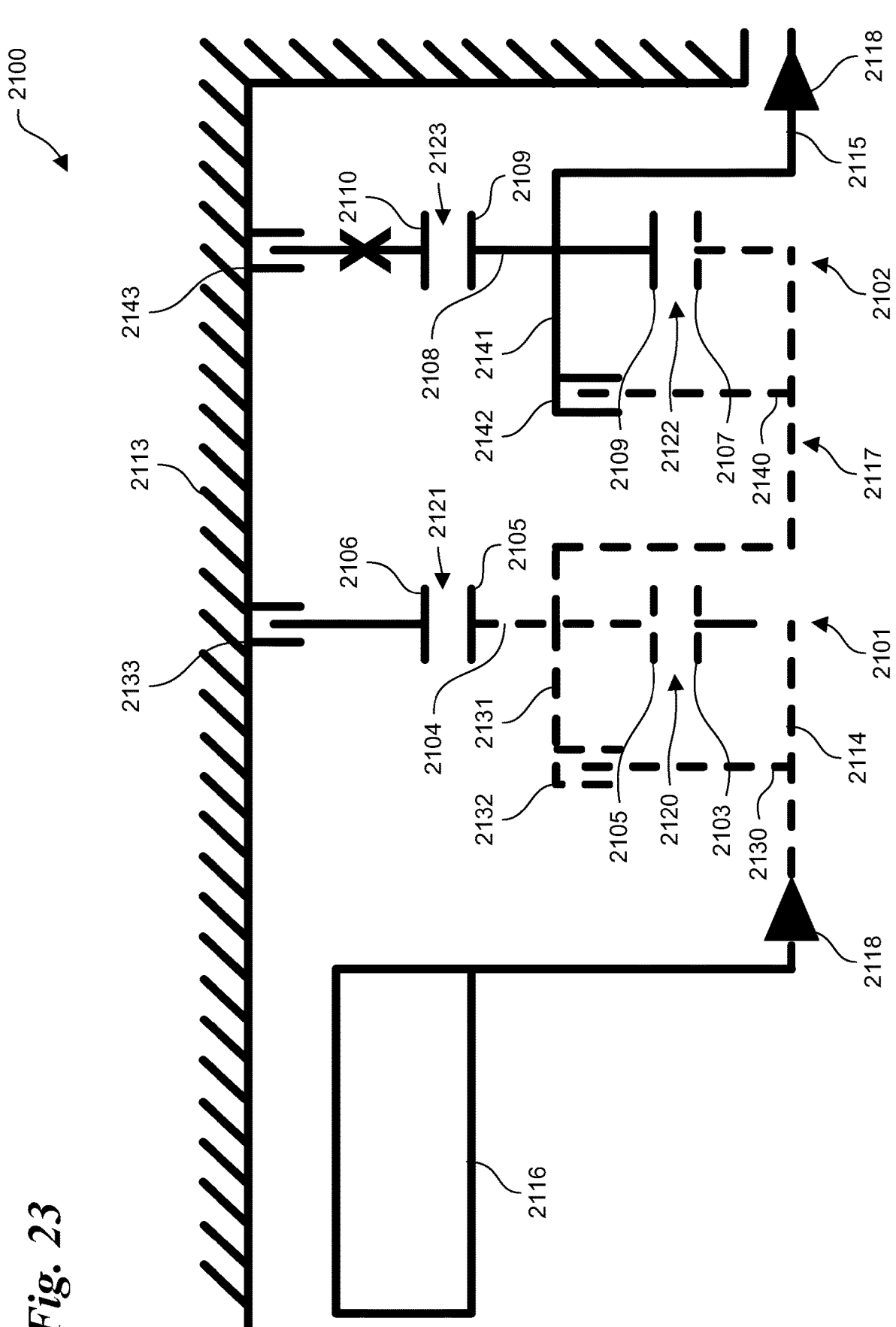
FIG. 23 is another diagram illustrating the example of FIG. 21 in operation.

In another aspect shown in FIG. 23, a second gear is optionally defined by coupling together the carrier 2104 and the input shaft 2114 of the first planetary gearset 2101, while the ring gear 2110 of the second planetary gearset 2102 is coupled to ground 2113. In one example, this is achievable by actuating the clutch 2132, deactivating brake 2133, and engaging brake 2143, but not clutch 2142. This may provide a second gear of any suitable ratio such as less than or equal to 5:1, greater than 5:1, greater than 8:1, greater than 10:1, greater than 15:1, or more.

Figure 24:
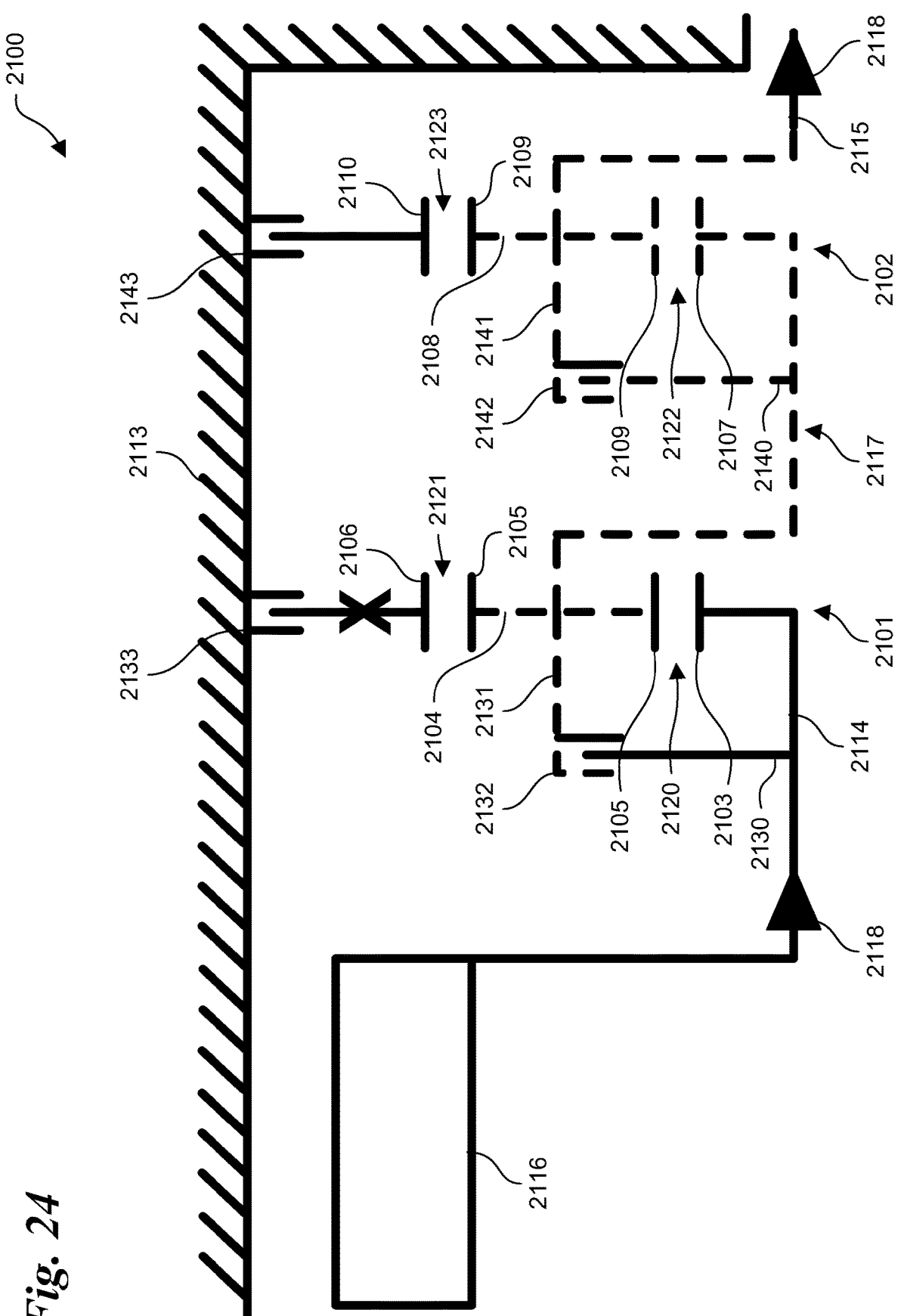
FIG. 24 is another diagram illustrating the example of FIG. 21 in operation.

Illustrated in FIG. 24 is a third gear ratio of the four separate gear ratios which may be achieved by coupling the ring gear 2106 of the first planetary gearset 2101 to ground 2113 and coupling the carrier 2108 and sun gear 2107 of the second planetary gearset 2102 to the carrier 2104 and of the first planetary gearset. This may be achieved, in the drivetrain 2100, by disengaging clutch 2132 and engaging brake 2133, and engaging clutch 2142 and disengaging brake 2143. Any suitable ratio may be used for third gear such as less than or equal to 3:1, greater than 3:1, greater than 6:1, greater than 8:1, greater than 10:1, or more.

Figure 25:
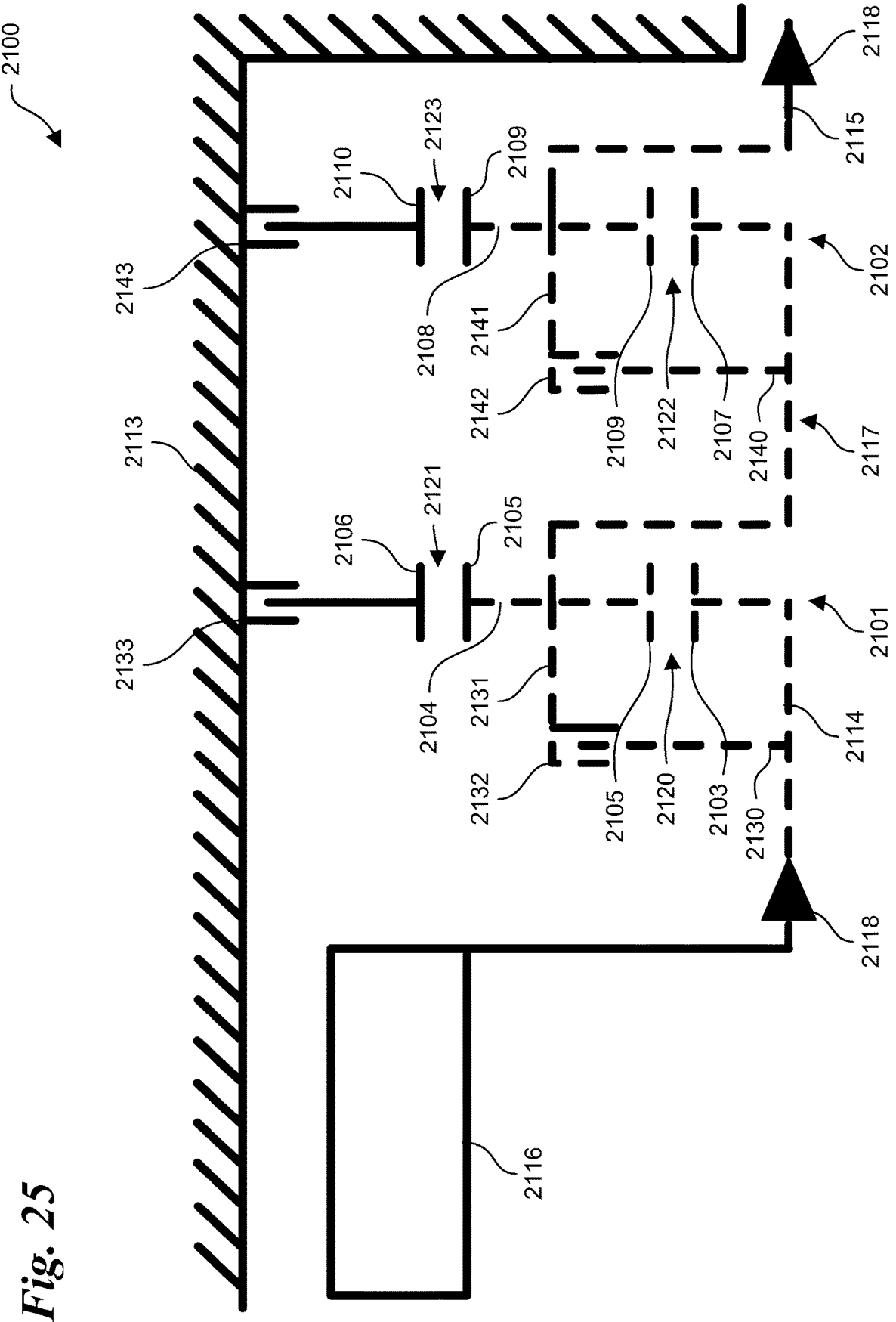
FIG. 25 is another diagram illustrating the example of FIG. 21 in operation.

As shown in FIG. 25, a fourth gear ratio of the four separate gear ratios may be achieved by coupling the ring gear 2106 of the first planetary gearset 2101 to the input shaft 2114, and coupling the ring gear 2110 of the second planetary gearset 2102 to the carrier 2104 of the first planetary gearset. This may be achieved, in the drivetrain 2100, by engaging clutch 2132, disengaging brake 2133, engaging clutch 2142, and disengaging brake 2143. A ratio of 1:1 may thus be obtained.

Figure 26:
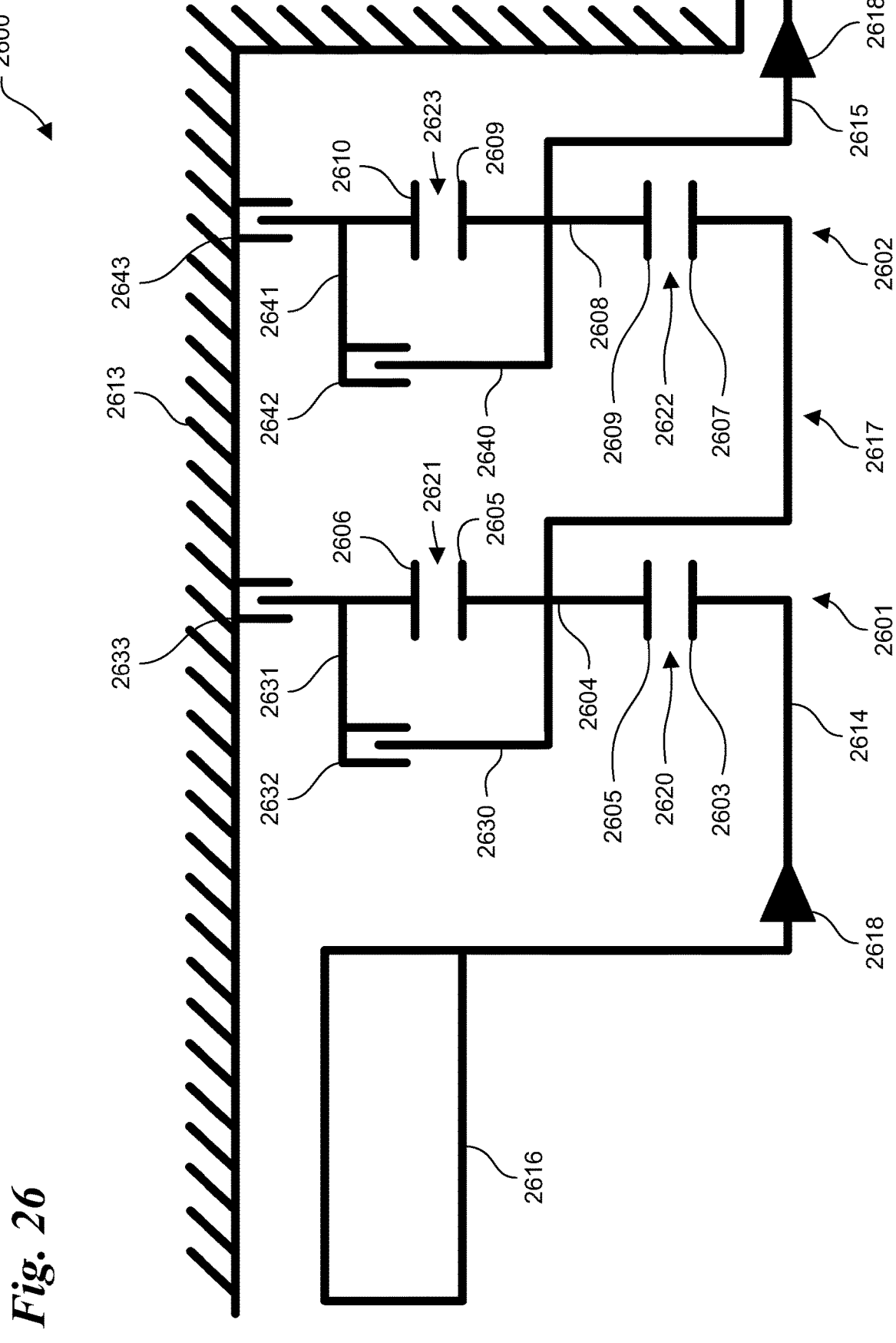
FIG. 26 is a diagram illustrating another example of the components and configuration of a drive system of the present disclosure.

Illustrated at 2600 in FIG. 26 is another example of a configuration of components that may be included in a four-speed drive system or drivetrain of the present disclosure. In one aspect, the drive system 2600 optionally includes a first planetary gearset 2601 and optionally a second planetary gearset 2602. The planetary gearsets 2601 and 2602 may be mounted upstream, downstream, or interspersed around an electric motor 2616 or other drivetrain components as disclosed herein. A wide range of configurations are possible, some of which are illustrated in the present disclosure, such as in FIGS. 31-39.

Power flows downstream from left to right in FIG. 21 according to arrows 2618 with the electric motor 2616 optionally upstream of the gearsets 2601 and 2602, an input shaft 2614, and an output shaft 2615. In another aspect, power optionally flows in a direction opposite the arrows 2618 when the drivetrain is providing power to the electric motor 2616. This may occur in a deceleration state such as when earth engaging elements (e.g. wheels, tracks, etc.) provide regenerative braking torque through the gearsets to the motor.

The first planetary gearset 2601 may include a sun gear 2603, a carrier 2604 with planetary gears 2605, and a ring gear 2606. In the first gearset 2601, the planetary gears 2605 are optionally arranged and configured to engage the ring gear 2606 at 2621, and the sun gear 2603 at 2620. In another aspect, the second planetary gearset 2602 may include a sun gear 2607, a carrier 2608 having planetary gears 2609, and a ring gear 2610. In another aspect, the carrier 2608 of the second planetary gearset 2602 is optionally coupled to the sun gear 2607 of the second planetary gearset 2602 at 2622. In the second gearset 2602, the planetary gears 2609 are optionally arranged and configured to engage the ring gear 2610 at 2623, and the sun gear 2607 at 2622.

The drive system 2600 optionally includes a range selector assembly that may include clutches and brakes and/or synchronizers. In another example, illustrated herein elsewhere, clutches, brakes, and synchronizers may be used together. A first clutch 2632 and first brake 2633 are operable to selectively couple the ring gear 2606 of the first planetary gearset 2601 to ground 2613. In one example, the ground 2613 may include, or be provided by, structural aspects of the drive system such as a housing or other structural component that at least partially surrounds at least a portion of the drivetrain 2600. In another aspect, input shaft 2614 may be directly coupled to the sun gear 2603. An input side 2630 of the first clutch 2632 is optionally coupled to the carrier 2604, and an output side 2631 of clutch 2632 is optionally coupled to the ring gear 2606 which may be selectively coupled to ground 2613 via the brake 2633.

A second clutch 2642 and a second brake 2643 may be included in the drivetrain 2600. The brake 2643 is optionally configured to selectively couple the ring gear 2610 and the output side of clutch 2642 of the second planetary gearset 2602 to ground 2613. The clutch 2642 may include an input side 2640 that is coupled to the carrier 2608 of the second gearset 2604. In another aspect, the sun gear 2603 of the first planetary gearset 2601 is optionally coupled to an input shaft 2614, and the carrier 2608 of the second planetary gearset 2602 is optionally coupled to an output shaft 2615.

In another aspect, the first and second planetary gear sets 2601, and 2602 of the drive system 2600 optionally define multiple gear ratios that may be substantially similar. In one example, a first gear ratio defined by the first planetary gearset 2601 and a second gear ratio defined by the second planetary gearset 2602 differ by less than 0.01:1, by less than 0.5:1, or by less than 2:1. For example, gearset 2601 may define a gear ratio of 3:1 and gearset 2602 may define a gear ratio of 3:1 making the two gear ratios equal. In another example, planetary gearset 2601 defines a gear ratio of 4.5:1 and gearset 2602 may define a gear ratio of 4.2:1 making the two gear ratios substantially similar and differing by less than 0.5:1.

In another aspect, a drivetrain of the present disclosure, such as the one shown in FIG. 26 is optionally configured to be operated such that one or more clutches and brakes may be separately and individually actuated to provide four forward, and four reverse gears. A neutral gear may be provided by disengaging these clutches and brakes. A wide range of gear ratios may be achieved based on the power output available from an engine or motor or other prime mover coupled to the drive system, and the sizes and arrangement of the gears in planetary gear sets in the drive system.

For example, the drive system 2600 of the present disclosure is optionally configured with separate range selection assemblies that are configured to selectively engage a ring gear to ground, and/or a carrier to an input shaft. These range selection assemblies may include a clutch, a brake, or both, and may be independently actuated separately to provide multiple separate speed ratios of the input shaft 2614 relative to the output shaft 2615. Additional reverse gear ratios are optionally available by reversing the rotation of the input shaft 2614 such as, by reversing the rotational direction of the electric motor 2616. The rotational direction of the input shaft 2614 is optionally directly linked to the rotational direction of the output shaft 2615 by the drive system 2600 to facilitate driving a vehicle in reverse.

In another aspect, the first and second clutches 2632, 2642 and the first and second brakes 2633, and 2643 may be optionally implemented with one or more frictional elements selectively pressed into contact with one another. In another aspect, the brakes and clutches of the range selector assemblies of the present disclosure, such as those shown in FIG. 21 and elsewhere, may include one or more dog clutches having rotating components that engage by interference or clearance fit thus reducing or eliminating the opportunity for slip that may be inherent in a friction clutch or brake. A dog clutch configuration may be useable either in place of the frictional components described above, or along with them, examples of which are disclosed herein elsewhere. In another aspect, first brake 2633, and second brake 2643, or clutches 2632, and 2642 optionally include a Selectable One Way Clutch (SOWC).

The clutches and brakes of the range selector assemblies illustrated in drive system 2600 may be selectively activated and deactivated in concert with one another to define separate operating modes providing multiple forward and reverse gears. For example, the range selection assemblies may operate in a first mode of operation where the brake is actuated without actuating the clutches. In another example, the clutch may be actuated when the brake is disengaged thus providing a second mode of operation. In another aspect, four gear ranges may be obtained by linking the output of the first planetary as the input of the second planetary, an example of which is shown in FIG. 26. An example of such a configuration is illustrated in Table 6 below:

TABLE 6

|  |  | Clutch 2632 | Brake 2633 | Clutch 2642 | Brake 2643 |
|---|---|---|---|---|---|
| Gear | 1st |  | X |  | X |
|  | 2nd | X |  |  | X |
|  | 3rd |  | X | X |  |
|  | 4th | X |  | X |  |

These gear ratios may be achieved in the forward or reverse direction, with the reverse direction achieved by maintaining the disclosed configuration of clutches and brakes while receiving reverse input torque on input shaft 2614 in a direction of rotation that is opposite of forward input torque.

A first gear is optionally defined when the ring gear 2606 of the first planetary gearset 2601 and the ring gear 2610 of the second planetary gearset 2602 are "grounded", i.e. coupled to ground 2613. In one example, this is achievable by actuating both the first and second brakes 2633, 2643 and disengaging clutches 2632 and 2642. This configuration means decoupling the carriers 2604 and 2608 of the first and second planetary gearset 2601 and 2602 respectively from the ring gears 2606 and 2610 respectively, while grounding the ring gears 2606 and 2610. The resulting first gear ratio of the four separate gear ratios may be of any suitable ratio such as less than or equal to 7:1, greater than 7:1, greater than 10:1, greater than 15:1, greater than 20:1, or more.

In another aspect, a second gear is optionally defined by coupling the carrier 2604 of the first planetary gearset to the ring gear 2606, while also disengaging brake 2633 two uncouple the ring gear 2606 from the ground 2613. The carrier 2608 of the second planetary gearset 2602 is optionally uncoupled from the ring gear 2610, and the ring gear 2610 is optionally grounded by actuating the brake 2643. In this example, brake 2633 is deactivated while the brake 2643 is activated, and clutch 2632 is activated while clutch 2642 is deactivated. This may provide a second gear of any suitable ratio such as less than or equal to 5:1, greater than 5:1, greater than 8:1, greater than 10:1, greater than 15:1, or more.

A third gear ratio of the four separate gear ratios may be achieved by coupling the ring gear 2606 of the first planetary gearset 2601 to ground 2613 and coupling the ring gear 2610 of the second planetary gearset 2602 to the carrier 2604 of the first planetary gearset. This may be achieved, in the drivetrain 2600, by disengaging clutch 2632 and engaging brake 2633, and engaging clutch 2642 and disengaging brake 2643. Any suitable ratio may be the result for third gear such as less than or equal to 3:1, greater than 3:1, greater than 6:1, greater than 8:1, greater than 10:1, or more.

A fourth gear ratio of the four separate gear ratios may be achieved by coupling the carrier 2604 of the first planetary gearset 2601 to the ring gear 2606, and by coupling the carrier 2608 of the second planetary gearset 2602 to the ring gear 2610 of the second planetary gearset. This may be achieved, in the drivetrain 2600, by engaging clutch 2632, disengaging brake 2633, engaging clutch 2642, and disengaging brake 2643. A ratio of 1:1 may thus be obtained providing a "direct drive" scenario between the electric motor and the output shaft where both rotate at the same rate.

Examples of the drivetrain concepts disclosed in FIG. 26 are shown in operation in FIGS. 27-30. In these figures, parts indicated with similar dashed lines are constrained to rotate together, while parts in solid lines rotate independently or not at all. For example, parts marked with an "X" are constrained from rotating and are thus grounded.

Figure 27:
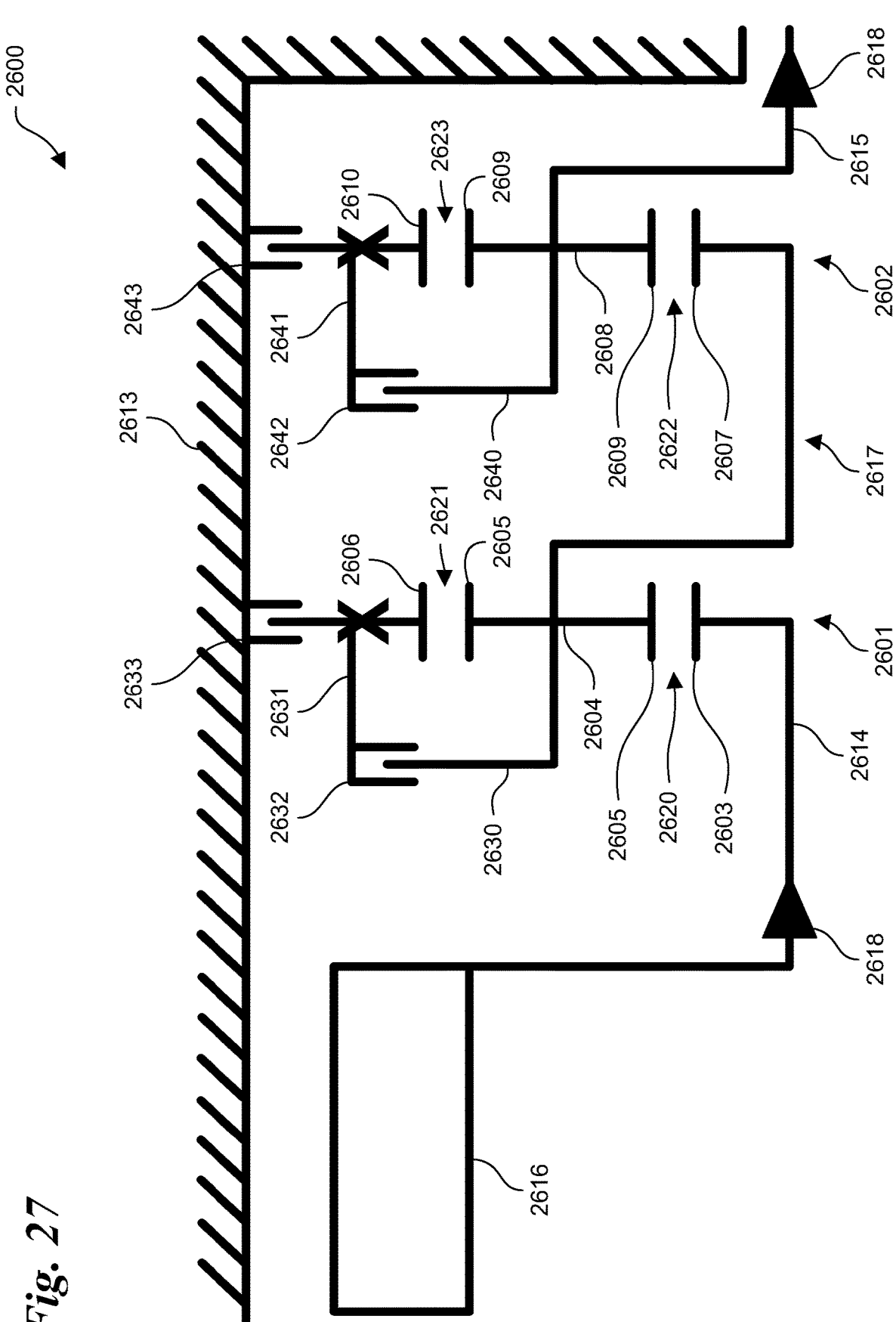
FIG. 27 is a diagram illustrating the example of FIG. 26 in operation.

In FIG. 27, the first and second brakes are actuated to ground the ring gears of both of the planetary gearsets 2601 and 2602. The ring gears of both planetary gearsets are maintained in place relative to ground and are not allowed to rotate with respect to the other parts of the transmission. The sun gear of both planetary gearsets provides input torque to each planetary gearset, and the carrier and planetary gears of both gearsets are thus allowed to rotate freely in relation to the ring gear and sun gear of each gearset. Power optionally transfers from the electric motor, downstream through the transmission, to the output shaft to provide a first gear ratio. As noted above, the same gear ratio may be obtained when power flows upstream to the motor such as in the case of regenerative braking.

Figure 28:
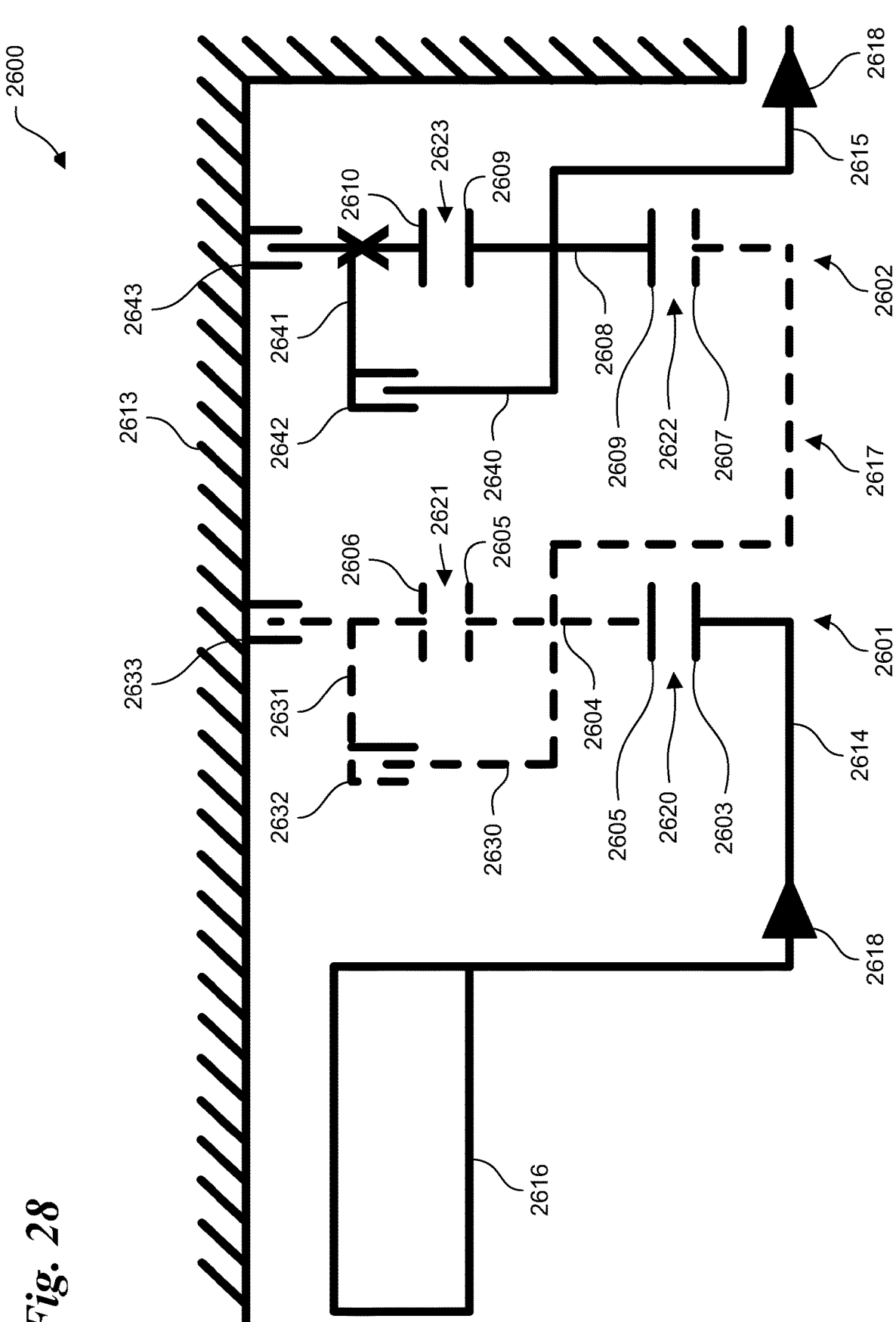
FIG. 28 is another diagram illustrating the example of FIG. 26 in operation.

In another aspect shown in FIG. 28, a second gear is optionally defined by coupling together the carrier 2604 and the ring gear 2606 of the first planetary gearset 2601, while the ring gear 2610 of the second planetary gearset 2602 is coupled to ground 2613. In one example, this is achievable by actuating the clutch 2632, deactivating brake 2633, and engaging brake 2643, but not clutch 2642. This may provide a second gear of any suitable ratio such as less than or equal to 5:1, greater than 5:1, greater than 8:1, greater than 10:1, greater than 15:1, or more.

Figure 29:
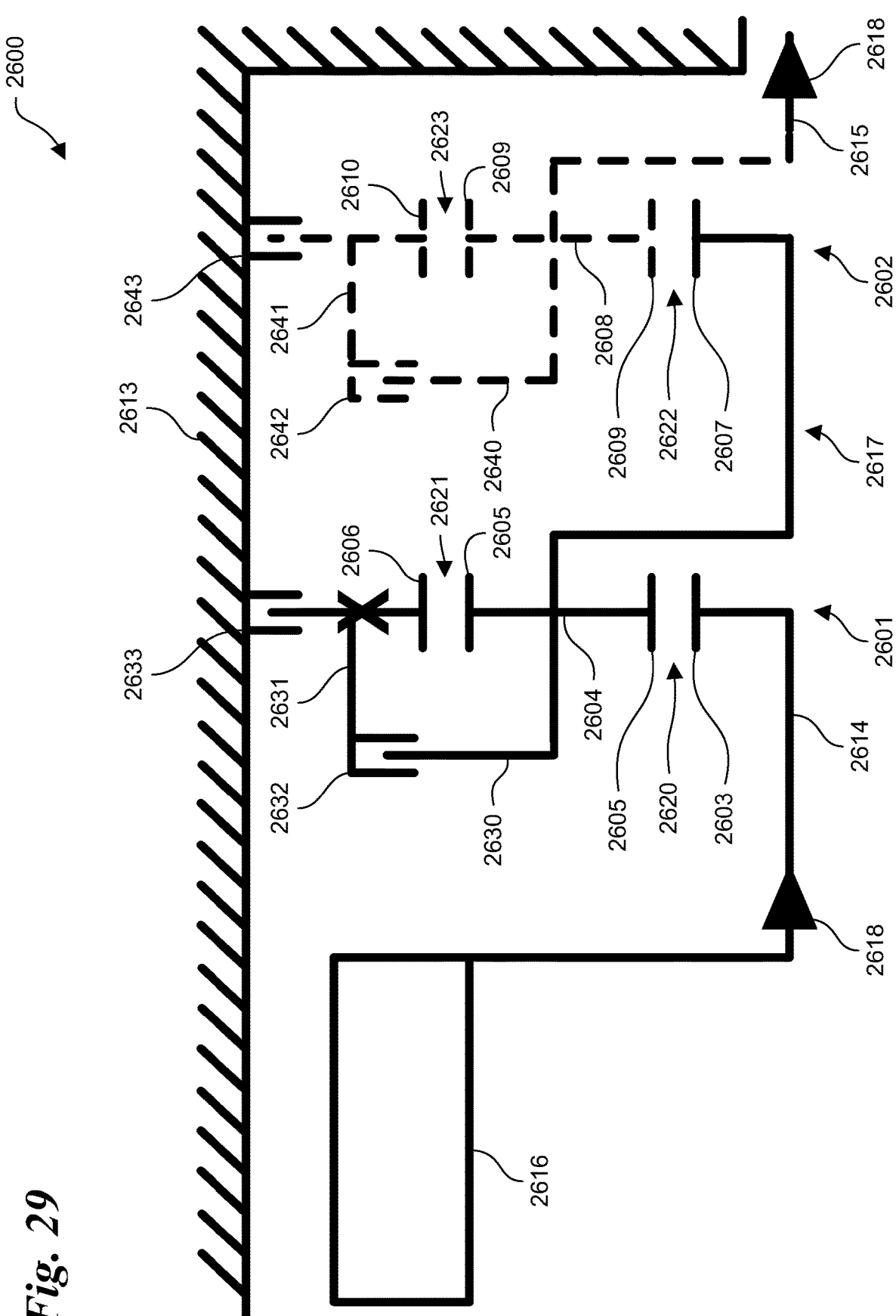
FIG. 29 is another diagram illustrating the example of FIG. 26 in operation.

Illustrated in FIG. 29 is a third gear ratio of the four separate gear ratios which may be achieved by coupling the ring gear 2606 of the first planetary gearset 2601 to ground 2613 and coupling the ring gear 2610 of the second planetary gearset 2602 to the carrier 2608 of the second planetary gearset. This may be achieved, in the drivetrain 2600, by disengaging clutch 2632 and engaging brake 2633, and engaging clutch 2642 and disengaging brake 2643. Any suitable ratio may be used for third gear such as less than or equal to 3:1, greater than 3:1, greater than 6:1, greater than 8:1, greater than 10:1, or more.

Figure 30:
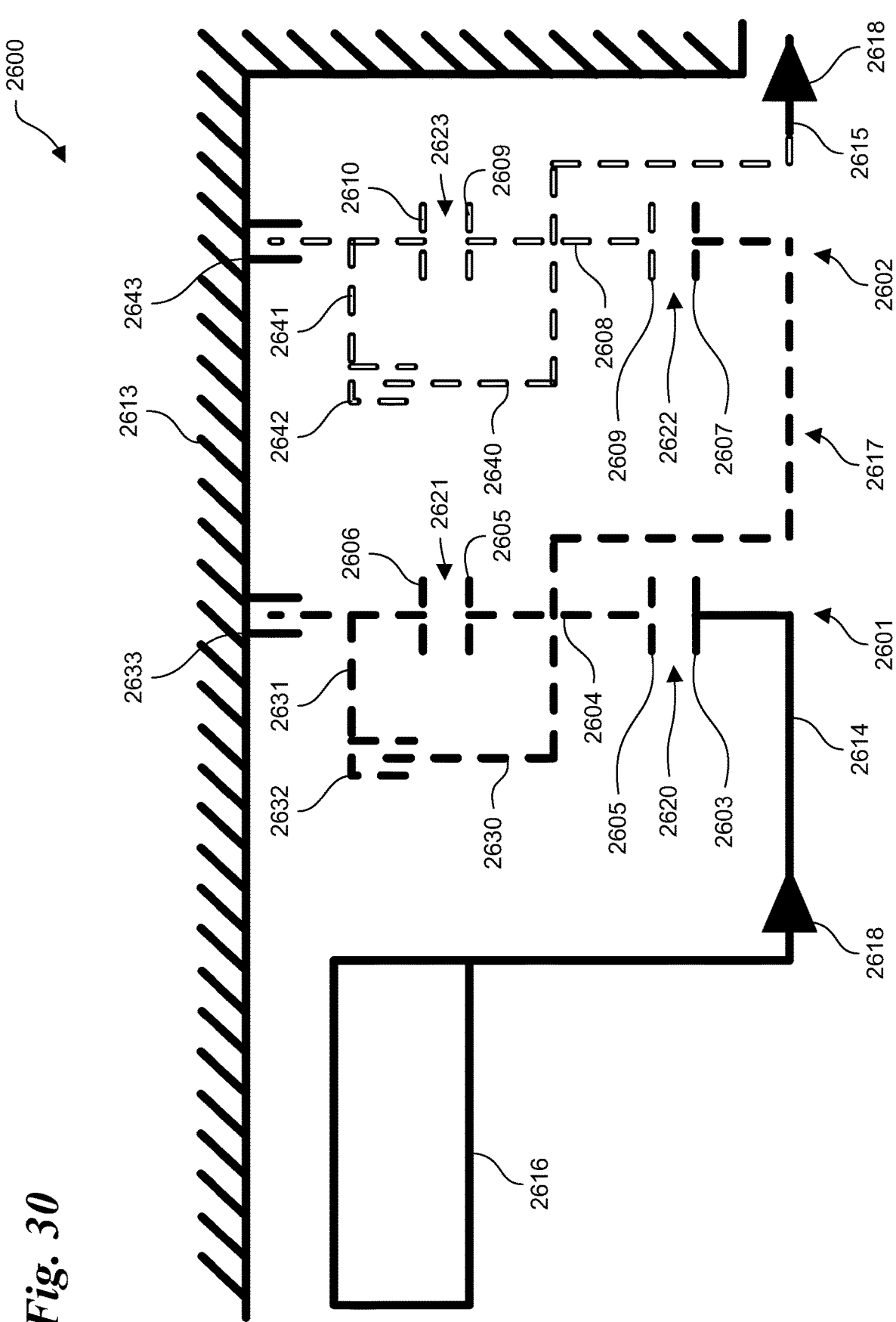
FIG. 30 is another diagram illustrating the example of FIG. 26 in operation.

As shown in FIG. 30, a fourth gear ratio of the four separate gear ratios may be achieved by coupling the ring gear 2606 of the first planetary gearset 2601 to the carrier 2604, and coupling the ring gear 2610 of the second planetary gearset 2602 to the carrier 2608 of the second planetary gearset. This may be achieved, in the drivetrain 2600, by engaging clutch 2632, disengaging brake 2633, engaging clutch 2642, and disengaging brake 2643. A ratio of 1:1 may thus be obtained.

Figure 31:
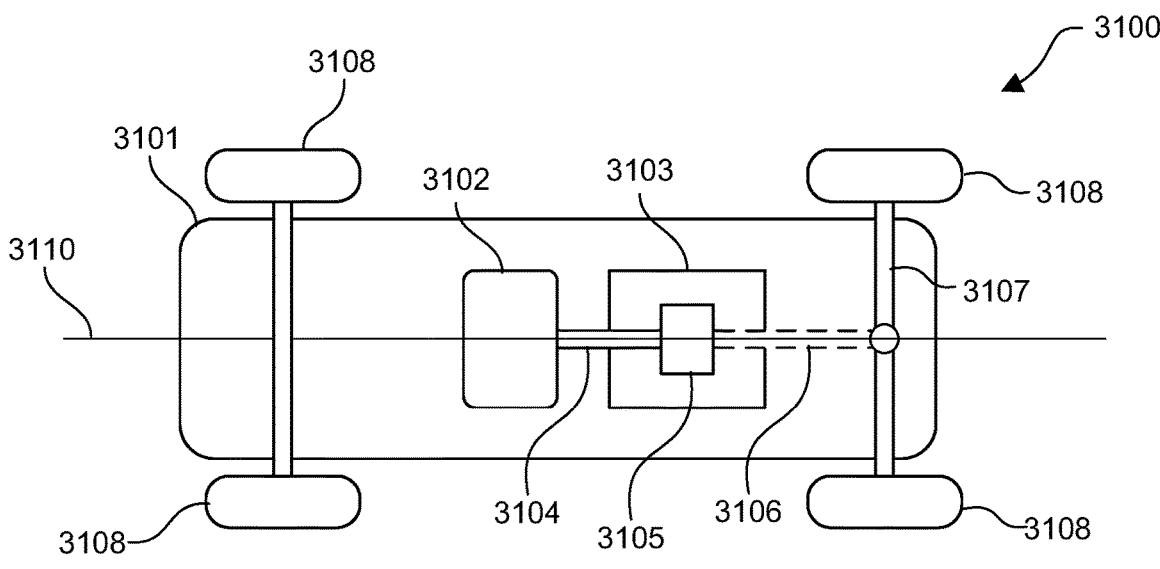
FIG. 31 is a diagram illustrating another example of the components and configuration of a drive system of the present disclosure.

FIGS. 31-40 illustrate several configurations for a drive system or drivetrain of the present disclosure mounted to a vehicle. In FIG. 31 at 3100, a vehicle 3101 is shown that optionally includes an electric motor 3102 which may be arranged and configured to provide torque to a transmission 3103 via an input shaft 3104. The four speed transmission may include an arrangement of one or more planetary gearsets 3105, and/or any suitable configuration of brakes, clutches, synchronizers, and the like. The gearsets 3105 are optionally configured according to any of the examples discussed in the present disclosure to provide four forward, and four reverse gear ratios. An output shaft 3106 of the transmission may be coupled to the gearsets 3105 according to the present disclosure to optionally provide power to a drive axle 3107. One or more earth engaging members 3108 may be included and may be coupled to the output shaft 3106. These earth engaging members may include, for example, tires, wheels, belts, tracks, and the like, or any combination thereof.

In another aspect, the drive system may be arranged and configured with motor 3102, transmission 3103, and output shaft 3106 aligned axially on a common axis 3110. This common axis 3110 may optionally be perpendicular to the drive axle 3107. In another aspect, the input shaft 3104 receiving power from the electric motor 3102 may extend outwardly toward the motor 3102 in a different direction from the output shaft 3106 which may extend outwardly away from the transmission and toward the drive axle. For example, the input shaft 3104 and the output shaft 3106 may extend out from the transmission 3103 in opposite directions.

In another aspect, the transmission 3103 and gearsets 3105 may be mounted downstream of the motor. Power optionally flows downstream from the motor 3102 through the input shaft and into the transmission 3103 where it may then transfer through the gearsets 3105 and to the output shaft 3106. Power may then continue through the output shaft 3106 downstream to the drive axle 3107, and eventually to the earth engaging members 3108.

Figure 32:
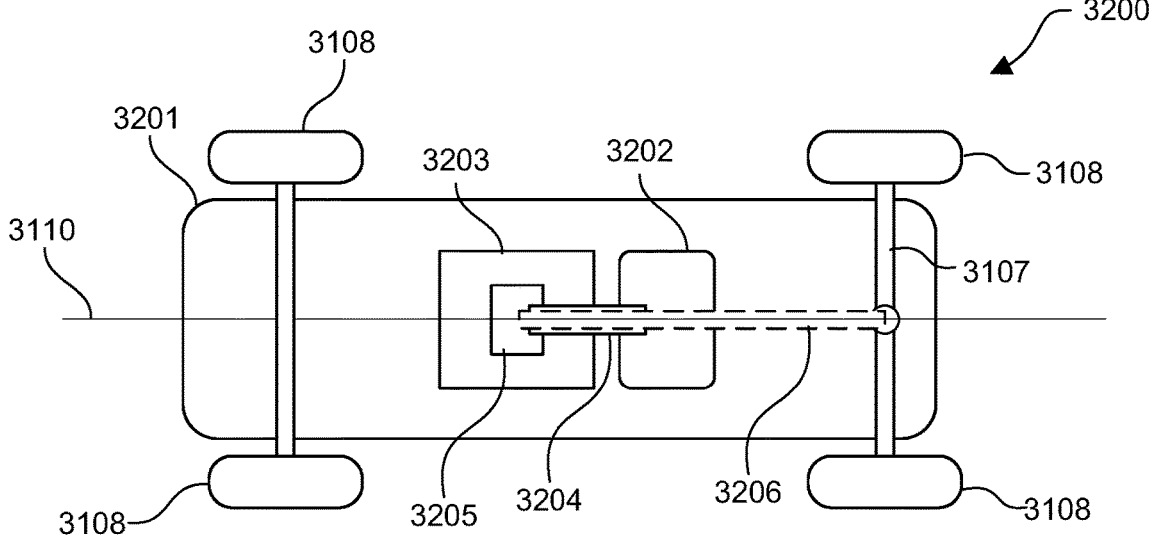
FIG. 32 is a diagram illustrating another example of the components and configuration of a drive system of the present disclosure.

FIG. 32 illustrates at 3200, another example of a vehicle 3201 that is like the vehicles of the preceding figures but with a different drive train arrangement. Vehicle 3201 optionally includes an electric motor 3202 which may be arranged and configured to provide torque to a transmission 3203 via an input shaft 3204. The four speed transmission may include an arrangement of one or more planetary gearsets 3205, and/or any suitable configuration of brakes, clutches, synchronizers, and the like as discussed herein elsewhere. The gearsets 3205 are optionally configured according to the present disclosure to provide four forward, and four reverse gear ratios. An output shaft 3206 of the transmission may be coupled to the gearsets 3205 according to the present disclosure to optionally provide power to a drive axle 3107. One or more earth engaging members 3108 may be included and may be coupled to the output shaft 3106.

In another aspect, the drive system may be arranged and configured so that motor 3202, the transmission 3203, and the output shaft 3206 are aligned axially on a common axis 3210. This common axis 3210 may optionally be perpendicular to the drive axle 3107. In another aspect, the input shaft receiving power from the electric motor 3102 may extend outwardly toward the motor 3202 in the same direction as the output shaft 3206 which may extend outwardly away from the transmission and toward the drive axle. For example, the output shaft 3206 optionally passes through the input shaft 3204 and the electric motor 3202 to engage with the drive axle 3107. In another aspect, the input shaft 3204 may optionally pass through the output shaft 3206 to engage the drive axle 3107.

In another aspect, the transmission 3203 and gearsets 3205 may be mounted upstream of the motor 3202. Power optionally flows from the motor 3202 upstream through the input shaft and into the transmission 3203 where it may then transfer through the gearsets 3205 and to the output shaft 3206. Power may then flow downstream through the output shaft 3206 back through the motor 3202, and to drive axle 3107. The output shaft 3206 thus extends from the transmission 3203 to engage the drive axle 3107, and passes through a central cavity defined by the motor 3202.

Figure 33:
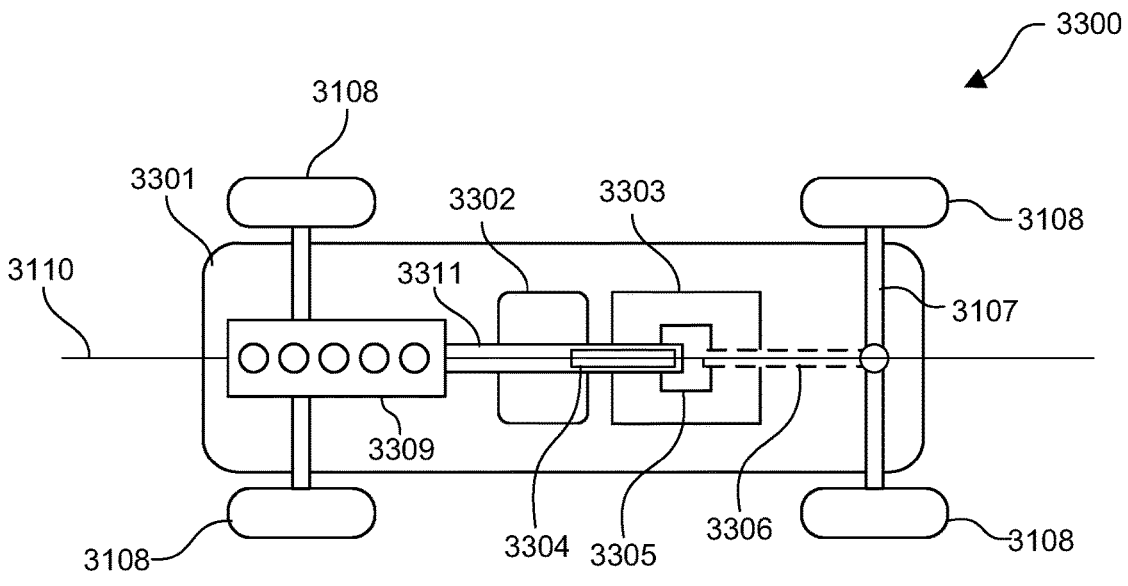
FIG. 33 is a diagram illustrating another example of the components and configuration of a drive system of the present disclosure.

In FIG. 33 at 3300, a vehicle 3301 is shown that is like the vehicles of the preceding figures. Vehicle 3301 optionally includes an electric motor 3302 which may be arranged and configured to provide torque to a transmission 3303 via an input shaft 3304. Vehicle 3301 also includes an internal combustion engine 3309 which is arranged and configured to provide power to the transmission 3303 via a second input shaft 3311. In this configuration, motor 3302 and engine 3309 comprise a hybrid vehicle drive system that uses a transmission 3303 of the present disclosure.

The four speed transmission may include an arrangement of one or more planetary gearsets 3305, and/or any suitable configuration of brakes, clutches, synchronizers, and the like as discussed herein throughout. The gearsets 3305 are optionally configured according to the present disclosure to provide four forward, and four reverse gear ratios. An output shaft 3306 of the transmission may be coupled to the gearsets 3305 according to the present disclosure to optionally provide power to a drive axle 3107. The power delivered by the transmission 3303 may include power provided by the internal combustion engine 3309, the electric motor 3302, or any combination thereof. One or more earth engaging members 3108 may be included and may be coupled to the output shaft 3106.

In another aspect, the drive system may be arranged and configured so that motor 3302, the transmission 3303, and the output shaft 3306 are aligned axially on a common axis 3110. This common axis 3110 may optionally be perpendicular to the drive axle 3107. In another aspect, at least a portion of the input shaft 3304 may be positioned within or adjacent to the input shaft 3311, and these two shafts may be aligned axially on the common axis 3110. In another aspect, the input shaft 3304 receiving power from the electric motor 3302, and/or the input shaft 3311 receiving power from the engine 3309, may extend outwardly from the transmission 3303 in a different direction from the output shaft 3306. The output shaft 3306 may, for example, extend outwardly away from the transmission and toward the drive axle 3107 from a side of transmission 3303 that is opposite shaft 3304 and 3311.

In another aspect, the transmission 3303 and gearsets 3305 may be mounted downstream of the motor. Power optionally flows from the motor 3302 through the input shaft 3304, and/or from engine 3309 through input shaft 3311, and into the transmission 3303 where it may then transfer through the gearsets 3305 and to the output shaft 3306. Power may then continue through the output shaft 3306 downstream to the drive axle 3107, and eventually to the earth engaging members 3108.

Figure 34:
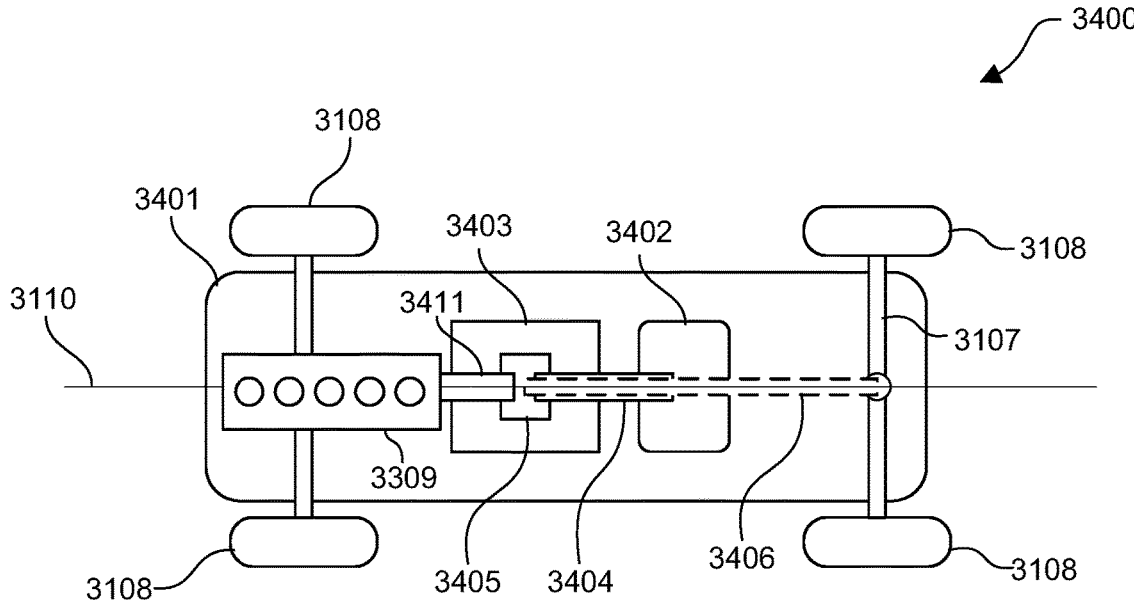
FIG. 34 is a diagram illustrating another example of the components and configuration of a drive system of the present disclosure.

In FIG. 34 at 3400, a vehicle 3401 is shown that is like the vehicles illustrated in the preceding figures. Vehicle 3401 optionally includes an electric motor 3402 which may be arranged and configured to provide torque to a transmission 3403 via an input shaft 3404. Vehicle 3401 also includes an internal combustion engine 3309 which is arranged and configured to provide power to the transmission 3403 via a second input shaft 3411. In this configuration, motor 3402 and engine 3309 comprise a hybrid vehicle drive system that uses a transmission 3403 of the present disclosure.

The transmission 3403 may include any suitable arrangement of one or more planetary gearsets 3405, and/or any suitable configuration of brakes, clutches, synchronizers, and the like as disclosed herein elsewhere. The gearsets 3405 are optionally configured according to the present disclosure to provide four forward, and four reverse gear ratios. An output shaft 3406 of the transmission may be coupled to the gearsets 3405 according to the present disclosure to optionally provide power to a drive axle 3107. The power delivered by the transmission 3403 may include power provided by the internal combustion engine 3309, the electric motor 3402, or any combination thereof. One or more earth engaging members 3108 may be included and may be coupled to the output shaft 3406.

In another aspect, the drive system may be arranged and configured so that motor 3302, the transmission 3303, and the output shaft 3306 are aligned axially on a common axis 3110. This common axis 3110 may optionally be perpendicular to the drive axle 3107. In another aspect, the input shaft 3404 receiving power from the electric motor 3402 may enter transmission 3403 from a side opposite the input shaft 3411, both of which optionally extend outwardly from the transmission 3403. A portion of the output shaft 3406 may by positioned within the input shaft 3404. The output shaft 3406 may, for example, extend outwardly away from the transmission and toward the drive axle 3107 from a side of transmission 3303 that is opposite 3311.

In another aspect, the transmission 3403 and gearsets 3405 may be mounted upstream of the motor 3402, and optionally downstream from the engine 3309. Power optionally flows from the motor 3402 upstream through the input shaft 3404 and into the transmission 3403 where it may then transfer through the gearsets 3405 and to the output shaft 3406. Power may then flow downstream through the output shaft 3406 back through the motor 3402, and to drive axle 3107. In another aspect, power may flow downstream from engine 3309 via input shaft 3411 to engage the gearsets 3405. Power may then continue downstream to the drive axle 3107 via the output shaft 3406. The output shaft 3406 thus extends from the transmission 3403 to engage the drive axle 3107, and passes through a central cavity defined by the motor 3402.

Figure 35:
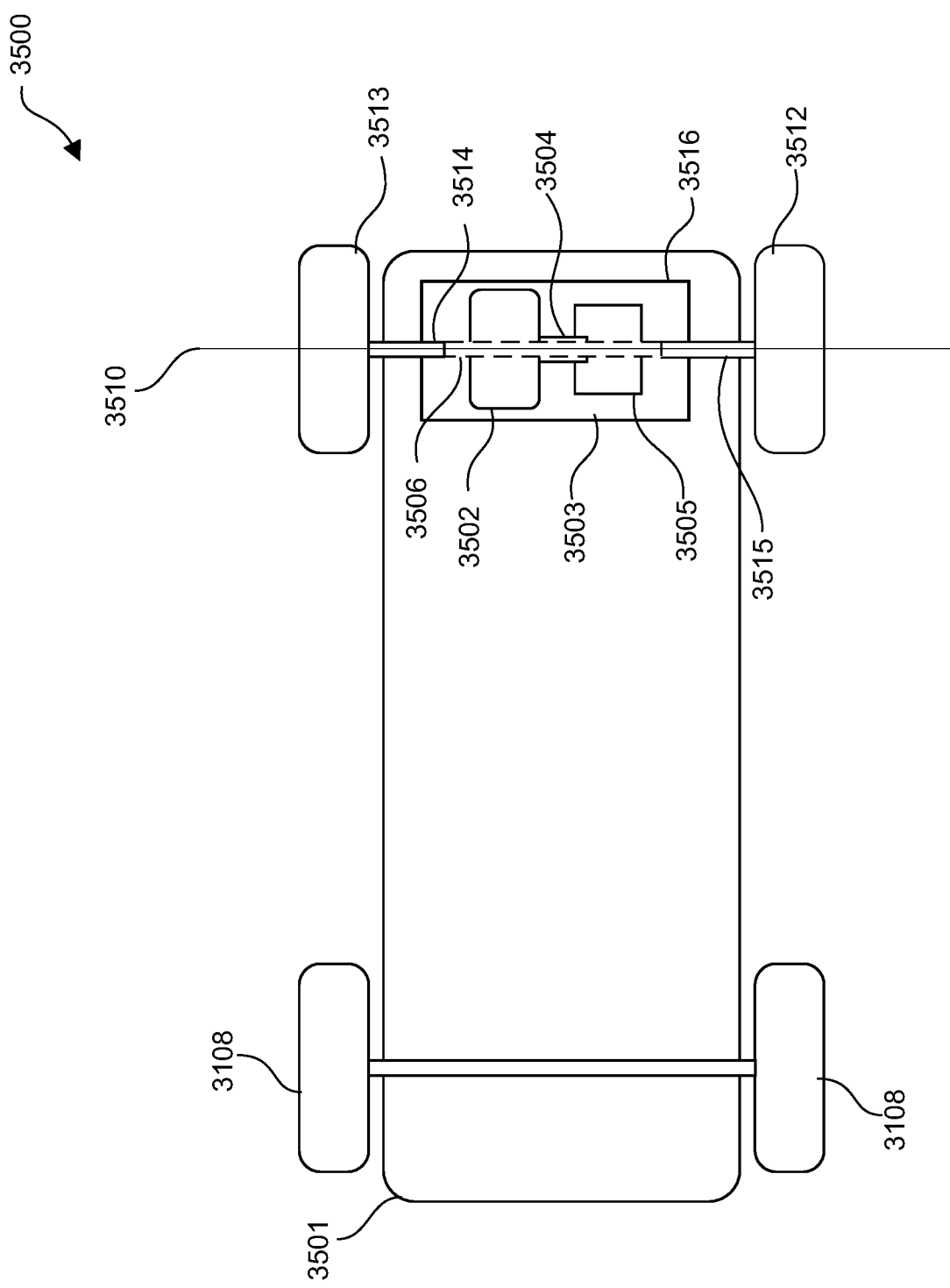
FIG. 35 is a diagram illustrating another example of the components and configuration of a drive system of the present disclosure.

FIG. 35 illustrates at 3500, another example of a vehicle 3501 that is like the vehicles of the preceding figures but with a different drive train arrangement. Vehicle 3501 optionally includes an electric motor 3502 which may be arranged and configured to provide torque to a transmission 3503 via an input shaft 3504. An output shaft 3506 may be included to carry power from the transmission 3503 to one or more drive axles 3514 and 3515. The four speed transmission may include an arrangement of one or more planetary gearsets 3505, and/or any suitable configuration of brakes, clutches, synchronizers, and the like according to the present disclosure. The gearsets 3505 are optionally configured according to the present disclosure to provide four forward, and four reverse gear ratios. A drive axle 3514 may be configured to receive power from the output shaft 3506 and may be coupled to the gearsets 3505 according to the present disclosure to optionally provide power to an earth engaging member 3513. A drive axle 3515 may be configured to receive power from the output shaft 3506 and may be coupled to the gearsets 3505 according to the present disclosure to optionally provide power to another separate earth engaging member 3512. In another aspect, 3506 may be a split shaft with separate portions engaging the drive axles 3514 and 3515.

In another aspect, the drive system may be arranged and configured so that the electric motor 3502, the transmission 3503, and the drive axles 3514 and 3515 are optionally aligned axially on a common axis 3510. In another aspect, the drive axles 3514 and 3515 optionally pass through a housing of the transmission 3503 and engaging the gearsets 3505 via output shaft 3506. In another aspect, the motor 3502 and the transmission 3503 are optionally mounted axially on a common axis 3510 that is parallel to the drive axles 3514, 3515. In another aspect, at least two earth engaging members 3512 and 3513 are optionally mounted to the drive axle 3515 and 3514 respectively, and the motor 3502 and transmission 3503 are optionally mounted between the earth engaging members. The motor 3502 and the gearsets 3505 may optionally be mounted within a common housing of transmission 3503. In another aspect, the drive axles 3514 and 3515 are positioned to engage the output shaft 3506, and the output shaft is optionally arranged to pass through the input shaft 3504 and an opening or central cavity defined by the electric motor 3502 to provide torque to earth engaging members 3512 and 3513.

In another aspect, the transmission 3503 and gearsets 3505 may be mounted upstream of the motor 3502 with respect to a right earth engaging element 3513. Power optionally flows from the motor 3502 upstream through the input shaft and into the transmission 3503 where it may then transfer through the gearsets 3505 and to the drive axle 3514. Power may then flow downstream through the drive axle 3514 to the right earth engaging element 3513.

In another aspect, the transmission 3503 and gearsets 3505 may be mounted downstream of the motor 3502 with respect to a left earth engaging element 3512. Power optionally flows from the motor 3502 downstream to the transmission 3503 where it may then transfer through the gearsets 3505 and to the drive axle 3515. Power may then flow downstream through the drive axle 3515 to the left earth engaging member 3512. The drive axle 3514 thus optionally extends from the transmission 3503 without passing through a central cavity defined by the motor 3502.

Figure 36:
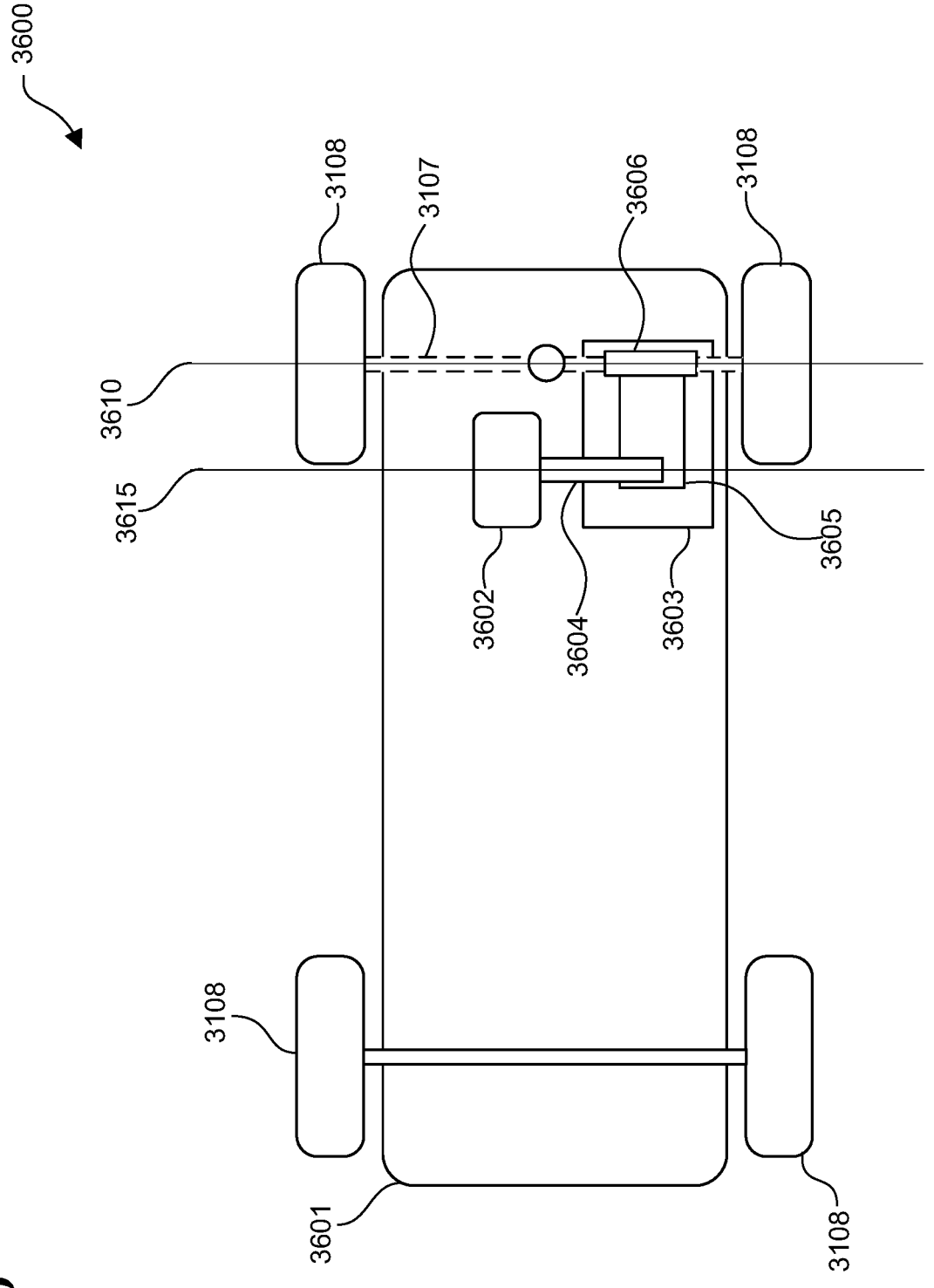
FIG. 36 is a diagram illustrating another example of the components and configuration of a drive system of the present disclosure.

FIG. 36 illustrates at 3600, another example of a vehicle 3601 that is like the vehicles of the preceding figures but with yet another different drive train arrangement. Vehicle 3601 optionally includes an electric motor 3602 which may be arranged and configured to provide torque to a transmission 3603 via an input shaft 3604. The four speed transmission may include an arrangement of one or more planetary gearsets 3605, and/or any suitable configuration of brakes, clutches, synchronizers, and the like as discussed herein elsewhere. The gearsets 3605 are optionally configured according to the present disclosure to provide four forward, and four reverse gear ratios. A drive axle 3107 may be configured to receive power directly from the transmission 3603 via output shaft 3606. The output shaft 3606 may be coupled to the gearsets 3605 according to the present disclosure to optionally provide power to one or more earth engaging members 3108.

In another aspect, the drive system may be arranged and configured so that the electric motor 3602, the transmission 3603, and drive axle 3107 may be optionally aligned axially on the same axis of rotation 3610. In another aspect, the drive axle 3107 optionally passes through a housing of the transmission 3603 engaging the gearsets 3605 by either a single shaft, or multiple shaft portions, extending outwardly in opposite directions away from transmission 3603.

In another aspect, the electric motor 3602 and the input shaft 3604 may optionally be aligned on a separate axis 3615 that may be parallel to axis 3610. The input shaft 3604 may be parallel to the drive axle 3107 but offset from the drive axle 3107. The motor 3602 and transmission 3603 are thus optionally mounted axially on a common axis 3615 that is parallel to the drive axle 3107. Gearsets 3605 may be configured to engage both the input shaft 3604 and the output shaft 3606. The output shaft 3606 engages the drive axle 3107 which may be a single shaft, or multiple shaft portions, extending outwardly in opposite directions away from transmission 3603. A transmission housing of transmission 3603 is configured to retain the transmission including gearsets 3605 while the drive axle 3107 extends away from the transmission housing to engage at least two earth engaging members 3108 such that the input shaft 3604 and the drive axle 3107 rotate on separate axes of rotation 3615 and 3610 that are parallel.

In another aspect, the transmission 3603 and gearsets 3605 may be mounted downstream of the motor 3602. Power optionally flows from the motor 3602 downstream to the transmission 3603 where it may then transfer through the gearsets 3605 and to the drive axle 3107. The drive axle 3107 thus optionally extends from the transmission 3603 without passing through the central cavity defined by the motor 3602. In another aspect, the drive axle 3107 passes through a housing of the transmission 3603 to engage the planetary gearsets 3605 within the housing of the transmission.

Figure 37:
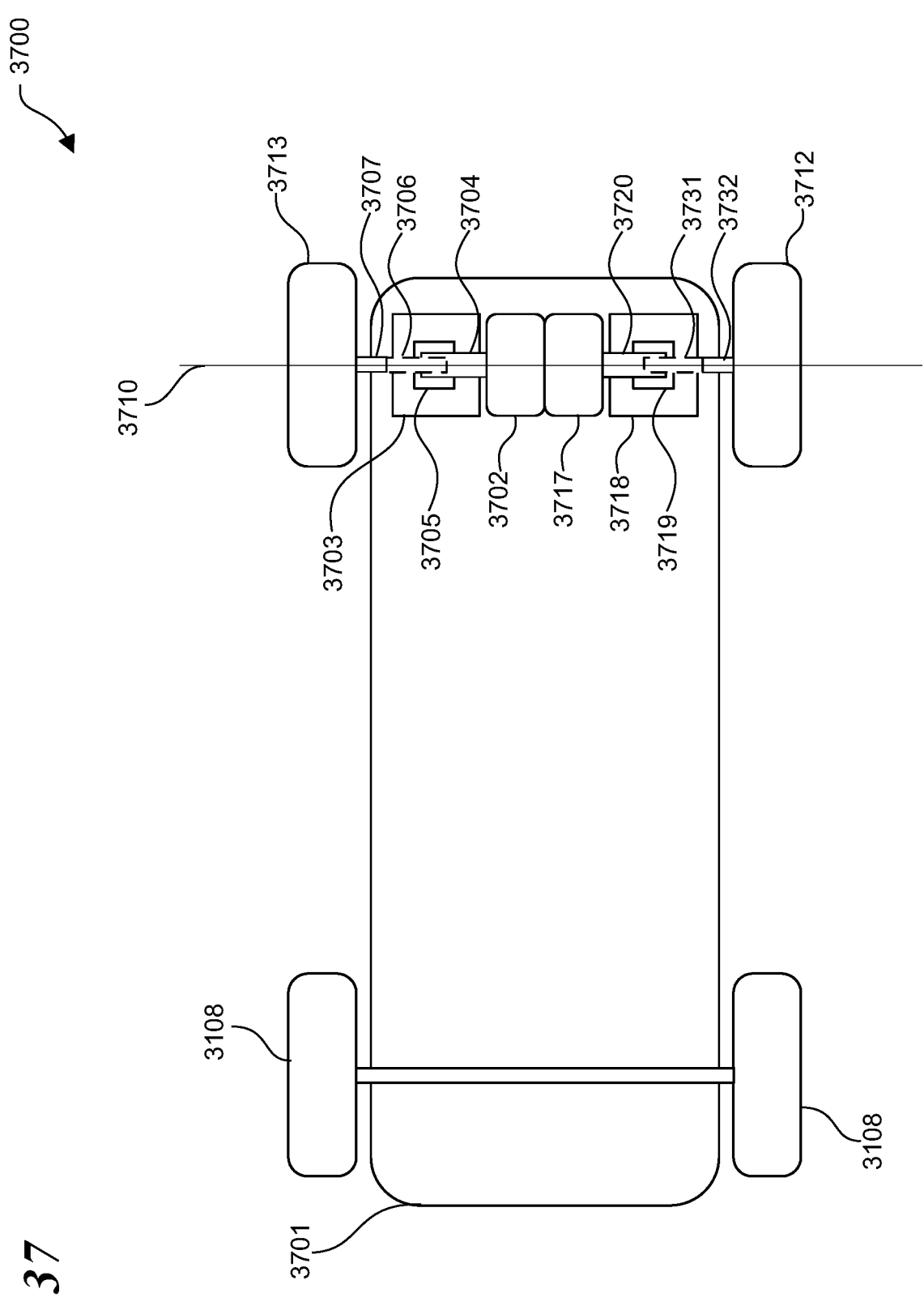
FIG. 37 is a diagram illustrating another example of the components and configuration of a drive system of the present disclosure.

FIG. 37 illustrates at 3700, another example of a vehicle 3701 that is like other vehicles of the preceding figures, but with another different drive train arrangement. Vehicle 3701 optionally includes a first electric motor 3702, and a second electric motor 3717 arranged and configured to provide torque separately to a first transmission 3703 and a second transmission 3718 via a first input shaft 3704 and a second input shaft 3720. The first electric motor 3702 is optionally coupled to the first transmission 3703, and the second electric motor 3717 is optionally coupled to the second transmission 3718.

In this example, the first and/or the second transmissions 3703 and 3718 optionally include a first gearset 3705 of the present disclosure, and a second gearset 3719 of the present disclosure. Both may include planetary gearsets, clutches, brakes, synchronizers, and the like according to the present disclosure. A first output shaft 3706 may be coupled to drive axle 3707. The drive axle 3707 is optionally coupled to a first earth engaging member 3713. A second output shaft 3721 of the second transmission 3718 is optionally coupled to a second drive axle 3722. The second drive axle 3722 is optionally coupled to a separate earth engaging member 3712 that is different from the first earth engaging member.

In another aspect, the first and second output shafts 3706 and 3721 are rotatable around a common axis of rotation 3710 with the drive axles 3707 and 3722. In another aspect, output shaft 3706 and drive axle 3707 may be a single continuous shaft coupled to earth engaging member 3713. Similarly, output shaft 3721 and drive axle 3722 may be a single continuous shaft coupled to earth engaging member 3712.

In another aspect, the first transmission 3703 and gearsets 3705 may be mounted downstream of the first motor 3702. Power optionally flows from the first motor 3702 downstream to the first transmission 3703 where it may then transfer through the gearsets 3705 and to the first drive axle 3707 via the first output shaft 3706.

In another aspect, the second transmission 3718 and gearsets 3719 may be mounted downstream of the second motor 3717. Power optionally flows from the second motor 3717 downstream to the second transmission 3718 where it may then transfer through the gearsets 3719 and to the second drive axle 3722 via the second output shaft 3721.

Figure 38:
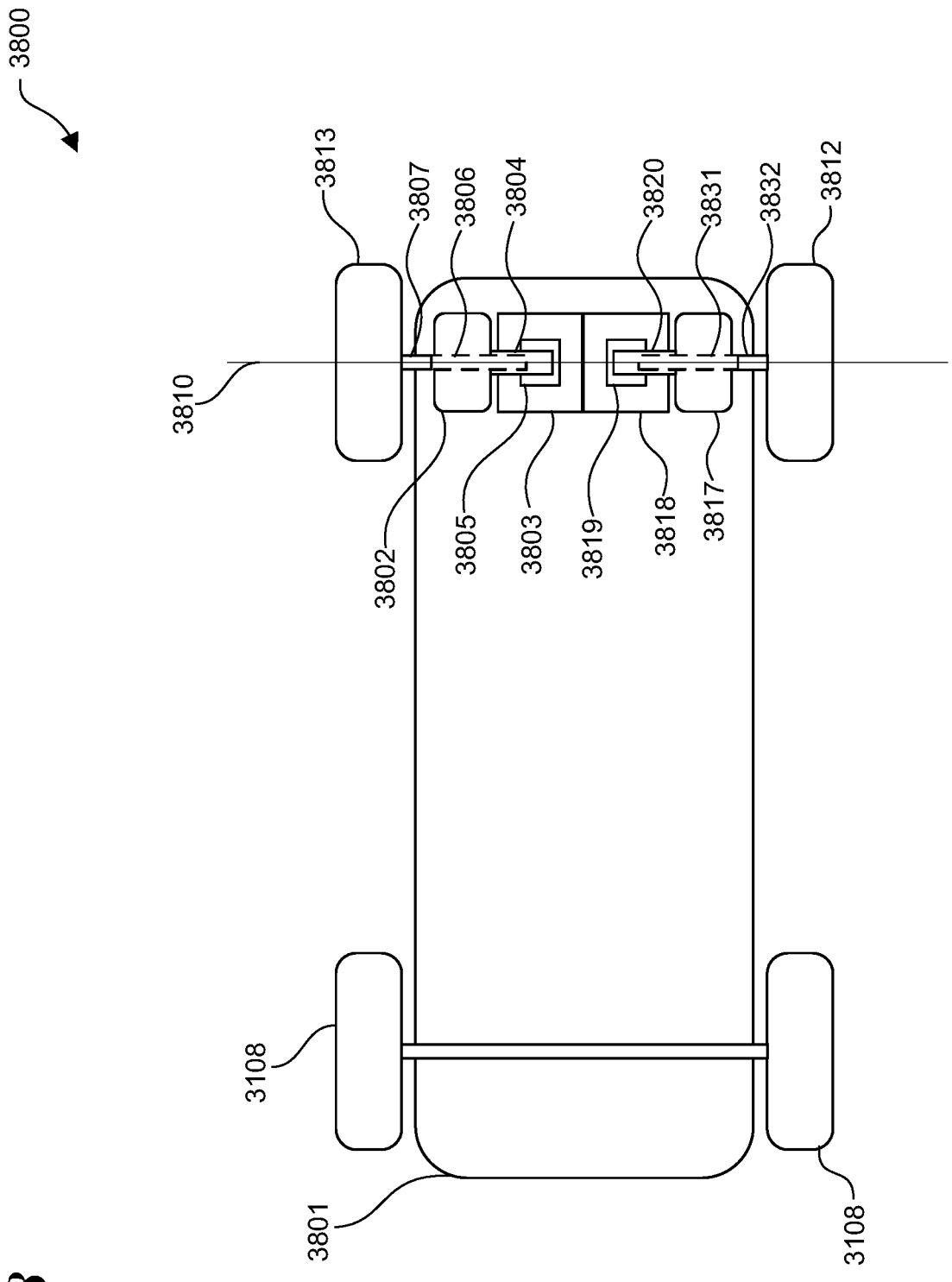
FIG. 38 is a diagram illustrating another example of the components and configuration of a drive system of the present disclosure.

FIG. 38 illustrates at 3800, another example of a vehicle 3801 that is like other vehicles of the preceding figures, but with another different drive train arrangement. Vehicle 3801 optionally includes a first electric motor 3802, and a second electric motor 3817 arranged and configured to provide torque separately to a first transmission 3803 and a second transmission 3818 via a first input shaft 3804 and a second input shaft 3820. The first electric motor 3802 is optionally coupled to the first transmission 3803 by an input shaft 3804, and the second electric motor 3817 is optionally coupled to the second transmission 3818 by an input shaft 3820. In this example, the first and/or the second transmissions 3803 and 3818 optionally include a first gearset 3805 of the present disclosure, and a second gearset 3819 of the present disclosure. Both may include planetary gearsets, clutches, brakes, synchronizers, and the like according to the present disclosure.

A first output shaft 3806 may be coupled to drive axle 3807. The drive axle 3807 is optionally coupled to a first earth engaging member 3813. A second output shaft 3821 of the second transmission 3818 is optionally coupled to a second drive axle 3822. The second drive axle 3822 is optionally coupled to a separate earth engaging member 3812 that is different from the first earth engaging member.

In another aspect, the first and second output shafts 3806 and 3821 are optionally rotatable around a common axis of rotation 3810 with the drive axles 3807 and 3822. In another aspect, output shaft 3806 and drive axle 3807 may be a single continuous shaft coupled to earth engaging member 3813. Similarly, output shaft 3821 and drive axle 3822 may be a single continuous shaft coupled to earth engaging member 3812.

In another aspect, the first transmission 3803 and gearset 3805 may be mounted upstream of the first motor 3802. Power optionally flows from the first motor 3802 upstream to the first transmission 3803 where it may then transfer through the gearset 3805 to the output shaft 3806. Output shaft 3806 may then pass back through the first motor 3802 to engage the first drive axle 3807. The output shaft 3806 may optionally pass through at least a portion of the input shaft 3804 to engage the gearset 3805 with the drive axle 3807.

In another aspect, the second transmission 3818 and gearsets 3819 may be mounted downstream of the second motor 3817. Power optionally flows from the second motor 3817 upstream to the second transmission 3818 where it may then transfer through the gearsets 3819 to the output shaft 3821. Output shaft 3821 may then pass back through the second motor 3817 to engage the second drive axle 3807. The output shaft 3821 may optionally pass through at least a portion of the input shaft 3820 to engage the gearset 3819 with the drive axle 3822.

Figure 39:
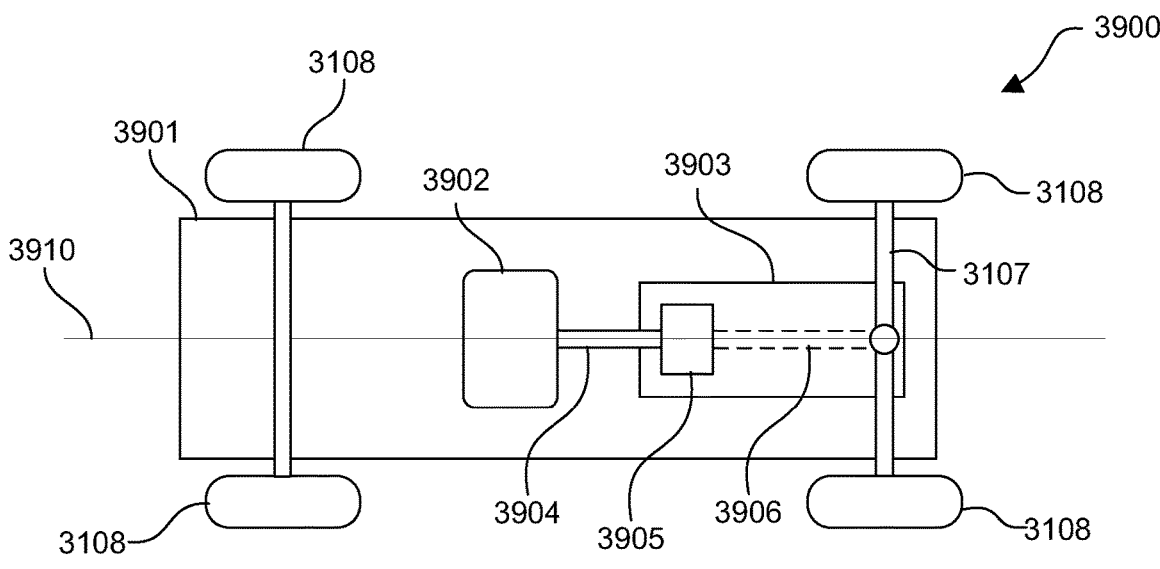
FIG. 39 is a diagram illustrating another example of the components and configuration of a drive system of the present disclosure.

FIG. 39 illustrates at 3900, another example of a vehicle 3901 that is like the vehicles of the preceding figures but with a different drive train arrangement. Vehicle 3901 optionally includes an electric motor 3902 which may be arranged and configured to provide torque for a transmission 3903 via an input shaft 3904. The four speed transmission may include an arrangement of one or more planetary gearsets 3905, and/or any suitable configuration of brakes, clutches, synchronizers, and the like as discussed herein elsewhere. The gearsets 3905 are optionally configured according to the present disclosure to provide four forward, and four reverse gear ratios. An output shaft 3906 of the transmission may be coupled to the gearsets 3905 according to the present disclosure to optionally provide power to a drive axle 3107. One or more earth engaging members 3108 may be included and may be coupled to the output shaft 3906.

In another aspect, the drive system may be arranged and configured so that motor 3902, transmission 3903, and output shaft 3906 are aligned axially on a common axis 3910. This common axis 3910 may optionally be perpendicular to the drive axle 3107. In another aspect, the input shaft receiving power from the electric motor 3902 may extend toward the motor 3902 in the same direction as the output shaft 3906. The output shaft 3906 may extend away from the gearsets 3905 and toward the drive axle.

In another aspect, the transmission 3903, motor 3902 and gear sets 3905 are positioned within a common housing that partially, or fully, encloses these elements. The drive axle 3107 may be arranged substantially perpendicular to the output shaft 3906, and may optionally be contained at least partially within the common housing of transmission 3903.

In another aspect, the gearsets 3905 may be mounted downstream of the motor 3902 as illustrated in FIG. 39, or upstream of the motor 3902 as illustrated in some of the preceding figures. Power optionally flows from the motor 3202 downstream (or upstream) via the input shaft and into the transmission 3903 where it may then transfer through the gearsets 3905 and to the output shaft 3906. Power may then flow downstream through the output shaft 3906 to drive axle 3107. The output shaft 3906 engages the drive axle 3107 to rotate earth engaging elements 3108.

Figure 40:
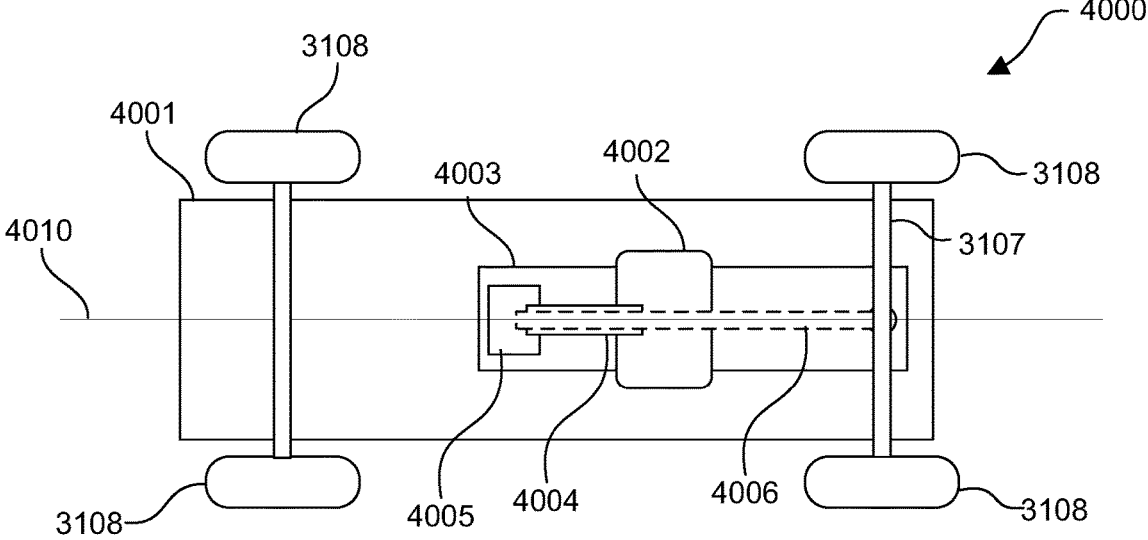
FIG. 40 is a diagram illustrating another example of the components and configuration of a drive system of the present disclosure.

FIG. 40 illustrates at 4000, another example of a vehicle 4001 that is like the vehicles of the preceding figures but with a different drive train arrangement. Vehicle 4001 optionally includes an electric motor 4002 which may be arranged and configured to provide torque to a transmission 4003 via an input shaft 4004. The three speed transmission may include an arrangement of one or more planetary gearsets 4005, and/or any suitable configuration of brakes, clutches, synchronizers, and the like as disclosed herein. The gearsets 4005 are optionally configured according to the present disclosure to provide three forward, and three reverse gear ratios. An output shaft 4006 of the transmission may be coupled to the gearsets 4005 according to the present disclosure to optionally provide power to a drive axle 3107. One or more earth engaging members 3108 may be included and may be coupled to the output shaft 4006.

In another aspect, the drive system may be arranged and configured so that the motor 4002, the transmission 4003, and the output shaft 4006 are aligned axially on a common axis 4010. This common axis 4010 may optionally be substantially perpendicular to the drive axle 3107. In another aspect, the input shaft 4004 receiving power from the electric motor 4002 may extend outwardly toward the motor 4002 in the opposite direction as the output shaft 4006 which may extend outwardly away from the transmission and toward the drive axle. In another aspect, the output shaft 4006 optionally passes through an opening defined by the input shaft 4004 and through an opening defined by the electric motor 4002 to engage with the drive axle 3107. In another aspect, the drive axle 3107 optionally passes through a housing of the transmission 4003, and the output shaft 4006 is optionally contained within the housing of the transmission 4003.

In another aspect, the gearsets 4005 may be mounted upstream of the motor 4002 in the transmission 4004. Power optionally flows from the motor 4002 upstream through the input shaft 4004 and into the gearsets 4005 of the present disclosure where it may then transfer through the gearsets and to the output shaft 4006. Power may then flow downstream through the output shaft 4006 back through the motor 4002, and to the drive axle 3107. The output shaft 4006 thus extends from the transmission 4003 to engage the drive axle 3107, and passes through a central cavity defined by the motor 4002.

The concepts illustrated and disclosed herein related to a drive system may be arranged and configured according to any of the following non-limiting numbered examples:

Example 1: A drive system that includes a first and a second planetary gearset having a sun gear, a carrier with planetary gears, and a ring gear, wherein the carrier of the first planetary gearset is coupled to the sun gear of the second planetary gearset.

Example 2: The drive system of any other example comprising a first range selector assembly operable to selectively engage the ring gear of the first gearset either to ground or to the carrier of the first gearset.

Example 3: The drive system of any other example comprising a second range selector assembly operable to selectively engage the ring gear of the second gearset either to ground or to the carrier of the second gearset.

Example 4: The drive system of any preceding example comprising a first range selector assembly that includes a brake operable to selectively ground the ring gear of the first gearset.

Example 5: The drive system of any preceding example comprising a second range selector assembly that includes a brake operable to selectively ground the ring gear of the second gearset.

Example 6: The drive system of any preceding example comprising a first range selector assembly that includes a clutch operable to selectively couple the ring gear of the first gearset with an input shaft.

Example 7: The drive system of any preceding example comprising a second range selector assembly that includes a clutch operable to selectively couple the ring gear of the second gearset with an input shaft.

Example 8: The drive system of any preceding example comprising a first range selector assembly that includes a clutch operable to selectively couple the carrier of the first gearset with an input shaft.

Example 9: The drive system of any preceding example comprising a second range selector assembly that includes a clutch operable to selectively couple the carrier of the second gearset with an input shaft.

Example 10: The drive system of any preceding example comprising a first range selector assembly that includes a clutch operable to selectively couple the carrier of the first gearset with the ring gear of the first gearset.

Example 11: The drive system of any preceding example comprising a second range selector assembly that includes a clutch operable to selectively couple the carrier of the second gearset with the ring gear of the second gearset.

Example 12: The drive system of any preceding example wherein the first range selector assemblies include a first synchronizer operable to selectively couple the ring gear of the first gearset to ground or to the carrier of the first gearset.

Example 13: The drive system of any preceding example wherein the second range selector assemblies include a second synchronizer operable to selectively couple the ring gear of the second gearset to ground or to the carrier of the second gearset.

Example 14: The drive system of any preceding example wherein the first range selector assemblies include a first synchronizer operable to selectively couple the ring gear of the first gearset to ground or to an input shaft of the first gearset.

Example 15: The drive system of any preceding example wherein the second range selector assemblies include a second synchronizer operable to selectively couple the ring gear of the second gearset to ground or to an input shaft of the second gearset.

Example 16: The drive system of any preceding example wherein the carrier of the second planetary gearset is coupled to an output shaft.

Example 17: The drive system of any preceding example, wherein a first gear is defined by coupling the ring gear of the first planetary gearset and the ring gear of the second planetary gearset to ground.

Example 18: The drive system of any preceding example, wherein a second gear is defined by coupling the ring gear of the first planetary gearset to the carrier of the first planetary gearset and coupling the ring gear of the second planetary gearset to ground.

Example 19: The drive system of any preceding example, wherein a second gear is defined by coupling the ring gear of the first planetary gearset to an input shaft of the first planetary gearset and coupling the ring gear of the second planetary gearset to ground.

Example 20: The drive system of any preceding example, wherein a second gear is defined by coupling the carrier of the first planetary gearset to an input shaft of the first planetary gearset and coupling the ring gear of the second planetary gearset to ground.

Example 21: The drive system of any preceding example, wherein a third gear is defined by coupling the ring gear of the first planetary gearset to ground and coupling the ring gear of the second planetary gearset to the carrier of the second planetary gearset.

Example 22: The drive system of any preceding example, wherein a third gear is defined by coupling the ring gear of the first planetary gearset to ground and coupling the ring gear of the second planetary gearset to an input shaft of the second planetary gearset.

Example 23: The drive system of any preceding example, wherein a third gear is defined by coupling the ring gear of the first planetary gearset to ground and coupling the carrier of the second planetary gearset to an input shaft of the second planetary gearset.

Example 24: The drive system of any preceding example, wherein a fourth gear is defined by coupling the ring gear of the first planetary gearset to the carrier of the first planetary gearset and coupling the ring gear of the second planetary gearset to the carrier of the second planetary gearset.

Example 25: The drive system of any preceding example, wherein a fourth gear is defined by coupling the ring gear of the first planetary gearset to an input shaft of the first planetary gearset and coupling the ring gear of the second planetary gearset to an input shaft of the second planetary gearset.

Example 26: The drive system of any preceding example, wherein a fourth gear is defined by coupling the ring gear of the first planetary gearset to an input shaft of the first planetary gearset and coupling the ring gear of the second planetary gearset to the carrier of the second planetary gearset.

Example 27: The drive system of any preceding example, wherein a fourth gear is defined by coupling the carrier of the first planetary gearset to an input shaft of the first planetary gearset and coupling an input shaft of the second planetary gearset to the carrier of the second planetary gearset.

Example 28: The drive system of any preceding example wherein a torque input shaft providing torque to the first and/or second gearsets is coupled directly to the sun gear of the first and/or second gearsets.

Example 29: The drive system of any preceding example, wherein a first and second synchronizer of the first and second gearsets respectively is configured to selectively lock a carrier to a ring gear, or a ring gear to ground, to provide four separate speed ratios of the input shaft relative to the output shaft.

Example 30: The drive system of any preceding example that also includes a housing that at least partially surrounds the first and second planetary gearsets, wherein the housing operates as the ground.

Example 31: The drive system of any preceding example that also includes an electric motor coupled to the input shaft.

Example 32: The drive system of any preceding example that also includes one or more earth engaging elements coupled to the output shaft.

Example 33: The drive system of any preceding example, wherein a rotational direction of the input shaft is directly linked to a rotational direction of the output shaft.

Example 34: the drive system of any preceding example, wherein the sun gear of the first planetary gearset is coupled to a input shaft receiving torque from a motor, engine, or other prime mover.

Example 35: The drive system of any preceding example, wherein the first and second range selectors optionally include a dog clutch.

Example 36: The drive system of any preceding example, wherein the first and second range selectors optionally include rotating and/or stationary frictional elements.

Example 37: A drive system that includes a first and second electric motor providing torque separately to a first and a second transmission via a first and a second input shaft coupling the first electric motor to the first transmission, and the second electric motor to the second transmission, wherein the first and second transmissions include a first and a second planetary gearset arranged and configured according to any preceding example.

Example 38: A drive system of any preceding example wherein the output shaft of the first transmission is coupled to a first ground engaging member.

Example 39: A drive system of any preceding example, wherein the output shaft of the second transmission is coupled to a second ground engaging member that is separate from the first ground engaging member.

Example 40: A drive system of any preceding example, wherein the output shafts of the first and second transmissions are rotatable around a common axis of rotation with the ground engaging member.

Example 41: A drive system of any preceding example, wherein the first transmission is mounted downstream of the first electric motor, and the second transmission is mounted downstream of the second electric motor.

Example 40: A drive system of any preceding example, wherein the first transmission is mounted upstream of the first electric motor, and the second transmissions is mounted upstream of the second electric motor.

Example 41: A drive system of any other example, wherein the carrier of the second planetary gearset is coupled to a drive axle.

Example 42: A drive system of any other example, wherein the motor, the transmission, and the output shaft are aligned axially perpendicular to the drive axle.

Example 43: A drive system of any other example, wherein the transmission is mounted on a common axis downstream of the motor.

Example 44: A drive system of any other example, wherein the transmission is mounted on a common axis upstream of the motor.

Example 45: The drive system of any other example wherein the output shaft passes through the input shaft and the electric motor to engage with the drive axle.

Example 46: The drive system of any other example wherein the output shaft extends from the transmission to engage the drive axle.

Example 47: The drive system of any other example wherein the drive axle passes through a housing of the transmission and the output shaft is contained within the housing of the transmission.

Example 48: The drive system of any other example wherein the transmission is mounted downstream of the motor.

Example 49: The drive system of any other example wherein the transmission is mounted upstream of the motor.

Example 50: The drive system of any other example wherein the motor and transmission are mounted axially on a common axis that is parallel to the drive axle.

Example 51: The drive system of any other example including at least two earth engaging members mounted to the drive axle, wherein the motor and transmission are mounted between the at least two earth engaging members.

Example 52: The drive system of any other example wherein the output shaft of the transmission passes through the input shaft and the electric motor to engage with the drive axle.

Example 53: The drive system of any other example wherein the output shaft of the transmission and the input shaft of the motor are aligned on a common axis of rotation with the drive axle.

Example 54: The drive system of any other example that includes a transmission housing configured to retain the transmission, wherein the drive axle extends away from the transmission housing to engage at least two earth engaging members, and wherein the input shaft and the drive axle rotate on separate axes of rotation that are parallel to each other.

GLOSSARY OF DEFINITIONS AND
ALTERNATIVES

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.775 and 4.8125.

"Activate" generally is synonymous with "providing power to", or refers to "enabling a specific function" of a circuit or electronic device that already has power.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

A brake is optionally implemented with one or more frictional elements selectively pressed into contact with one another. A brake may include a friction braking system with one or more rotatable braking components interspersed between one or more stationary braking components. The stationary braking components may, for example, be rigidly coupled to a housing or other structure that may be included in a drive system. By selectively applying a compression force to the rotating and stationary components, the rotating components may be pressed against the stationary components until the rotation is brought to a complete stop thus "grounding" the rotating portion of the braking assembly to the stationary components while the compression force is maintained.

In another aspect, a brake may include one or more dog clutches having rotating components that engage by interference or clearance fit thus reducing or eliminating the opportunity for slip that may be inherent in a friction brake. A dog clutch configuration may be useable either in place of the frictional components or along with them. In another aspect, a brake may include a Selectable One Way Clutch (SOWC).

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, rim clutches, and Selectable One Way Clutch (SOWC) to name just a few examples.

A clutch is optionally implemented with one or more frictional elements selectively pressed into contact with one another. These frictional elements may be rotatable and are optionally interspersed between each other. One or more frictional elements may be coupled to the input side of the clutch where power is received, while one or more other frictional elements may be coupled to the output side of the clutch from which downstream components may receive torque. By selectively applying a compression force to the multiple sets of frictional components, the input side and the output side may be held stationary with respect to each other while the compression force is maintained. This allows torque applied to the input side (such as from the motor or other prime mover) to be selectively transmitted to the output side when the clutch is engaged or activated.

In another aspect, clutches of the present disclosure may include one or more dog clutches having rotating components that engage by interference or clearance fit thus reducing or eliminating the opportunity for slip that may be inherent in a friction clutch. A dog clutch configuration may be useable either in place of frictional components, or along with them.

"Contact" generally refers to a condition and/or state where at least two objects are physically touching. For example, contact requires at least one location where objects are directly or indirectly touching, with or without any other member(s) material in between.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Downstream" generally refers to a direction or relative location that is the same as where power flows in a system.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"Ground" or "Mechanical Ground" generally refers to a physical structure useful for holding one or more mechanical objects stationary relative to that physical structure. When used as a verb, "grounding" a mechanical object in motion generally refers to slowing the mechanical motion to a halt relative to the grounding structure and maintaining it in place.

"High Speed Motor" generally refers to a motor that has a maximum output speed of at least 5,000 rpm (rotations per minute) without the use of gear trains or other similar equipment for boosting speed.

"Interchangeable" generally refers to two or more things that are capable of being put and/or used in place of each other. In other words, one thing is capable of replacing and/or changing places with something else. For example, interchangeable parts typically, but not always, are manufactured to have nearly the same structural size as well as shape within normal manufacturing tolerances and have nearly the same operational characteristics so that one part can be replaced by another interchangeable part. In some cases, the interchangeable parts can be manufactured and/or sold by a specific company under the same part or Stock Keeping Unit (SKU) identifier, and in other cases, different companies can manufacture and/or sell the same interchangeable parts.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Lateral" generally refers to being situated on, directed toward, or coming from the side.

"Longitudinal" generally relates to length or lengthwise dimension of an object, rather than across.

"Low Speed Motor" generally refers to a motor that has a maximum output speed of less than 5,000 rpm (rotations per minute) without the use of gear trains or other similar equipment for boosting speed.

"Means For" in a claim invokes 35 U.S.C. 112(f), literally encompassing the recited function and corresponding structure and equivalents thereto. Its absence does not, unless there otherwise is insufficient structure recited for that claim element. Nothing herein or elsewhere restricts the doctrine of equivalents available to the patentee.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Multiple" as used herein is synonymous with the term "plurality" and refers to more than one, or by extension, two or more.

"Optionally" means discretionary; not required; possible, but not compulsory; left to personal choice.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Portion" means a part of a whole, either separated from or integrated with it.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Predominately" as used herein is synonymous with greater than 50%.

"Rated Continuous Power" or "Continuous Rated Power" generally refer to an amount of energy or work provided per unit of time (i.e., power) an electric motor will produce without interruption for a rated speed, at a rated torque, and at a rated voltage for the electric motor. In other words, the rated continuous power is usually the power that the electric motor can produce for a long period of time at the rated speed and the rated torque without damaging the electric motor.

"Rated Operating Speed" or "Rated Speed" generally refers to a velocity (i.e., speed) an electric motor will rotate when producing a rated continuous power at a supplied rated voltage for the electric motor. Typically, but not always, the rated operating speed is measured in terms of Revolutions Per Minute (rpm). Generally speaking, the rated operating speed is the prescribed rpm at which the motor operates, keeping the mechanical stability and efficiency of the electric motor in mind. The rated voltage and rated horsepower respectively refer to the maximum voltage and horsepower (hp) where the motor can operate efficiently without being damaged. The value for the rated operating speed will be slightly less than a synchronous speed of the electric motor due to a decrease in speed caused by adding a load (i.e., slip or speed loss). For instance, most alternating current (AC) induction motors with synchronous speeds of 1800 RPM will have normally have rated speeds ranging between about 1720 and about 1770 RPM depending on the amount of slip. Some newer high or energy-efficient electric motors will tend to have rated operating speeds towards a higher end of the range.

"Rated Continuous Torque" or "Continuous Rated Torque" generally refer to a magnitude of twisting force, or torque, an electric motor will produce without interruption for a rated speed and at a rated voltage for the electric motor. In other words, the rated continuous torque is usually a torque that the electric motor can output for a long period of time at the rated speed without damaging the electric motor. Typically, this value is generated close to the maximum speed of the motor.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or free-wheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively, or additionally, the SOWC can be controlled to switch or change the locked and free-wheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and free-wheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refer to a property of something having two sides or halves that are the same relative to one another, such as in shape, size, and/or style. In other words, symmetric describes something as having a mirror-image quality.

"Synchronizer" or "Synchronizer Mechanism" ("Synchromesh") generally refer to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Upstream" generally refers to a direction or relative location that is opposite from where power flows in a system.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

What is claimed is:

1. A drive system, comprising:
   a first and a second planetary gearset having a sun gear, a carrier with planetary gears, and a ring gear, wherein the carrier of the first planetary gearset is coupled to the sun gear of the second planetary gearset;
   a first synchronizer operable to selectively couple the ring gear of the first planetary gearset either to the carrier of the first planetary gearset or to ground; and a second synchronizer operable to selectively couple the ring gear of the second planetary gearset either to the carrier of the second planetary gearset or to ground;

wherein the sun gear of the first planetary gearset is coupled to an input shaft;

wherein the carrier of the second planetary gearset is coupled to an output shaft; and wherein a third gear is defined by coupling the ring gear of the first planetary gearset to ground and coupling the ring gear of the second planetary gearset to the carrier of the second planetary gearset.

2. The drive system of claim 1, wherein a first gear is defined by coupling the ring gear of the first planetary gearset and the ring gear of the second planetary gearset to ground.

3. The drive system of claim 1, wherein a second gear is defined by coupling the ring gear of the first planetary gearset to the carrier of the first planetary gearset and coupling the ring gear of the second planetary gearset to ground.

4. The drive system of claim 1, wherein a fourth gear is defined by coupling the ring gear of the first planetary gearset to the carrier of the first planetary gearset and coupling the ring gear of the second planetary gearset to the carrier of the second planetary gearset.

5. The drive system of claim 1, wherein the first and second synchronizer are configured to selectively lock the carrier to a ring gear, or the ring gear to ground, to provide four separate speed ratios of the input shaft relative to the output shaft.

6. The drive system of claim 1, further comprising:

a housing that at least partially surrounds the first and second planetary gearsets, wherein the housing operates as the ground.

7. The drive system of claim 1, comprising:

an electric motor coupled to the input shaft.

8. The drive system of claim 1, comprising:

one or more earth engaging elements coupled to the output shaft.

9. The drive system of claim 1, wherein a rotational direction of the input shaft is directly linked to a rotational direction of the output shaft.

10. A drive system, comprising:

a first and a second planetary gearset having a sun gear, a carrier with planetary gears, and a ring gear, wherein the carrier of the first planetary gearset is coupled to the sun gear of the second planetary gearset;

a first synchronizer operable to selectively couple the ring gear of the first planetary gearset either to the carrier of the first planetary gearset or to ground; and a second synchronizer operable to selectively couple the ring gear of the second planetary gearset either to the carrier of the second planetary gearset or to ground;

wherein the sun gear of the first planetary gearset is coupled to an input shaft;

wherein the carrier of the second planetary gearset is coupled to an output shaft; and wherein a third gear is defined according to the configuration of the the first and second planetary gearsets, and wherein a fourth gear is defined by coupling the ring gear of the first planetary gearset to the carrier of the first planetary gearset and coupling the ring gear of the second planetary gearset to the carrier of the second planetary gearset.

11. The drive system of claim 10, wherein the third gear is defined by coupling the ring gear of the first planetary gearset to ground and coupling the ring gear of the second planetary gearset to the carrier of the second planetary gearset.

12. The drive system of claim 10, wherein a first gear is defined by coupling the ring gear of the first planetary gearset and the ring gear of the second planetary gearset to ground.

13. The drive system of claim 10, wherein a second gear is defined by coupling the ring gear of the first planetary gearset to the carrier of the first planetary gearset and coupling the ring gear of the second planetary gearset to ground.

14. The drive system of claim 10, wherein the first and second synchronizer are configured to selectively lock the carrier to a ring gear, or the ring gear to ground, to provide four separate speed ratios of the input shaft relative to the output shaft.

15. The drive system of claim 10, further comprising:

a housing that at least partially surrounds the first and second planetary gearsets, wherein the housing operates as the ground.

16. The drive system of claim 10, comprising:

an electric motor coupled to the input shaft.

17. The drive system of claim 10, comprising:

one or more earth engaging elements coupled to the output shaft.

18. The drive system of claim 10, wherein a rotational direction of the input shaft is directly linked to a rotational direction of the output shaft.

* * * * *